US005763891A

United States Patent [19]
Yoshinaga et al.

[11] Patent Number: 5,763,891
[45] Date of Patent: Jun. 9, 1998

[54] NON-VISUALIZED INFORMATION RECORDING MEDIUM AND APPARATUS FOR DETECTING THE SAME

[75] Inventors: Kazuo Yoshinaga, Machida; Shinobu Arimoto, Yokohama; Toshio Hayashi, Kawasaki; Takehiko Nakai, Tokyo; Tsutomu Utagawa, Yokohama; Tetsuya Nagase, Kawasaki; Nobuatsu Sasanuma, Yokohama, all of Japan

[73] Assignee: Canon Kabushiki Kaisha, Tokyo, Japan

[21] Appl. No.: 871,629

[22] Filed: Jun. 9, 1997

Related U.S. Application Data

[63] Continuation of Ser. No. 562,778, Nov. 27, 1995, abandoned, which is a continuation of Ser. No. 140,566, Oct. 25, 1993, abandoned.

[30] Foreign Application Priority Data

Oct. 26, 1992 [JP] Japan .................... 4-309727

[51] Int. Cl.⁶ .................... G01T 21/63
[52] U.S. Cl. .................... 250/459.1; 250/271; 250/341.7; 250/458.1
[58] Field of Search .................... 250/271, 253, 250/341.7, 459.1, 458.1

[56] References Cited

U.S. PATENT DOCUMENTS

| | | | |
|---|---|---|---|
| 4,452,843 | 6/1984 | Kaule et al. | 428/199 |
| 4,586,811 | 5/1986 | Kubo et al. | 355/14 |
| 4,609,821 | 9/1986 | Summers | 250/255 |
| 4,935,628 | 6/1990 | Martin et al. | 250/338.1 |
| 5,220,166 | 6/1993 | Takeuchi et al. | 250/271 |
| 5,383,023 | 1/1995 | Walleczek | 356/417 |
| 5,498,875 | 3/1996 | Obremski et al. | 250/458.1 |

FOREIGN PATENT DOCUMENTS

| | | | |
|---|---|---|---|
| 0085157 | 3/1983 | European Pat. Off. | |
| 0263446 | 4/1988 | European Pat. Off. | |
| 0493961 | 7/1992 | European Pat. Off. | |
| 51-88300 | 8/1976 | Japan. | |
| 2-35587 | 2/1990 | Japan | 250/271 |
| WO81/03507 | 12/1981 | WIPO. | |
| WO9204192 | 3/1992 | WIPO. | |

*Primary Examiner*—Constantine Hannaher
*Attorney, Agent, or Firm*—Fitzpatrick, Cella, Harper & Scinto

[57] ABSTRACT

A method and apparatus for processing a medium on which an identification mark is formed using a plurality of recording materials having fluorescent characteristics in wavelength regions almost overlapping with each other and having maximum absorbing characteristics at different wavelengths. The method and apparatus include the features of detecting, on the medium, the identification mark which is comprised of the plurality of recording materials and controlling an operation of a processing apparatus in accordance with a result of the detecting of the identification mark.

23 Claims, 37 Drawing Sheets

FIG. 3

| | IMAGE SCANNER | PRINTER |
|---|---|---|
| FIRST SCAN | MODE 1<br>GENERAL POSITION OF FLUORESCENT MARK IS DETECTED | MAGENTA OUTPUT |
| SECOND SCAN | MODE 2<br>FLUORESCENT MARK IS EXTRACTED/JUDGED | CYAN OUTPUT |
| THIRD AND FOURTH SCAN | MODE 3<br>COUNTERFEIT PREVENTION PROC IS EXECUTED | YELLOW OUTPUT<br>BLACK OUTPUT |

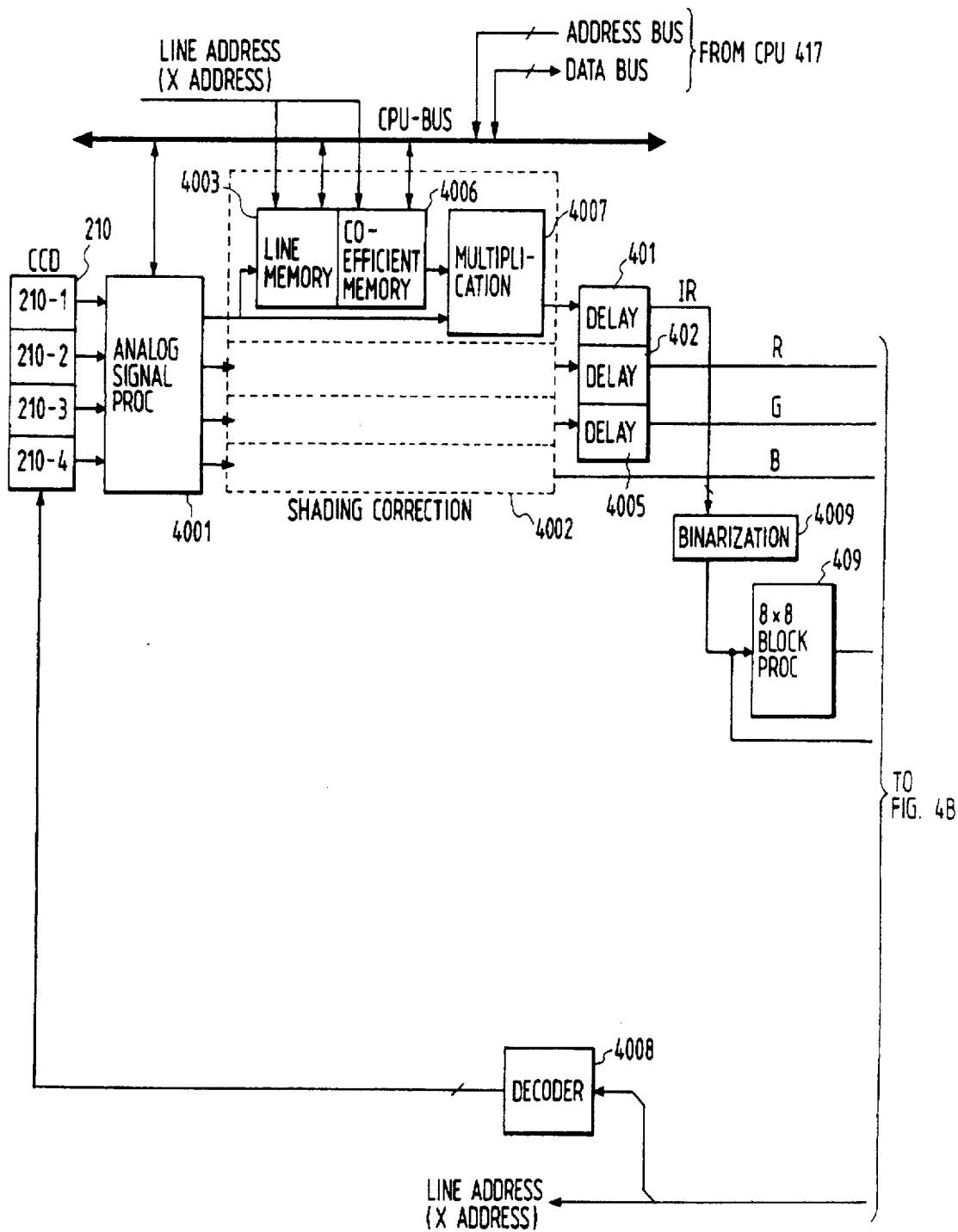

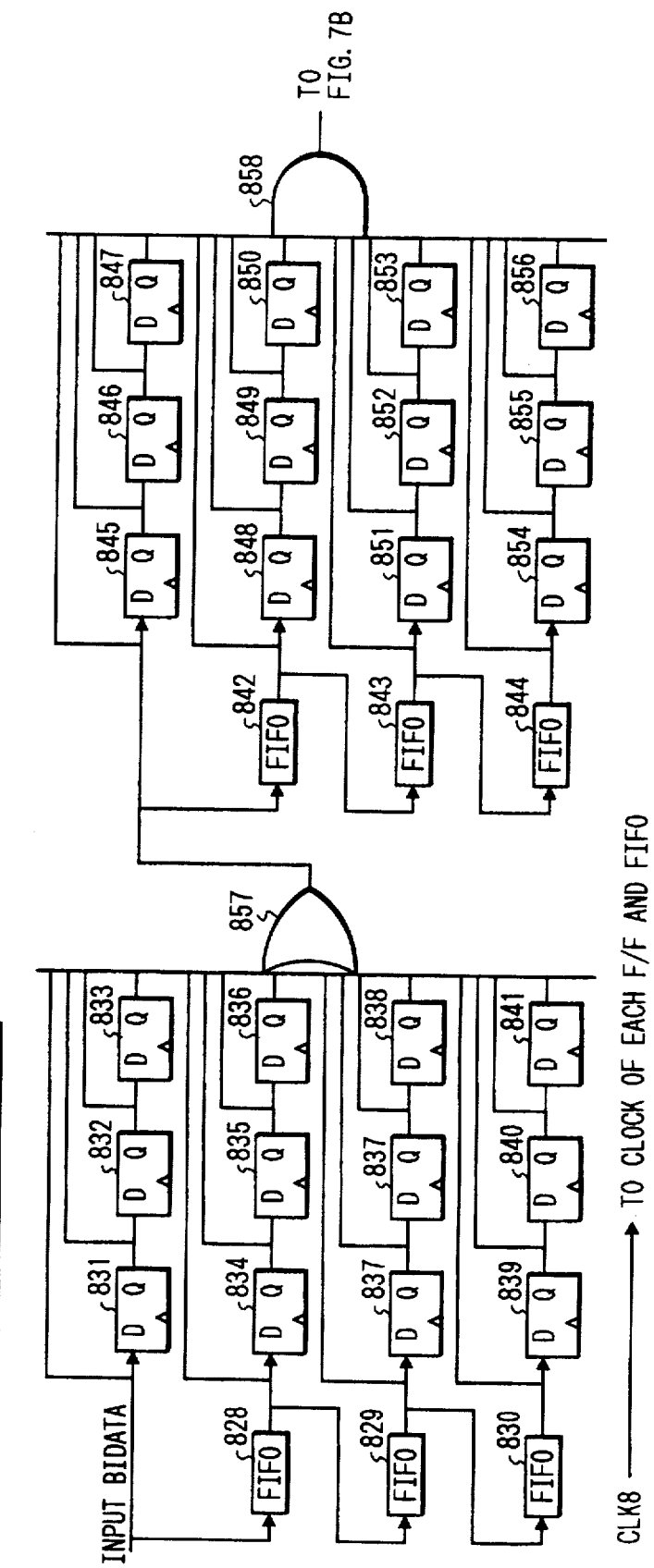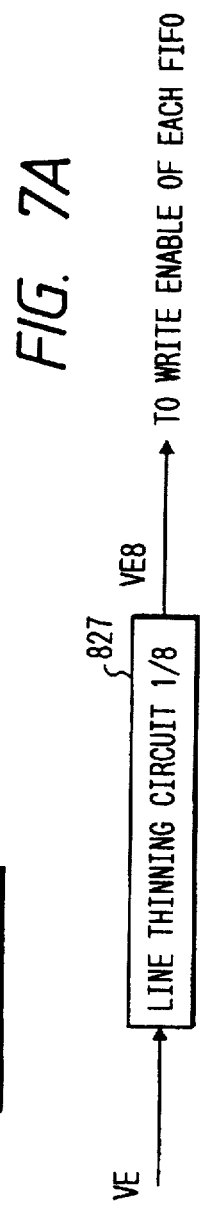

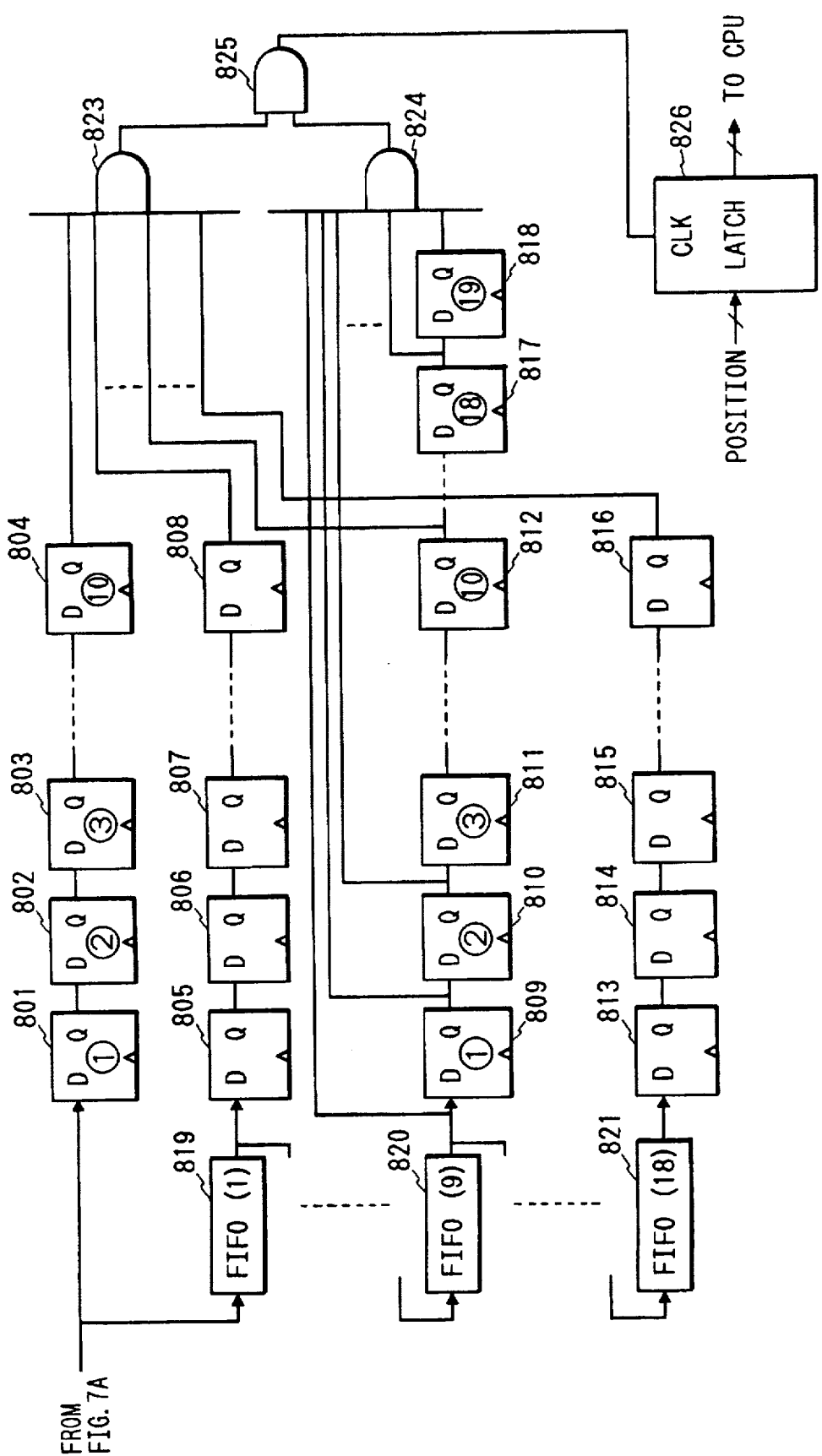

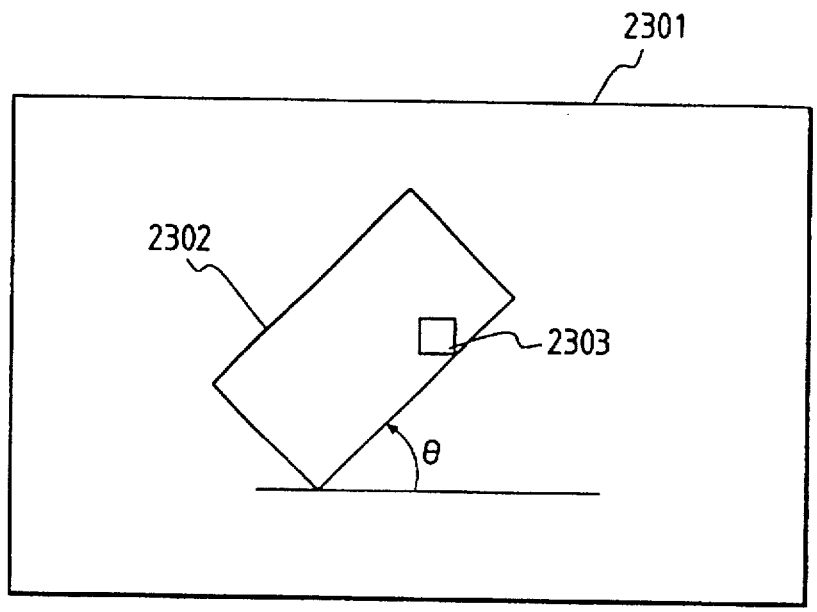
FIG. 12A
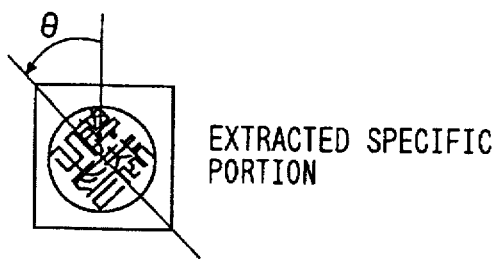
FIG. 12B          EXTRACTED SPECIFIC PORTION
FIG. 12C          UNROTATED STANDARD PATTERN

MAIN SCAN DIRECTION

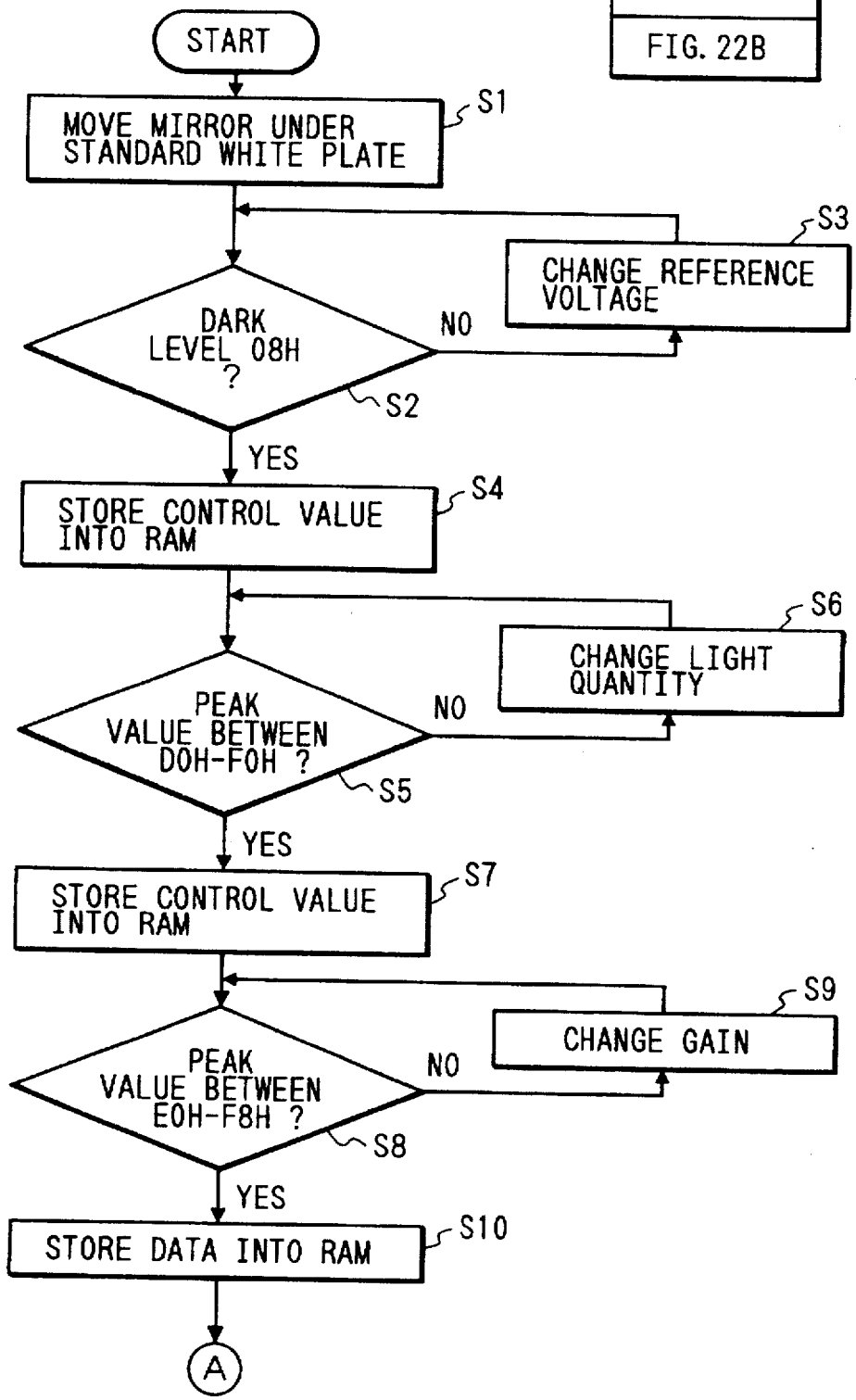

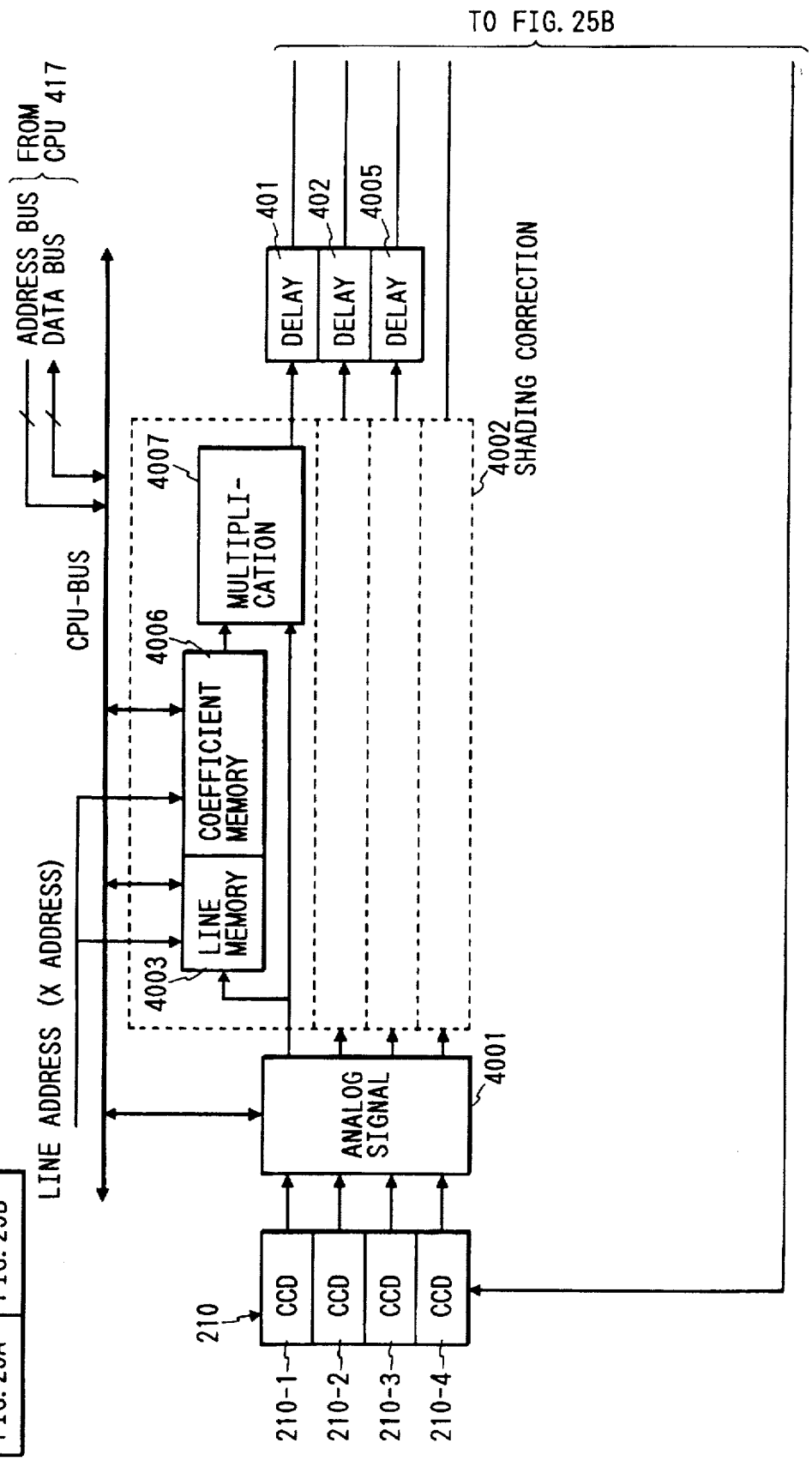

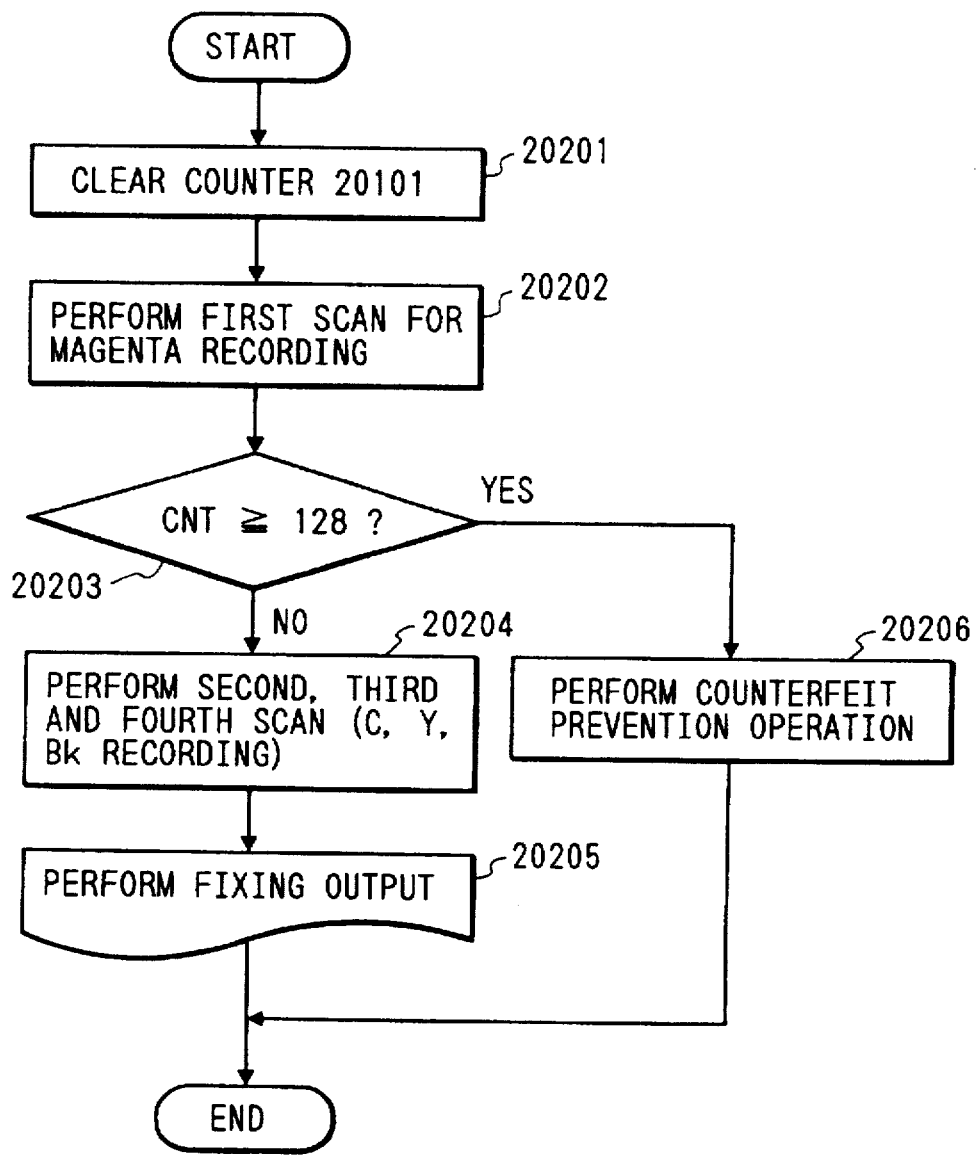

INFRARED FLUORESCENT
PATTERN THROUGH
WHICH VISIBLE LIGHT
PERMEATES

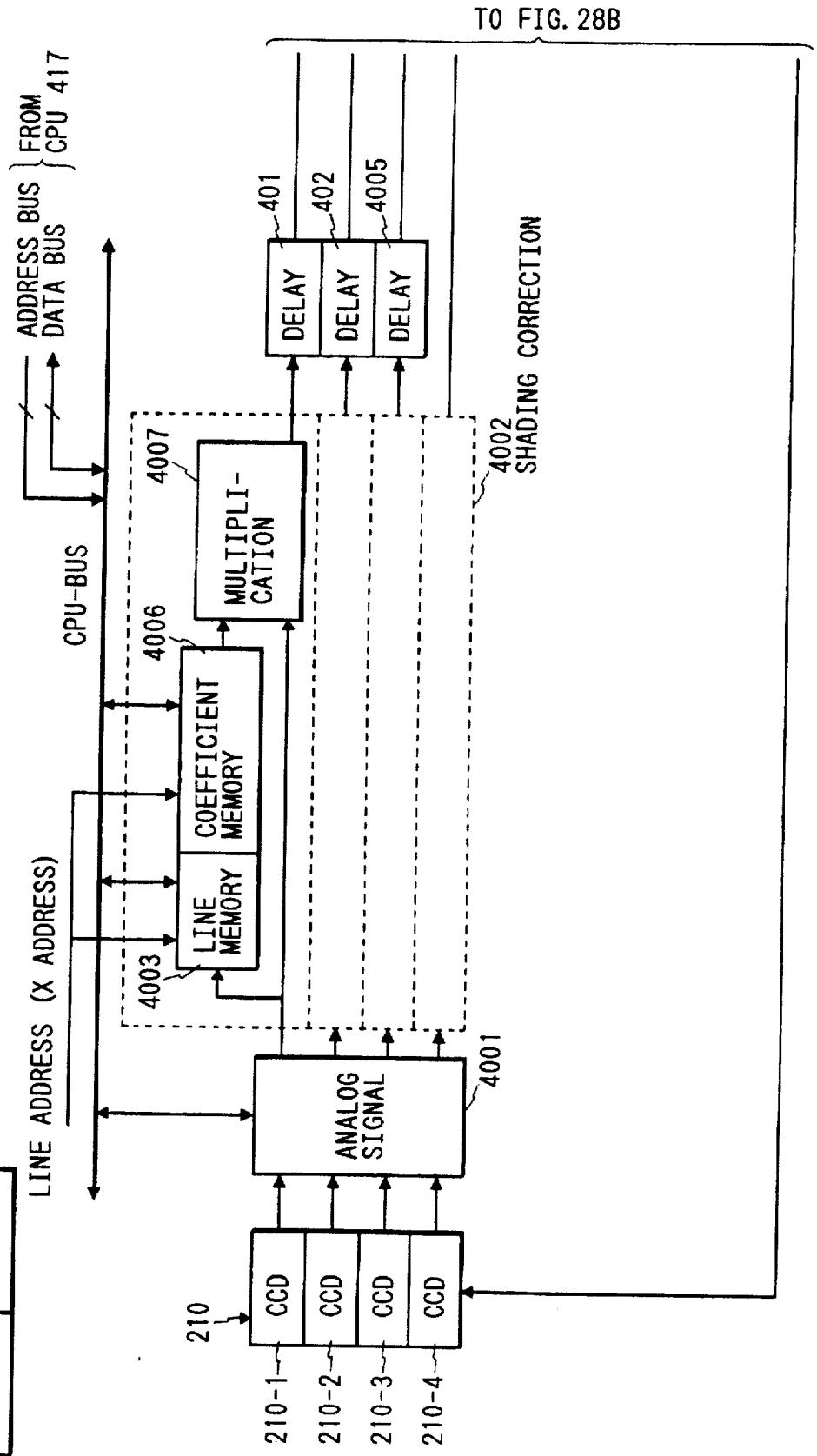

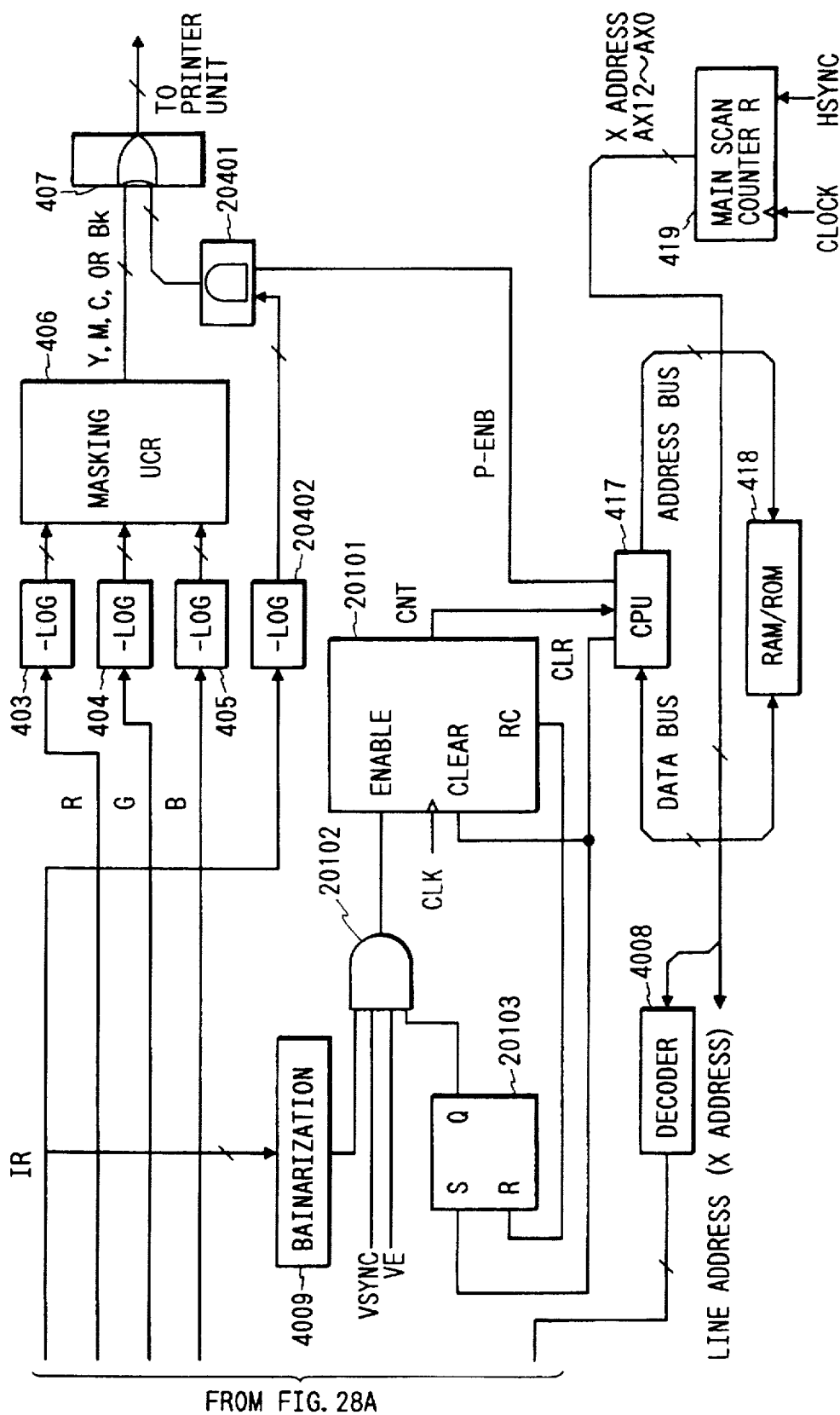

NON-VISUALIZED INFORMATION RECORDING MEDIUM AND APPARATUS FOR DETECTING THE SAME

This application is a continuation of application Ser. No. 08/562,778, filed Nov. 27, 1995, which is a continuation of application Ser. No. 08/140,566, filed Oct. 25, 1993, both now abandoned.

BACKGROUND OF THE INVENTION

1. Field of the Invention

The present invention relates to a medium, on which non-visualized information has been recorded, and an apparatus for detecting and making use of the same. (Throughout the specification and claims, the term "non-visualized" is used to mean "not visible to the naked eye.")

2. Related Background Art

In recent years there is a great risk of copying images, copying of which is prohibited, as a result of the trend of improvement in the performance of copying machines and the like. Therefore, there is a necessity of discriminating whether or not a given image has been made by copying or is an original. Further, the copying of such a document must be deleted, but if at all possible, prevented. At present, there have been suggested the following counterfeit prevention methods: a marking method using ultraviolet pigment of a type excited by ultraviolet rays, a method using a diffraction phenomenon such as holography, a method in which a magnetic material is applied so as to be detected by a magnetic head, a method using color change by means of photo-chromism, and a method in which a specific image is distinguished by means of image recognition techniques.

However, the method using the ultraviolet pigment of the type excited by ultraviolet encounters a problem in that a countermeasure can be taken, because the ultraviolet pigment can easily be detected by an ultraviolet-ray emitting means, such as a black lamp. Further, a necessity of providing an exclusive ultraviolet-ray light source makes the optical system complicated. The method using a diffraction phenomenon such as a hologram has a problem in that the cost cannot be reduced, because a mark must be formed on the original. The method in which the magnetic material is applied, involves a necessity of bringing the original into contact with the magnetic head in a hermetic manner. Therefore, a problem arises in this case in that the apparatus structure becomes too complicated. The method using photo-chromism suffers from a problem in that the photo-chromic compound is unstable. The image recognition method must use a great quantity of data to recognize all the various original documents to be protected, resulting in a heavy apparatus load and impossibility in cutting the cost.

In order to overcome the foregoing problems, a method using near infrared fluorescent light has been suggested which enables a light emission diode exhibiting a long life to be used, permitting the influence of contamination ti be eliminated (see Japanese Patent Laid-Open Appln. No. 51-88300). However, a light emission diode or a photo-diode capable of sensing long wavelengths must be used, causing a problem to arise in that the apparatus structure becomes too complicated.

SUMMARY OF THE INVENTION

Accordingly, an object of the present invention is to provide a mark having non-visualized information recorded thereon and an apparatus for detecting and using the mark with which specific images can be cheaply and assuredly discriminated.

In order to achieve the foregoing object, according to an aspect of the present invention, there is provided a non-visualized information recording medium comprising: an identification mark formed by an ink containing a plurality of fluorescent coloring materials or fluorescent pigments, each of which has a fluorescent wave length in a near infrared region, and which have absorption spectrums having the maximum wavelengths that do not overlap each other.

According to another aspect of the present invention, there is provided an apparatus for judging a specific document comprising: reading means for reading fluorescent information except for visible light information from an original document on which an identification mark formed by an ink containing a plurality of fluorescent coloring materials or fluorescent pigments, each of which has a fluorescent wave length in a near infrared region, and which have absorption spectrums having the maximum wave lengths that do not overlap each other; and judging means for judging whether or not the original document read by the reading means is a specific document.

By using a plurality of fluorescent materials or the pigments having the substantially the same fluorescent wave lengths in the near infrared region and having the different absorption wave lengths as the mark formed by the recorded non-visualized information as described above, the mark can be reproduced and utilized by using a light source, such as a halogen lamp, a metal halide lamp, a xenon lamp or a fluorescent lamp, having continued spectrum or a plurality of bright lines in a range from the visual region to the infrared region while preventing a visual detection.

Other and further objects, features and advantages of the invention will be apparent more fully from the following description.

BRIEF DESCRIPTION OF THE DRAWINGS

FIG. 3 illustrates an operation of detecting the copy-inhibited original document according to the second embodiment of the present invention;

FIG. 7 is comprised of FIGS. 7A and 7B showing block diagrams which illustrate a section for detecting the position of a fluorescent mark according to the second embodiment of the present invention;

FIGS. 12A, 12B and 12C are schematic views which illustrate the fluorescent pattern matching operation according to the second embodiment of the present invention;

FIG. 26 is a flow chart which illustrates control performed by a CPU according to the third embodiment of the present invention;

FIG. 28 is comprised of FIGS. 28A and 28B showing structural views which illustrate a signal processing portion according to the third embodiment;

DETAILED DESCRIPTION OF THE PREFERRED EMBODIMENTS

Figure 1:
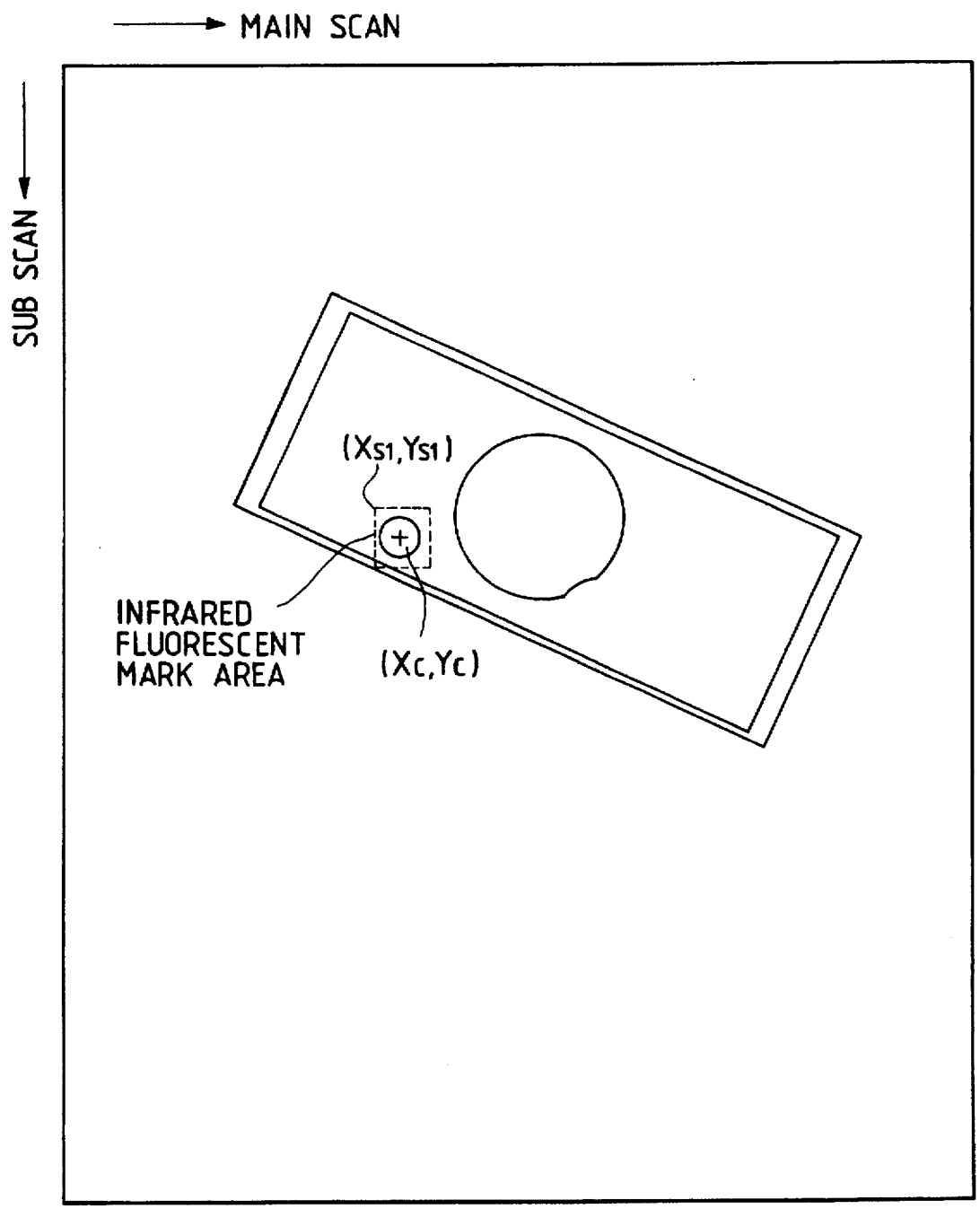
FIG. 1 illustrates a state where an identification mark of a copy-inhibited original document is detected according to a second embodiment of the present invention.

Preferred embodiments of the present invention will now be described.

The identification mark having thereon non-visualized information for inhibiting copying of copy-inhibited original document is recorded by dissolving or dispersing a fluorescent coloring material or pigment in a binder, the fluorescent coloring material or the pigment having the fluorescent wave length in near infrared ray region and by forming a predetermined pattern on the copy-inhibited original document by printing or the like. The fluorescent coloring material or the pigment may be a material having the peak of the fluorescent wave length. More preferably, it is preferable to use a fluorescent coloring material or pigment having the peak of the fluorescent wave length at 750 nm or more. Materials of a type having a peak of the fluorescent wave length at 700 nm or less can be visually detected. Therefore, a problem arises in the security cannot be protected. Materials of a type having a peak of the fluorescent wave length at 1100 nm or more encounter a fact that the detective sensitivity of a Si-type light detection device such as a CCD deteriorates. Therefore, there arises a problem in that the judgment of the identification mark cannot accurately be performed. It is further preferable to use a fluorescent coloring material or pigment of a type having the fluorescent wave length at 1000 nm or less. Since the near infrared ray fluorescent light can be detected if it is separated from exciting light, it is preferable that the near infrared fluorescent light and the exciting light have wave lengths which are considerably different from each other. Therefore, a near infrared ray fluorescent coloring material or pigment and the exciting wave length which can be used while being separated by 50 nm or more, more preferably 100 nm or more. The exciting wave length is selected depending upon the type of the light source and a spectrum filter.

As the infrared ray fluorescent coloring material, a xanthene, oxazine, thiazine, polymethine or styryl compound may be used. As an inorganic compound, a solid laser material containing a rare earth element may be used.

More specifically, any one of the following near infrared ray fluorescent coloring materials or pigments may be used. However, the materials of a type having the fluorescent light in the infrared ray region, exhibiting an excellent fluorescent quantum yield and significant weather resistance and light resistance may widely be used.

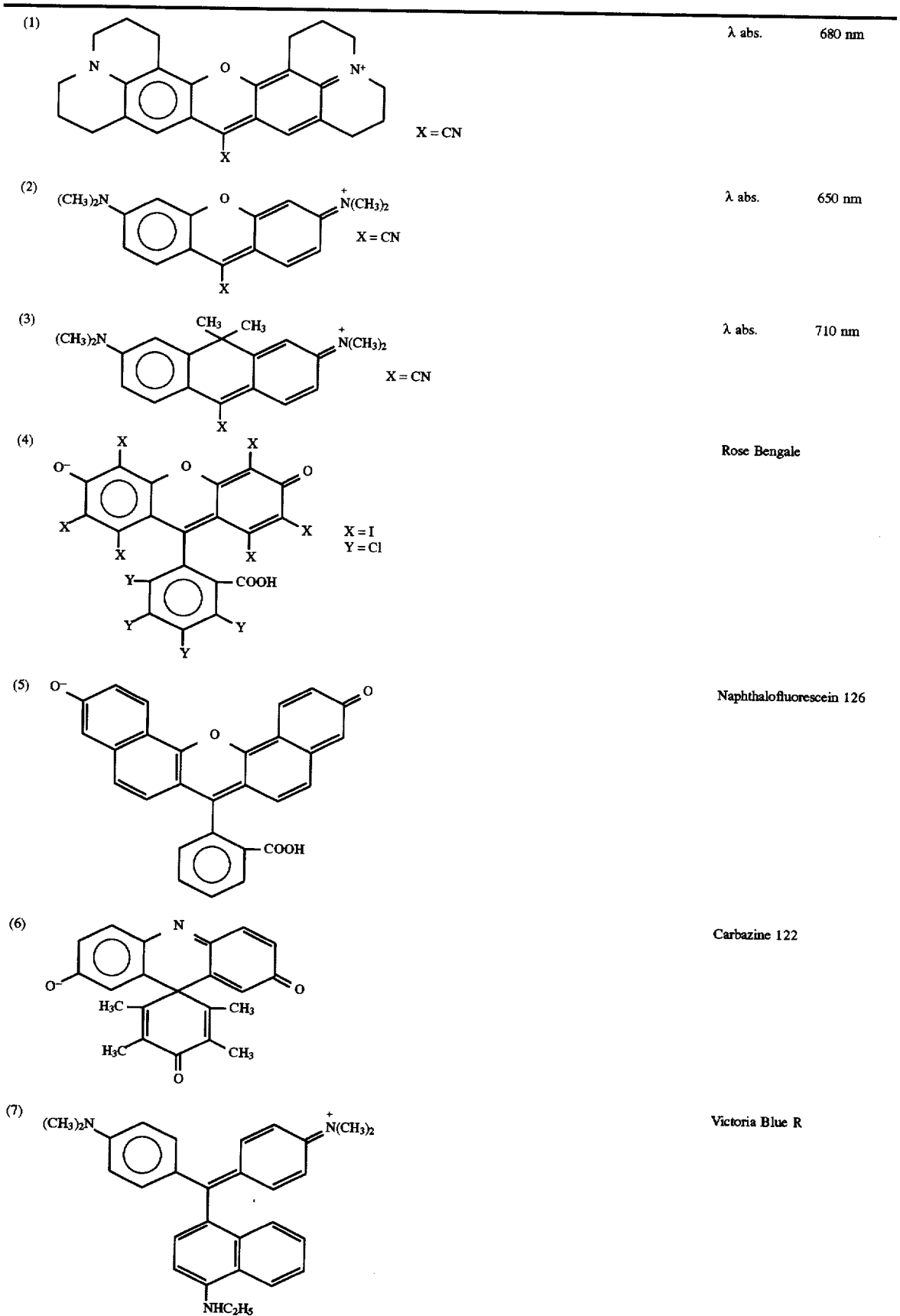

-continued

| | | |
|---|---|---|
| (8) [structure: diethylamino phenol oxazine with N(C2H5)2] | λ abs. | 650 nm |
| (9) [structure: methyl, ethylamino phenoxazine with naphthoquinone NHC2H5] | λ abs. | 620 nm |
| (10) [bis-benzoxazole cyanine, N-C2H5, I⁻, n=3] | λ abs. | 690 nm |
| (11) [bis-benzoxazole cyanine, N-CH3, I⁻, n=3] | λ abs. | 680 nm |
| (12) [bis-benzothiazole cyanine, N-C2H5, I⁻, n=2 and n=3] | λ abs. / λ abs. | 650 nm / 760 nm |
| (13) [bis-indoline cyanine (CH3,CH3), N-CH3, I⁻, n=3] | λ abs. | 740 nm |
| (14) [bis-benz[e]indolium cyanine, N-CH3, ClO4⁻] | λ abs. | 780 nm |
| (15) [bis-benz[e]indolium cyanine, N-(CH2)4SO3Na / (CH2)4SO3⁻] | λ abs. | 790 nm |
| (16) [bis-benz[e]indolium cyclopentene-bridged cyanine with piperazine-N-COOC2H5, N-(CH2)3SO3H · N(C2H5)3 / (CH2)3SO3⁻] | λ abs. | 745 nm |

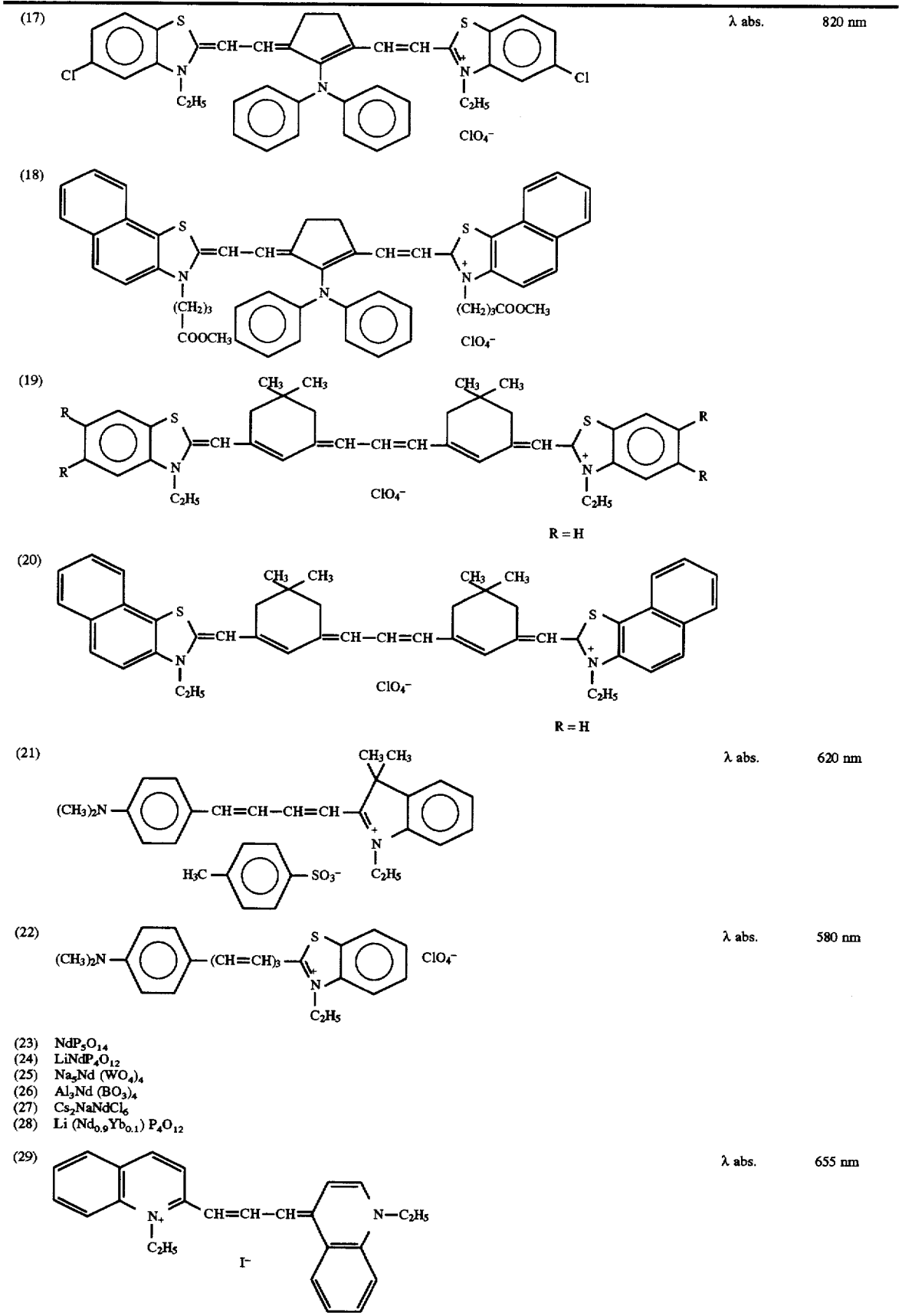

| | | |
|---|---|---|
| (30) 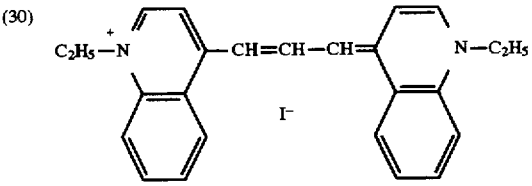 | λ abs. | 700 nm |
| (31) 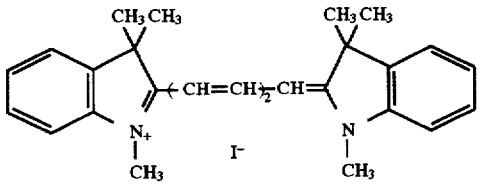 | λ abs. | 640 nm |
| (32) 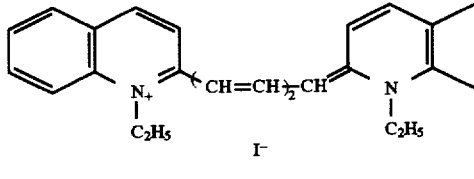 | λ abs. | 705 nm |
| (33) 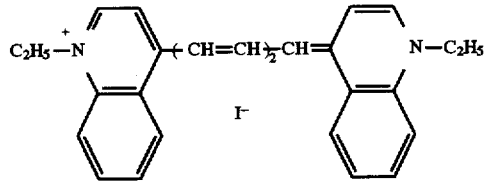 | λ abs. | 810 nm |
| (34) 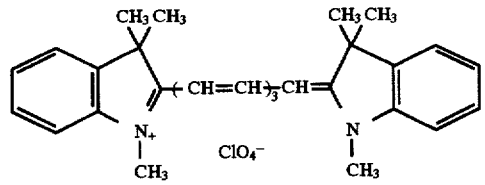 | λ abs. | 740 nm |
| (35) 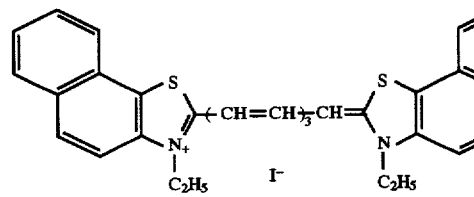 | λ abs. | 790 nm |
| (36) 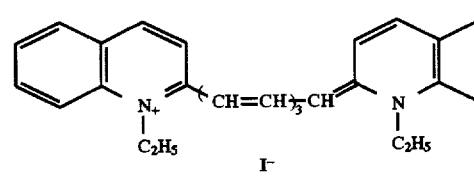 | λ abs. | 820 nm |
| (37) 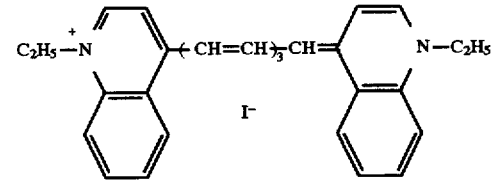 | λ abs. | 930 nm |

| | | |
|---|---|---|
| (38) 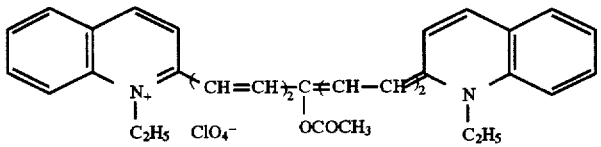 | λ abs. | 930 nm |
| (39) 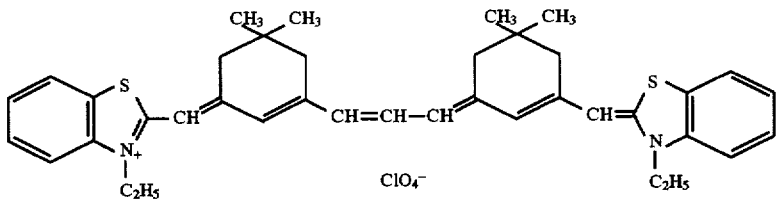 | λ abs. | 1010 nm |
| (40) 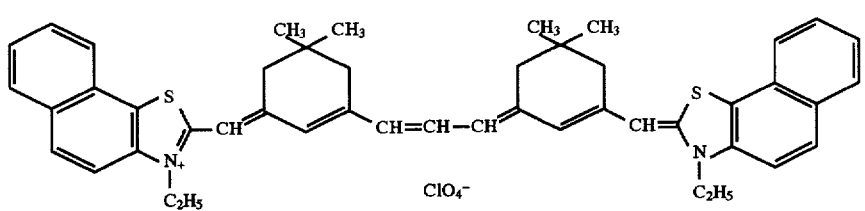 | λ abs. | 1050 nm |
| (41) 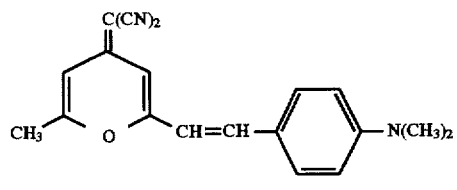 | λ abs. | 470 nm |
| (42) 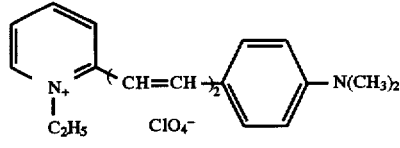 | λ abs. | 480 nm |
| (43) 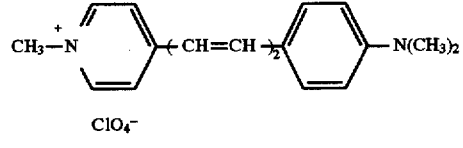 | λ abs. | 495 nm |
| (44) 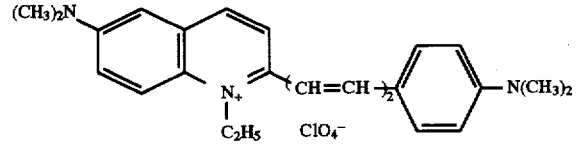 | λ abs. | 540 nm |
| (45) 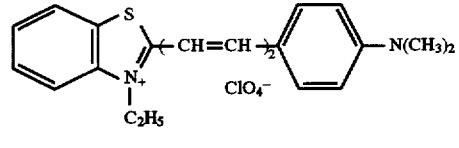 | λ abs. | 570 nm |
| (46) 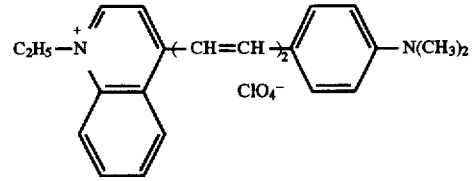 | λ abs. | 570 nm |

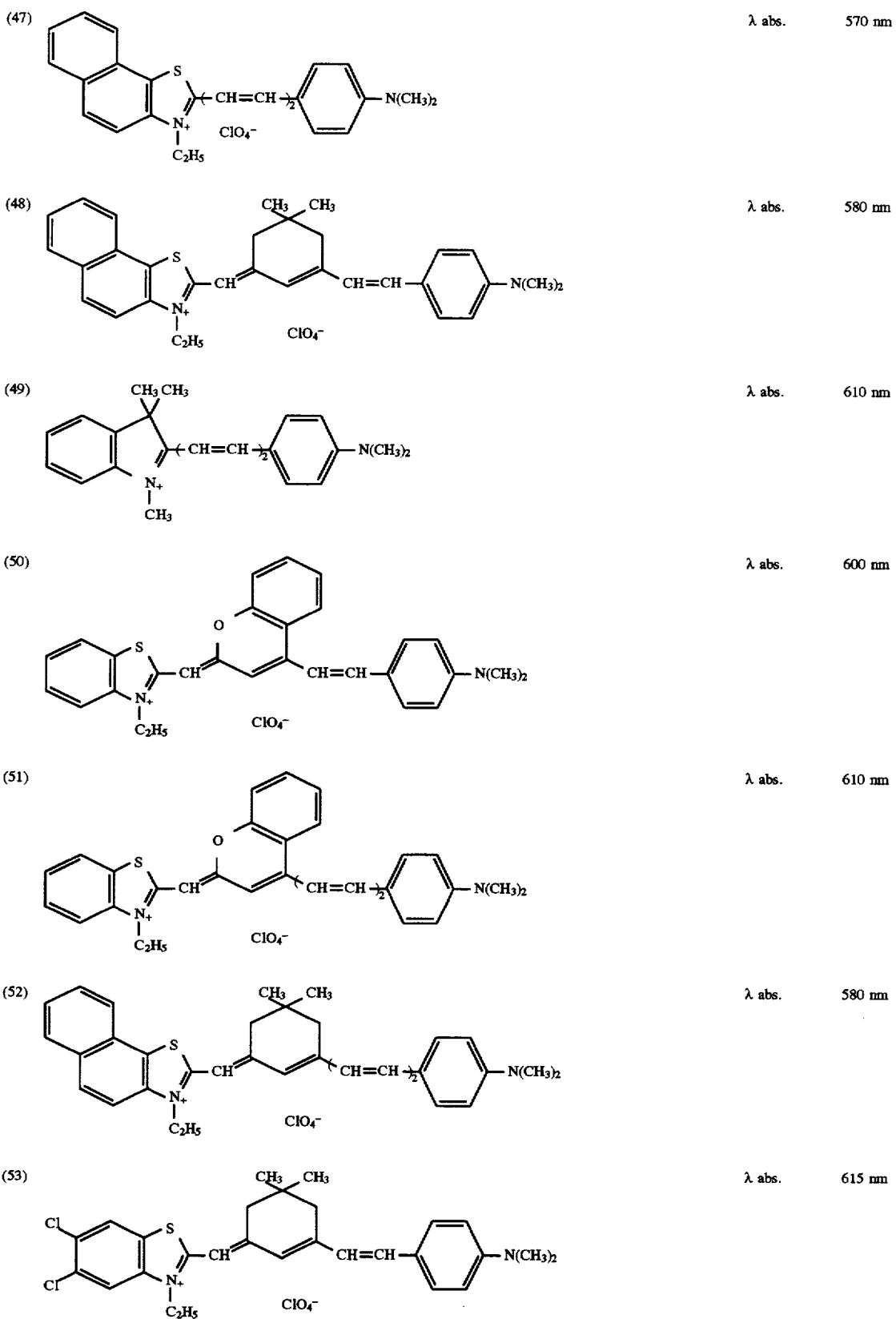

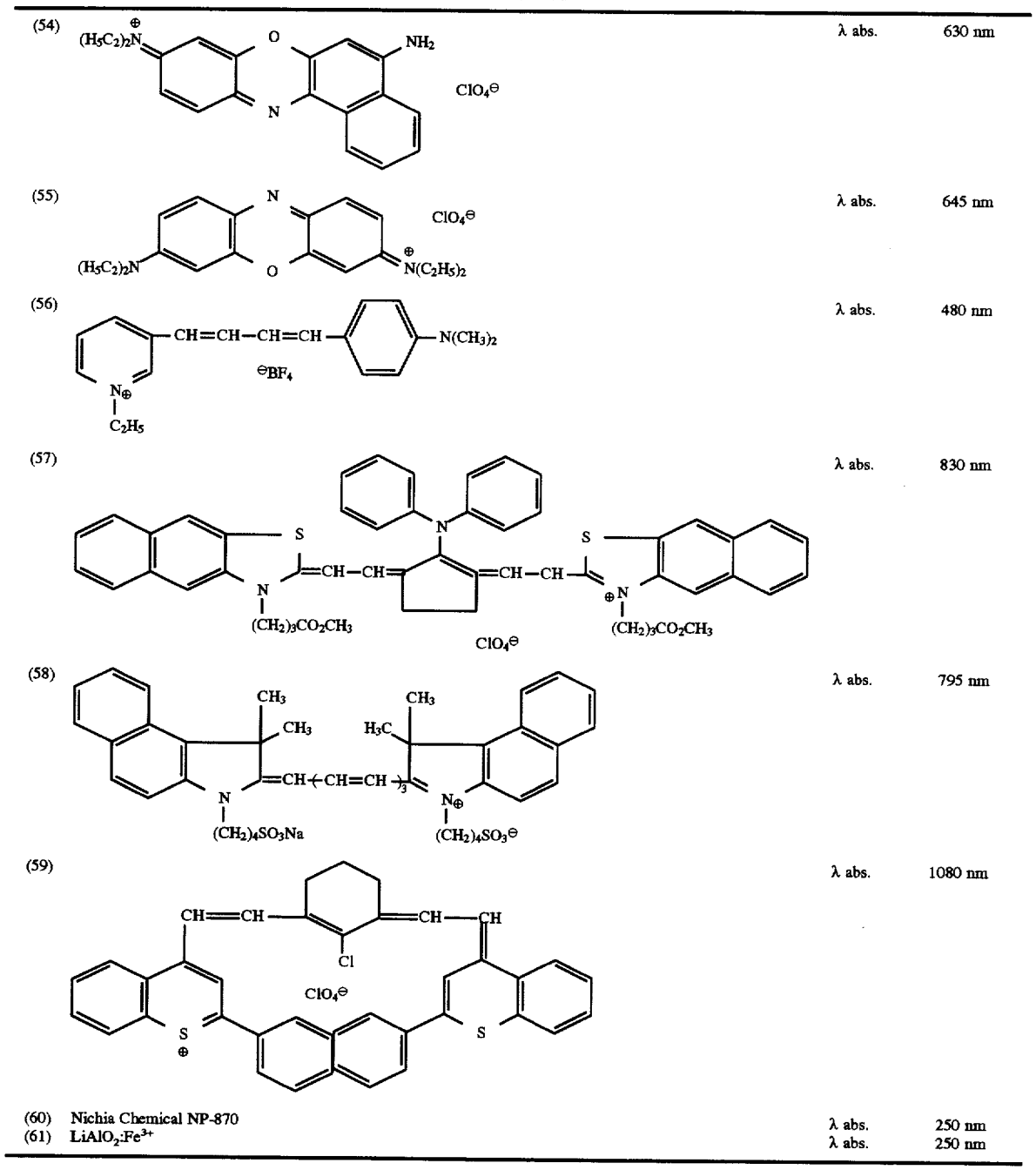

As the resin for the binder for use in the near infrared ray fluorescent coloring material or pigment, any one of a material may be used which is selected from a group consisting of a urea resin, a melamine resin, and alkyd resin, an acrylic resin, a vinyl chloride resin, an aromatic sulfonamide resin, a benzoguanamine resin or their copolymers. By using an ultraviolet ray absorber or an oxidation inhibitor together with the resin, the weather resistance can be improved. The resin can be manufactured by a massive resin pulverization method, an emulsion polymerization method or a resin deposition method or the like.

The material obtained by dispersion and mixing the near infrared ray fluorescent coloring material or pigment into the binder may be used while being combined with a usual coloring material or pigment. It is preferable in this case that the usual coloring material or pigment, which is used together, does not absorb the exciting wave length of the near infrared ray fluorescent coloring material or pigment. If the exciting wave length of the near infrared ray fluorescent coloring material or pigment is not present in the visual light region, covering of it with a usual coloring material or pigment or white pigment will improve the security protection ability of the copy inhibition function.

The quantity of the fluorescent light obtainable from the near infrared ray fluorescent coloring material or pigment is determined depending upon the intensity of exciting light, the absorbance of the exciting light or the yield of the fluorescent quantum. The intensity of the exciting light cannot easily be improved in a case where a usual light source is used. If the absorbance of the exciting light has been raised, there arises a problem in that the intensity of the fluorescent light easily deteriorates because of the deflection of the density of the fluorescent light. In order to obtain further satisfactory fluorescent light intensity in terms of overcoming the foregoing problems, a fact was found that causing fluorescent light beams respectively having substantially the same wave lengths to be generated in the near infrared ray region are generated and use of a plurality of the near infrared ray fluorescent coloring materials or pigments having different absorbance wave lengths are significantly effective. In particular, use of a halogen lamp, a xenon lamp or a metal halide lamp or the like as the light source enabled an excellent intensity of the fluorescent light to be obtained.

The longest wave lengths of the exciting spectrums of the plural near infrared ray fluorescent coloring materials or the pigments must be different from each other. More preferably the near infrared ray fluorescent coloring material or the pigment is employed to have the longest wave lengths of the exciting spectrums which are different from one another by 50 nm or longer. As a result, the density deletion of the fluorescent light can be prevented, causing the exciting light to be effectively absorbed. Therefore, the wave length conversion can be efficiently be performed.

Further preferred embodiments will now be described.

<First Embodiment>

Figure 32A:
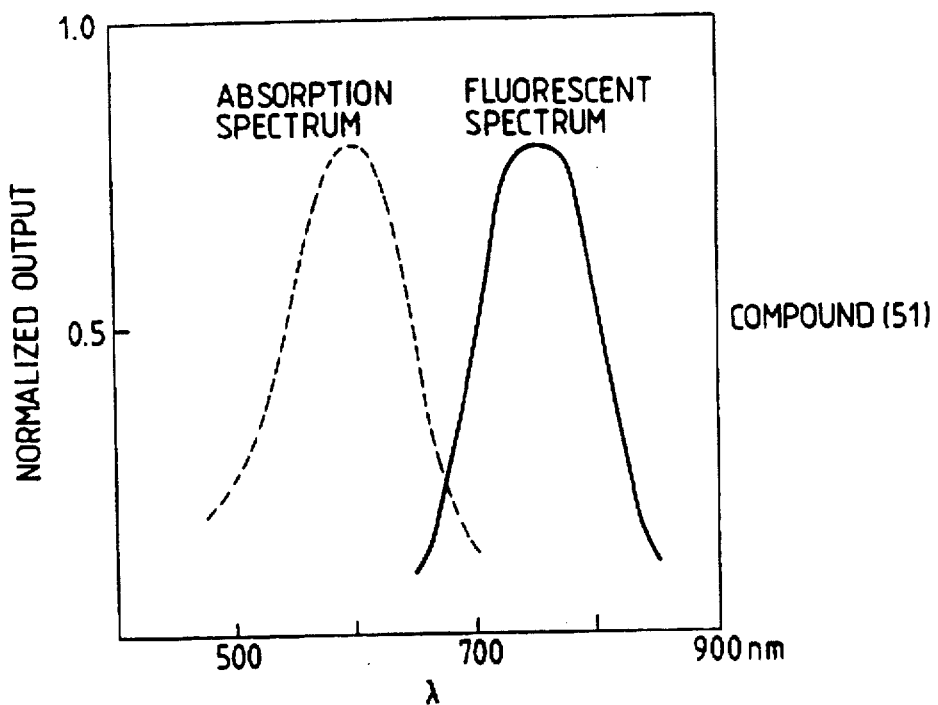
FIGS. 32A and 32B illustrate absorption spectrum and fluorescent spectrum of fluorescent pigment for use in the first embodiment of the present invention.
Figure 32B:
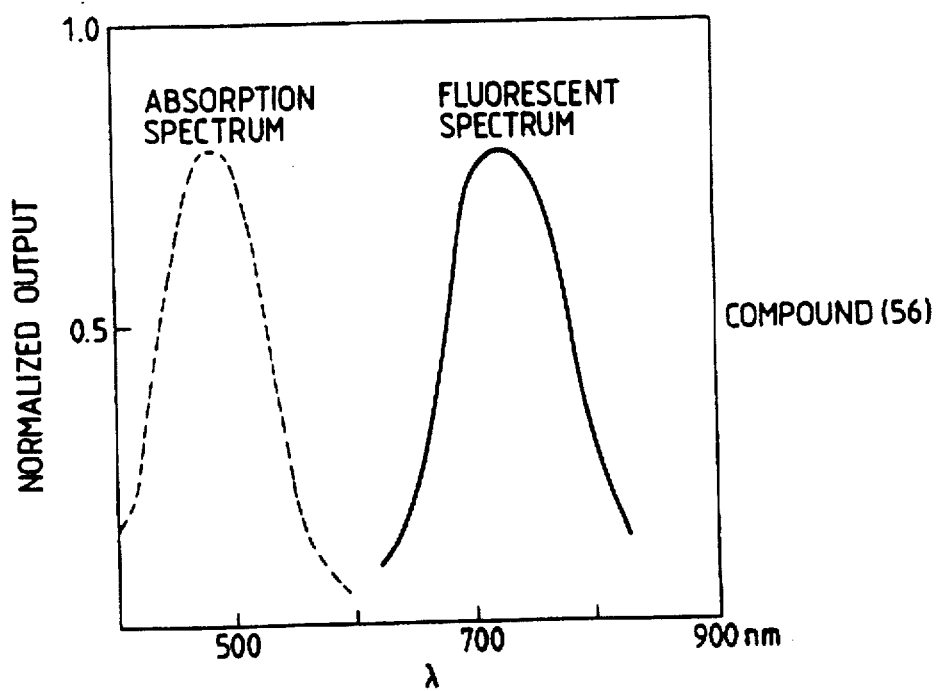

A DMF solution obtained by dissolving 0.05 part by weight of Compound (51)(NB-404 manufactured by Nihon Kanko Shikiso) and 0.05 part by weight of Compound (56)(Pyridine 1 manufactured by E.K) in 100 parts by weight of polyacrylnitryl (3914 manufactured by Polyscience) was applied to coating-applied paper to have a dry thickness of 10 μm. As a result, a non-visualized information recording medium was manufactured (the absorbance spectrum and the fluorescent spectrum of a sample made by applying the medium on a glass plate are shown in FIGS. 32A and 32B).

The foregoing medium was irradiated with halogen light emitted from a halogen lamp (150 W manufactured by Ushio Denki) having, thereon, a filter which does not allow light longer than 690 nm or longer to pass through. Then, a PIN photo-diode (PD45PI manufactured by Sharp) having a filter, which does not allow to light longer than 700 nm or shorter to pass through, was used to perform detection. A satisfactory S/N ratio of 10 or higher was realized.

(Comparative Example 1)

A recording medium was manufactured similar to the foregoing embodiment except for a DMF solution obtained by dissolving compound (59) in polyacryl nitril. Under the similar conditions, the measurement was performed, resulting in an S/N ratio of 2 or lower.

(Comparative Example 2)

A DMF solution obtained by dissolving 0.05 part by weight of Compound (51) and 0.05 part by weight of Compound (49)(NK-2782 manufactured by Nihon Kanko Shikiso and having the maximum absorbance wave length 610 nm) in 100 parts by weight of polyacrylnitril (3914 manufactured by Polyscience) was applied to coating-applied paper to have a dry thickness of 10 μm so that recording medium was manufactured. Under the similar conditions, the measurement was performed, resulting in an S/N ratio of 3 or lower.

<Second Embodiment>

In second to fourth embodiments, an apparatus for detecting the non-visualized recording medium according to the first embodiment will be described.

Although a copying machine will now be described as an applicable example of the present invention, the present invention is not limited to this. It should be understand that the present invention may, of course, be applied to a variety of apparatuses such as an image scanner connected to a computer.

Figure 2:
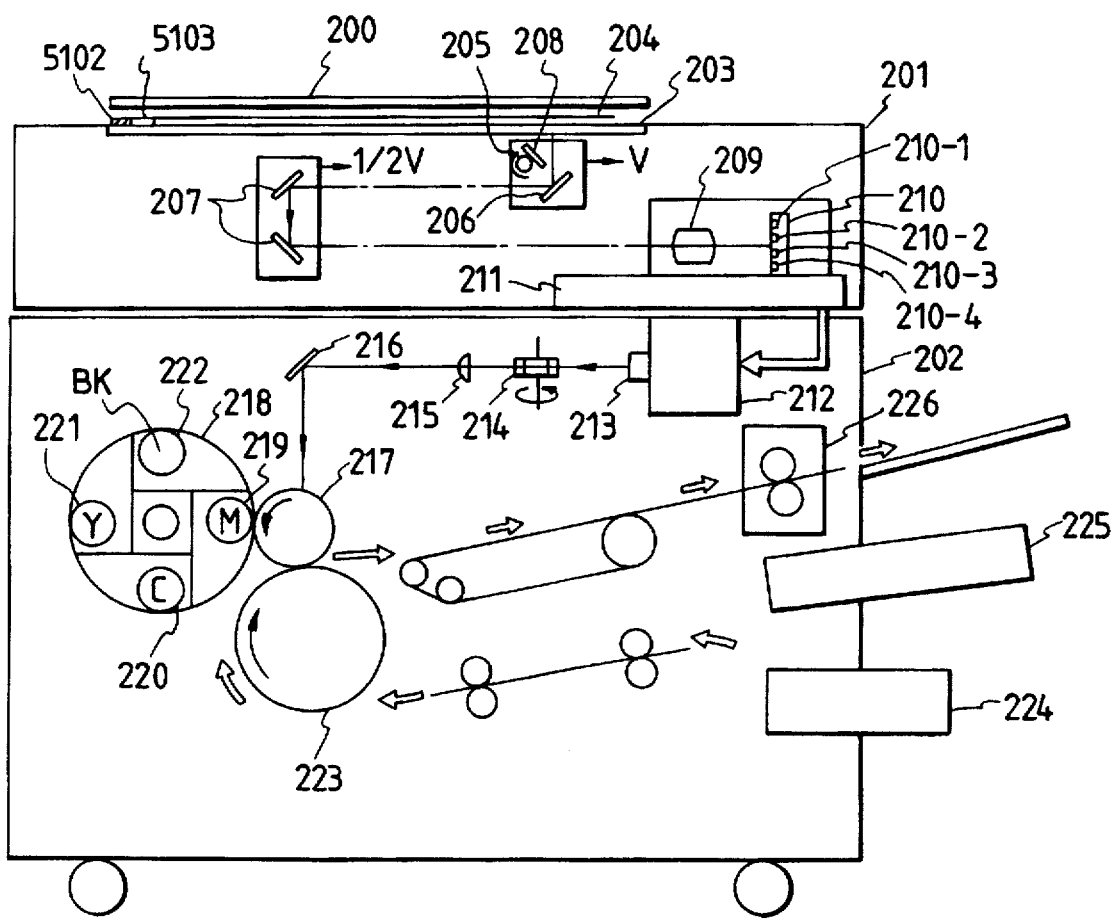
FIG. 2 is a structural view which illustrates a color copying apparatus embodying the present invention.

FIG. 2 illustrates the shape of the apparatus according to a second embodiment of the present invention.

Referring to FIG. 2, reference numeral 201 represents an image sensor portion which reads the image of an original document, converts the image into digital signals and subjects the obtained signals into a digital signal process. Reference numeral 202 represents a printer portion which forms, on a paper sheet, a full color image corresponding to the original document read by the image scanner 201.

In the image scanner portion 201, reference numeral 200 represents a thick plate having a mirror surface. An original document 204 placed on an original-document retaining frame glass (hereinafter called a "platen") 203 is irradiated with light emitted from a halogen lamp 205 and passed through an infrared-ray cutting filter 208 for removing infrared rays. Reference numeral 227 represents a reflector for effectively irradiating the original document 204 with light emitted from the halogen lamp 205. Light reflected from the original document is introduced into the mirrors 206 and 207, causing an image to be formed on 4-line CCD sensors (hereinafter called "CCDs") 210 by a lens 209. The respective line sensors 210 generate full color red (R), green (G), blue (B) information components based on visible light and an infrared-ray (IR) information component based on light having the wave length outside the visible region to transmit the components to the signal processing portion 211. The elements 205 and 206 are mechanically moved in the vertical direction (hereinafter called a "sub-scanning direction") with respect to the electrical scanning direction (hereinafter called a "main scanning direction") at speed v. Further, the element 207 is also mechanically moved at speed 1/2 v in the same direction. As a result, the entire surface of the original document 204 on the platen 203 is scanned.

Figure 23:
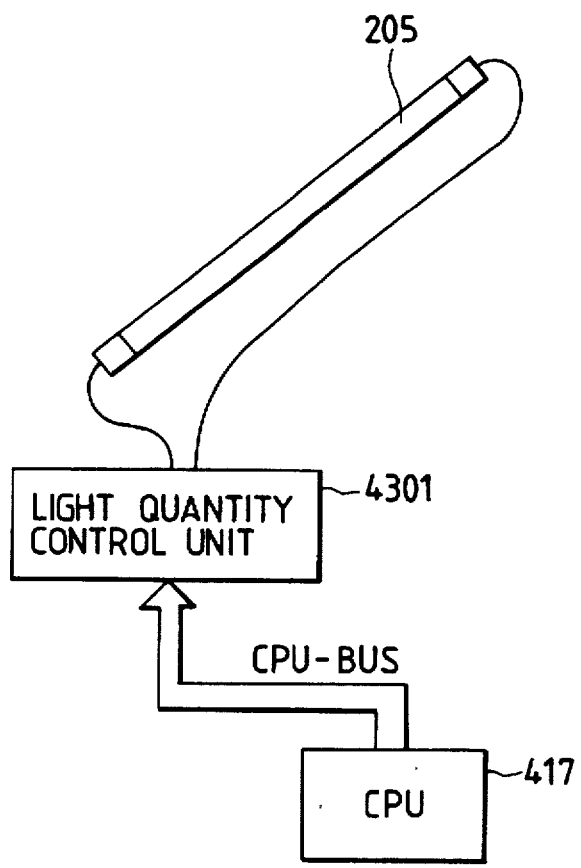
FIG. 23 illustrates a block for controlling the light quantity of an original document irradiation lamp according to the second embodiment of the present invention.
Figure 31:
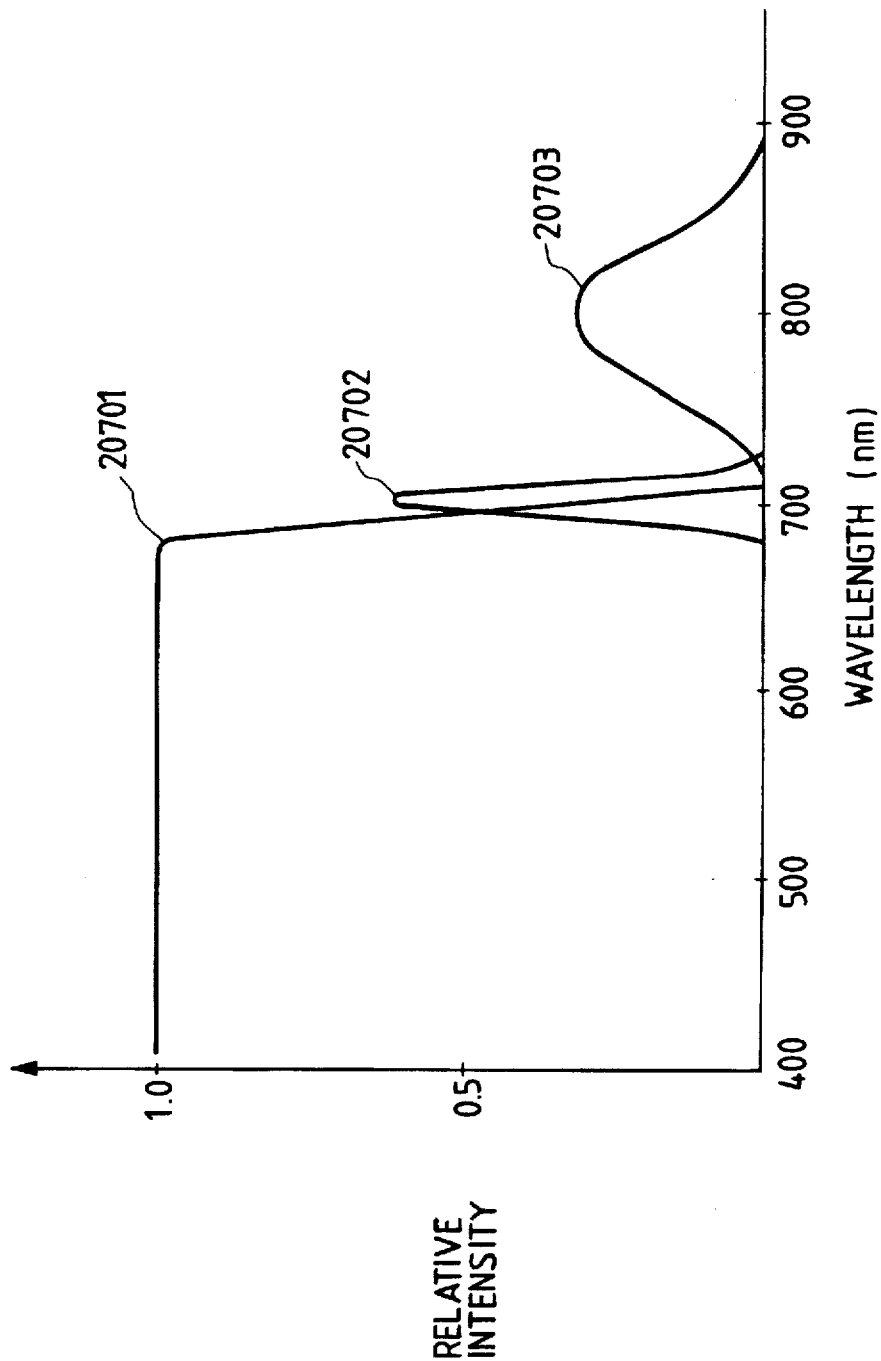
FIG. 31 illustrates the characteristics of a standard white plate for use in the second embodiment of the present invention.

Reference numeral 5102 represents a standard white plate for use to generate correction data (shading data) for correcting scatters (scatters of the photoelectrical conversion characteristics for respective devices of the line sensors) of data items read by red, green and blue line sensors 210-2 to 210-4 for respective pixels. The standard white plate 5102 is substantially in while with respect to visible light as shown in FIG. 31 (the characteristics of designated by a curve 20701). Reference numeral 5103 represents a fluorescent standard plate for use to correct scatter of data read by the IR line sensor 210-1. The fluorescent standard plate 5103 is equally applied with a fluorescent ink which generates fluorescent light having characteristics designated by a curve 20703 (see FIG. 31) when irradiated with exciting light having characteristics designated by a curve 20702 (see FIG. 31) which are substantially the same as fluorescent information to be detected as shown in FIG. 23.

In the signal processing portion 211, signals read by the sensors 210-1 to 210-4 are electrically processed to be decomposed to magenta (M), cyan (C), yellow (Y) and black (Bk) signals which are to be transmitted to a printer portion 202. One original-document scan (scan) performed by the image scanner portion 201 causes one of the M, C, Y and Bk components to the printer 202. Four times of scans of the original document is required to make one print (frame sequential image formation).

Plane-sequential M, C, Y and Bk image signals transmitted from the image scanner portion 201 are transmitted to a laser driver 212. The laser driver 212 modulates and operates a semiconductor laser 213 in response to the image signals in the respective colors. Laser light beams scan the surface of a photosensitive drum 217 by way of polygonal mirror 214, a f-θ lens 215 and a mirror 216.

Reference numeral 218 represents a rotative development unit comprising a magenta development unit 219, a cyan development unit 220, a yellow development unit 221 and a black development unit 222. The four development units alternately are brought into contact with the photosensitive drum 217 so that M, C, Y and Bk electrostatic latent images formed on the photo-sensitive drum 217 are developed by corresponding toner.

Reference numeral 223 represents a transfer drum around which the paper sheet supplied from a paper sheet cassette 224 or 225 to transfer the toner image developed on the photosensitive drum 217 on to the paper sheet.

The M, C, Y and Bk colors are sequentially transferred as described above, and then the paper sheet passes through a fixing unit 226 before it is discharged.

Figure 13:
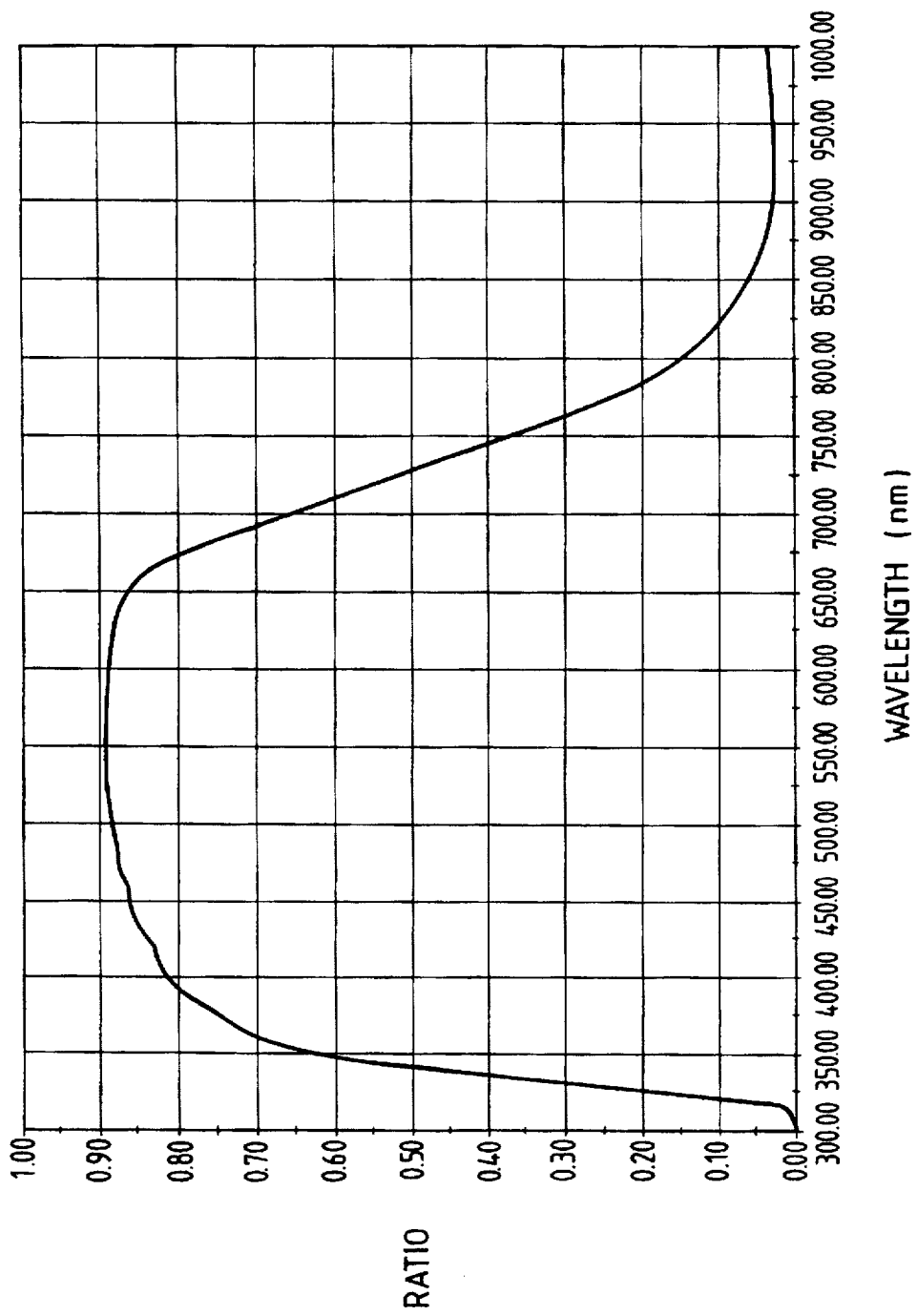
FIG. 13 illustrates spectrum characteristics of a filter disposed in the immediately rear of an original document irradiation lamp according to the second embodiment of the present invention.
Figure 14:
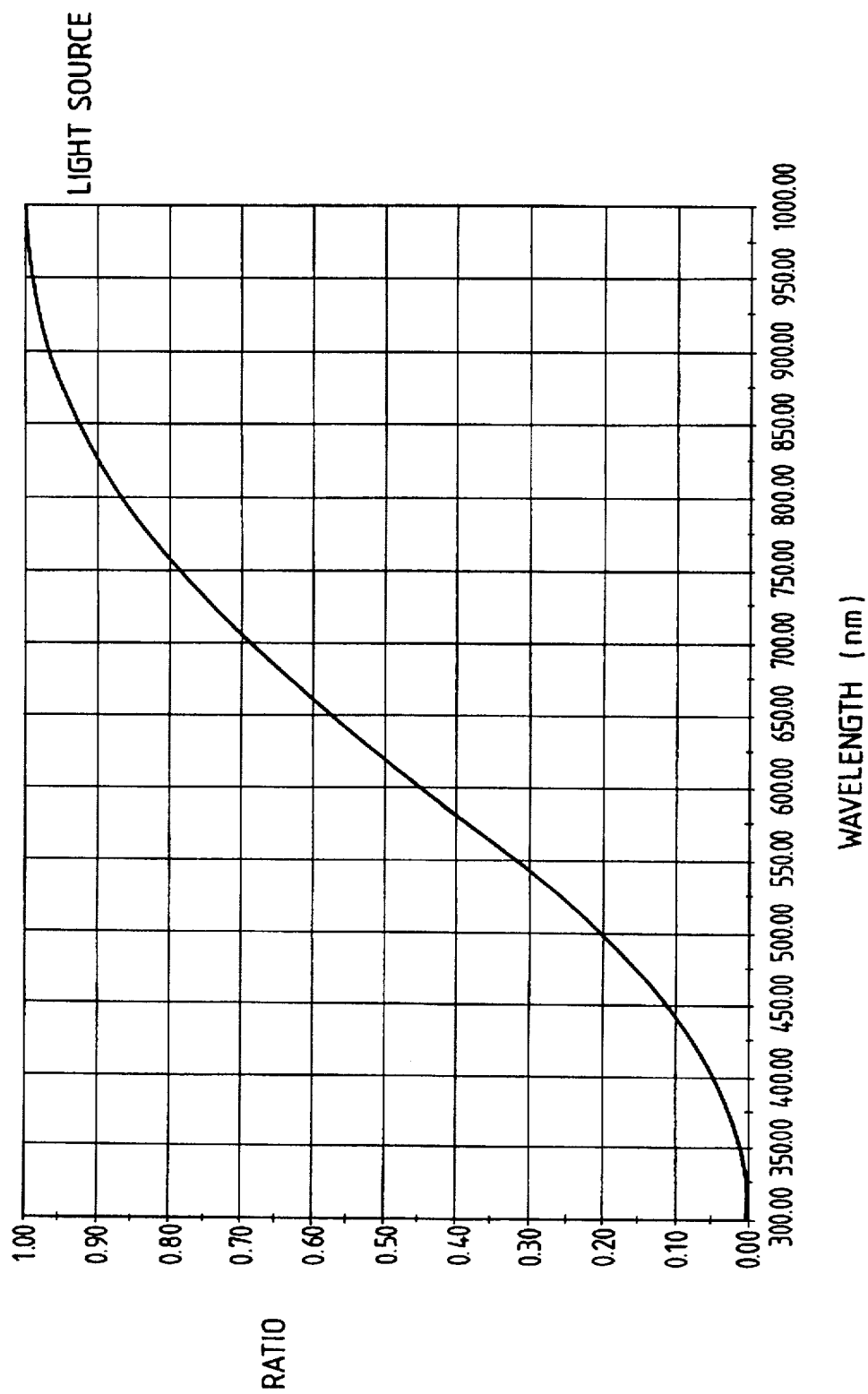
FIG. 14 illustrates spectrum characteristics of the original document irradiation lamp according to the second embodiment of the present invention.

FIG. 13 shows the spectrum characteristics of an infrared-ray cutting filter 208 disposed between the halogen lamp 205 for irradiating the original document and the platen glass 203. The infrared-ray cutting filter 208 cuts infrared rays having a spectrum characteristic of about 700 nm or longer among the infrared rays emitted from the halogen lamp 205 shown in FIG. 14.

The halogen lamp 205 is commonly used to read both visible information and infrared ray fluorescent information except for the visible information, the halogen lamp 205 being arranged to emit light having both irradiation wave length components. Also the reflector 227 is commonly used to read information items of the foregoing two types. By making the irradiation system to be used commonly, the necessity of using a plurality of independent irradiation system for reading respective information items. Therefore, irradiation light beams for use to read respective information items and having different wave length components can effectively be applied to the original document. As a result, the structure of the irradiation system of the apparatus can be simplified.

Figure 15A:
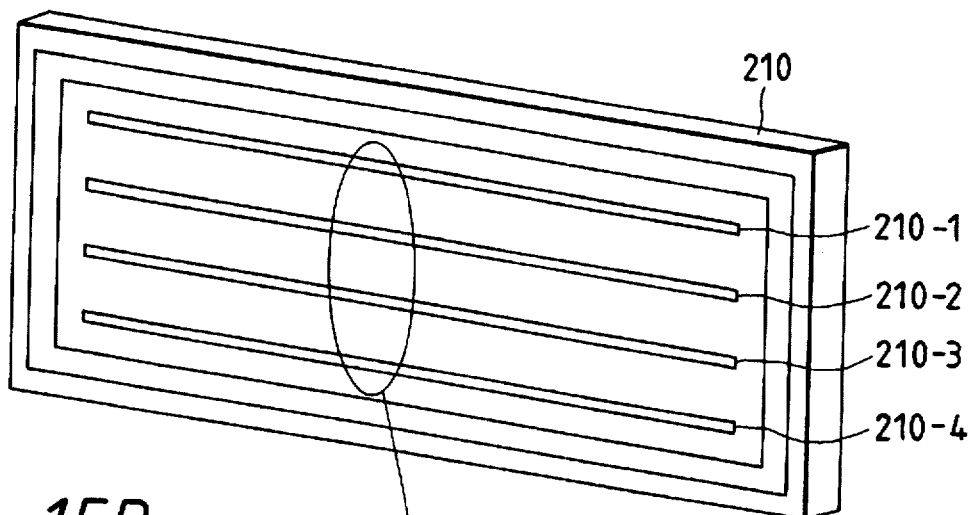
FIGS. 15A and 15B illustrate the structure of a CCD sensor according to the second embodiment of the present invention.
Figure 15B:
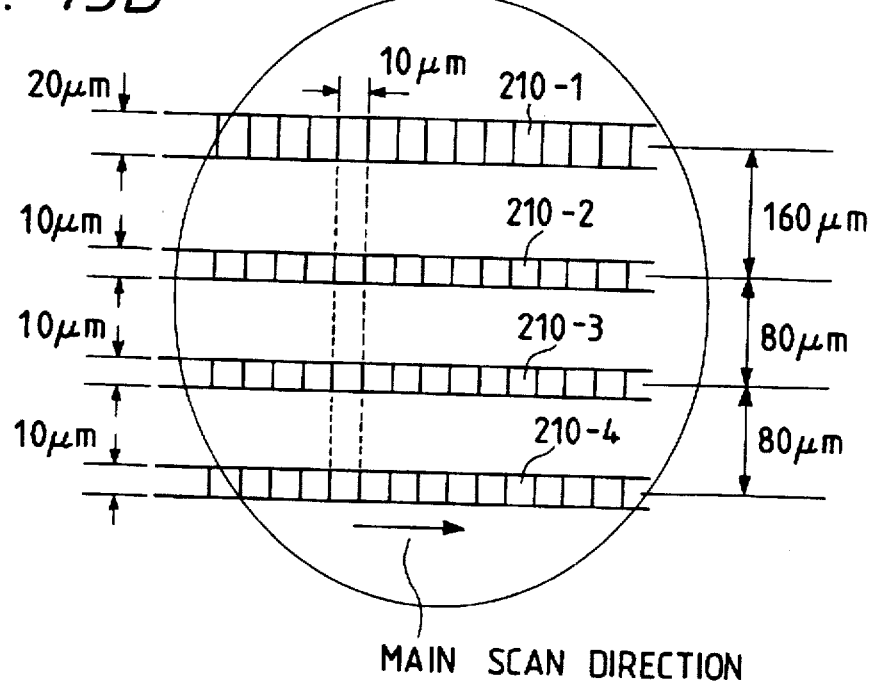

FIGS. 15A and 15B illustrate the structure of a CCD 210 for use in this embodiment.

Referring to FIG. 15A, reference numeral 210-1 represents the light-receiving device array (a CCD line sensor) for reading infrared ray (IR). Reference numerals 210-2, 210-3 and 210-4 respectively represent light-receiving device arrays (CCD line sensors) for reading R, G, B wave length components.

The four light receiving device arrays having the different optical characteristics are disposed in a monolithic manner on a silicon chip so that the IR, R, G and B line sensors are able to read the same line of the original document.

By using the CCD line sensors structured as described above, the optical systems, such as the lens, for forming the image of the original document on to the line sensor can be made commonly with respect to reading of visible light and reading of infrared rays. Therefore, the structure can be simplified.

Further, the accuracy in the optical adjustment for aligning the imaging position can be improved and its adjustment can also easily be performed. The structure of the CCD line sensor enables the deviation of the reading position with respect to visible light and light except for the visible light can be prevented.

FIG. 15B is an enlarged view which illustrates the light-receiving device array. Each sensor has a length of 10 μm per pixel in the main scanning direction. Each sensor has 5000 pixels in the main scanning direction (the line direction of the CCD 210) as to be capable of reading the shorter-side direction (297 mm) of an A3 original document at a resolving power of 400 dpi (dot per inch).

The line distance of each of the R, G and B sensors is 80 μm and respectively disposed away from each other by 8 lines in the sub-scanning direction (the direction in which the optical system is moved) at 400 lpi (line per inch).

The interval between the line of the IR sensors 210-1 and the R sensor 210-2 is determined to be 160 μm (16 lines) which is the twice of the other line intervals. By lengthening the interval between the line sensor for visible light and the line sensor for light except for the visible light as a described above, an effect can be obtained in that a filter can easily be fastened in a case where the line sensors are disposed on a silicon chip in the monolithic manner. Further, a problem to be experienced with the charge transfer portion due to the structure can be overcome as described later.

By continuously disposing the sensors 210-2 to 210-4 for reading visible light, the IR cut filter can easily be fastened.

The R, G and B sensors 210-2 to 210-4 have an aperture the size of which is 10 μm formed in the sub-scanning direction, while the IR sensor 210-1 has an aperture, the size of which is 20 μm which is twice the sub-scanning directional aperture. The reason for this is that the IR sensor 210-1 is enabled to read infrared fluorescent light. That is, the intensity of the fluorescent light is usually obtainable to a level about the half of that of exciting light. What is worse, the level sometimes is about 10% or less. Accordingly, this embodiment is arranged so that the light receiving area per pixel (per device) is enlarged in place of the improvement of the resolving power of the IR sensor 210-1 in the sub-scanning direction. As a result, a satisfactory dynamic range for an infrared reading signal is maintained.

Although this arrangement is made in such a manner that the signal dynamic range is maintained by lengthening the pixel length of the IR sensor 210-1 in the sub-scanning direction, the main scanning directional length of the pixel may be lengthened by falling the resolving power in the main scanning direction in place of the sub-scanning direction.

Each of the line sensors IR, R, G and B has an optical sensor on the surface thereof for the purpose of obtaining predetermined spectrum characteristics.

Figure 19:
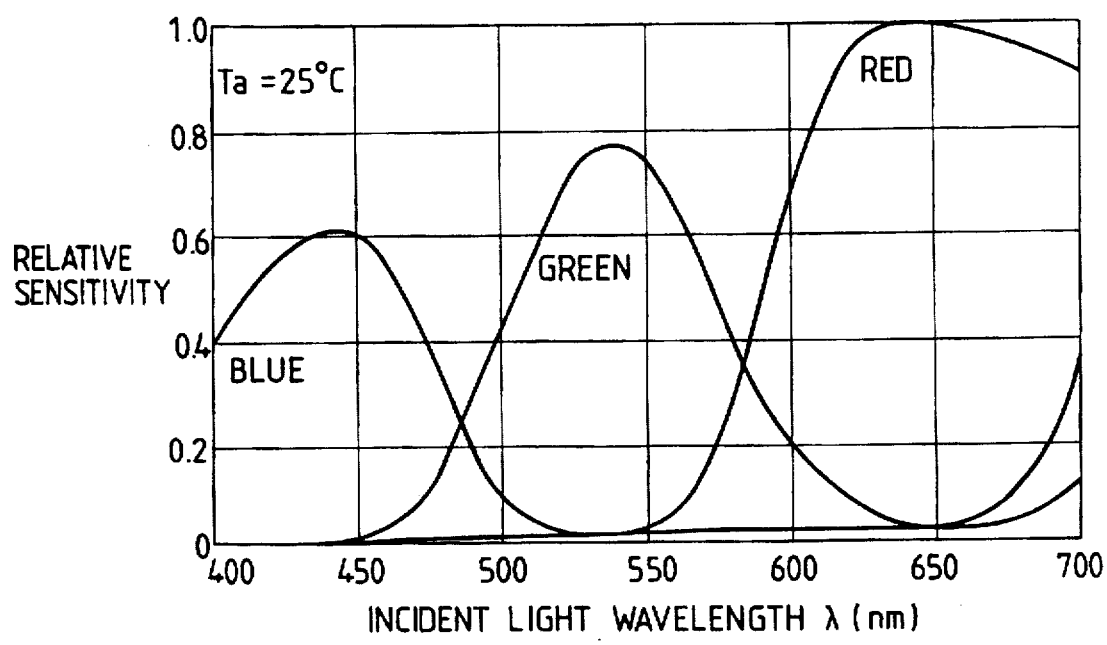
FIG. 19 illustrates the spectrum sensitivity characteristics of a visual line sensor according to the second embodiment of the present invention.
Figure 20:
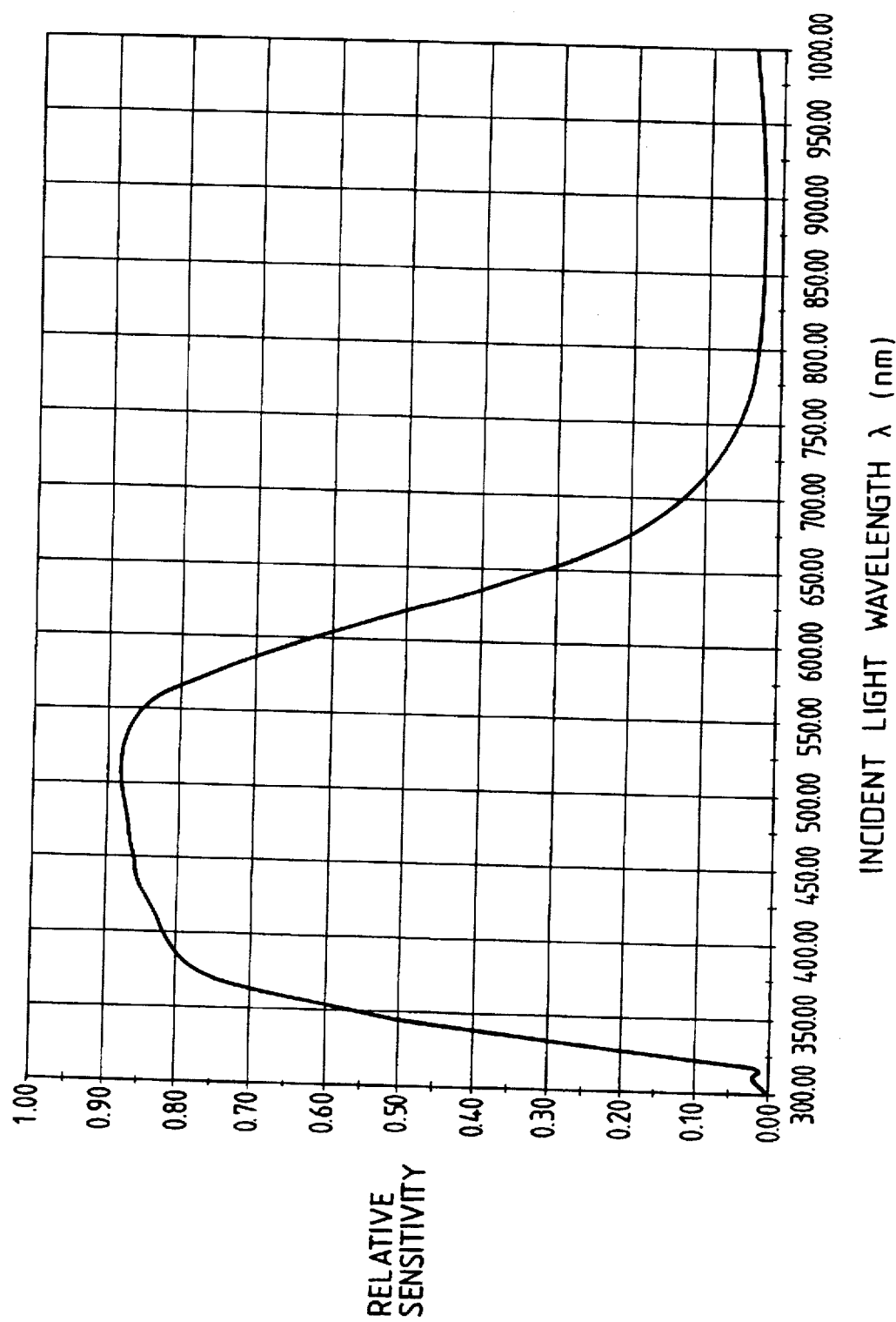
FIG. 20 illustrates the spectrum sensitivity characteristics of the visual line sensor according to the second embodiment of the present invention.

Referring to FIGS. 19 and 20, the spectrum characteristics of the R, G and B line sensors of the CCD 210 will now be described.

FIG. 19 shows the characteristics of the filters fastened to the conventional R, G and B line sensors. As can be seen from FIG. 19, each of the conventional R, G and B filters has sensitivity with respect of infrared rays of 700 nm or longer. The infrared-ray cutting filter having characteristics shown in FIG. 20 has been fastened to the lens 209. Since this embodiment must read the infrared component of light passed through the lens 209 by the IR sensor 210-1, the lens 209 cannot have the function of the infrared-ray cutting filter.

In order to eliminate the influence of infrared rays, the filters fastened to the R, G and B sensors are arranged to have the characteristics of each color shown in FIG. 19 and the characteristics for cutting infrared rays shown in FIG. 20.

Figure 16:
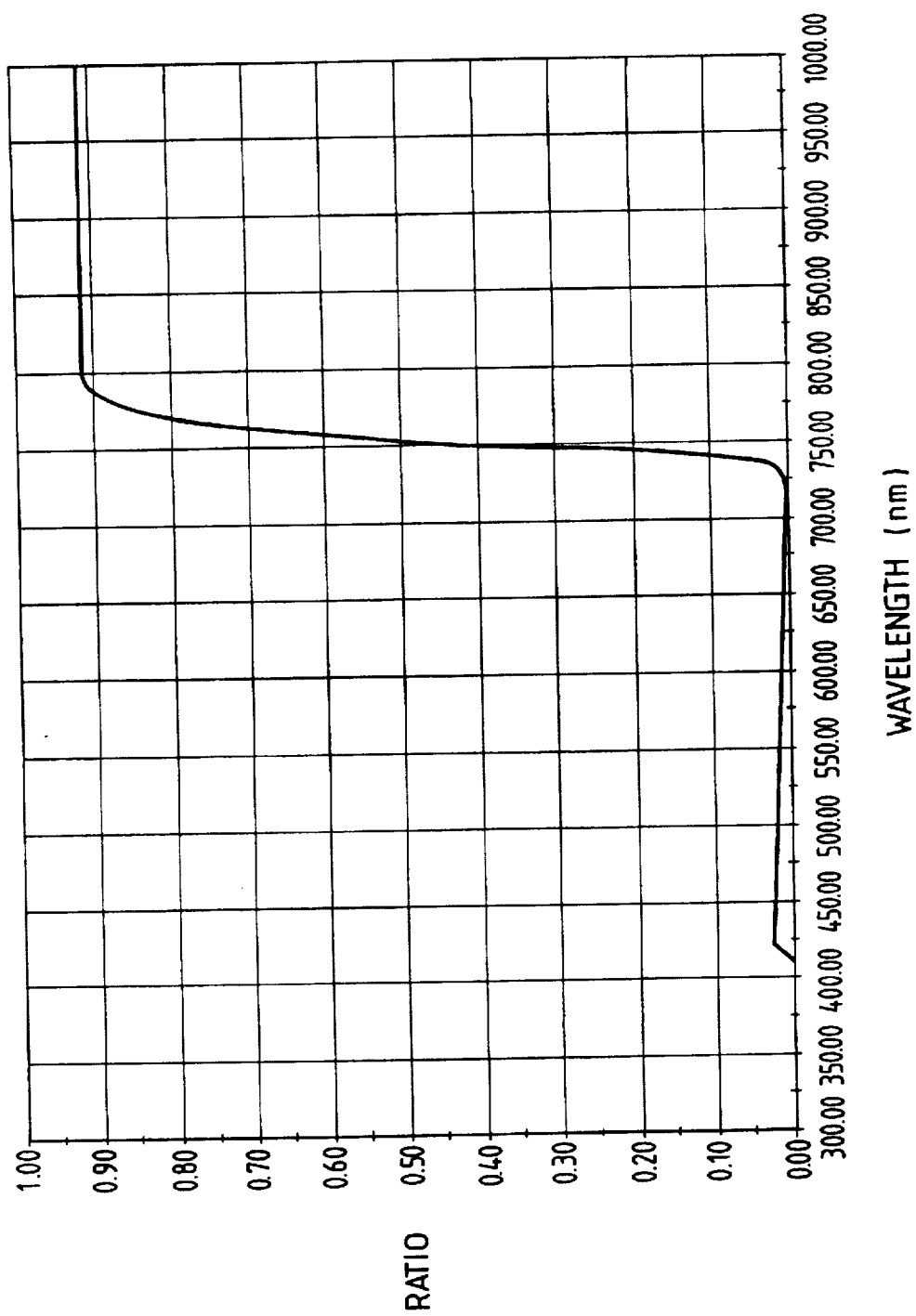
FIG. 16 illustrates the characteristics of an infrared information reading sensor according to the second embodiment of the present invention.

FIG. 16 shows the characteristics of the visible-ray cutting filter fastened to the IR sensor 210-1.

The filter is fastened to eliminate the visible light component made incident upon the IR sensor which reads the infrared fluorescent component.

Figure 17:
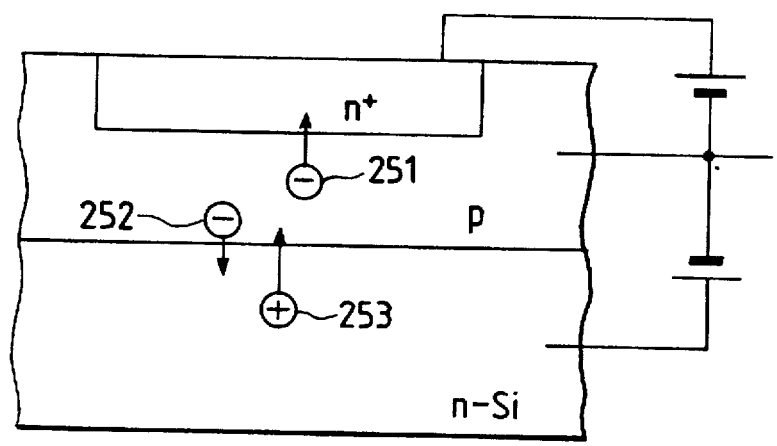
FIG. 17 is a schematic view which illustrates the photoelectric conversion performed by the CCD according to the second embodiment of the present invention.

FIG. 17 illustrates the structure of a photo-diode of the CCD. The photo-diode has an npn structure such that the upper np junction is inversely biased so that the photo-diode is formed. A carrier 251 generated in the upper portion of a p-layer is absorbed in the upper np junction portion as to be taken out as a signal.

Light, such as the infrared rays, inevitably generates a carrier 252 in a deep portion of the p-layer and a carrier 253 in a sub-straight n-layer. The carriers generated in the deep portions is, as illustrated, absorbed in the pn junction portion. Therefore, the carriers are not read as the signals.

Figure 18:
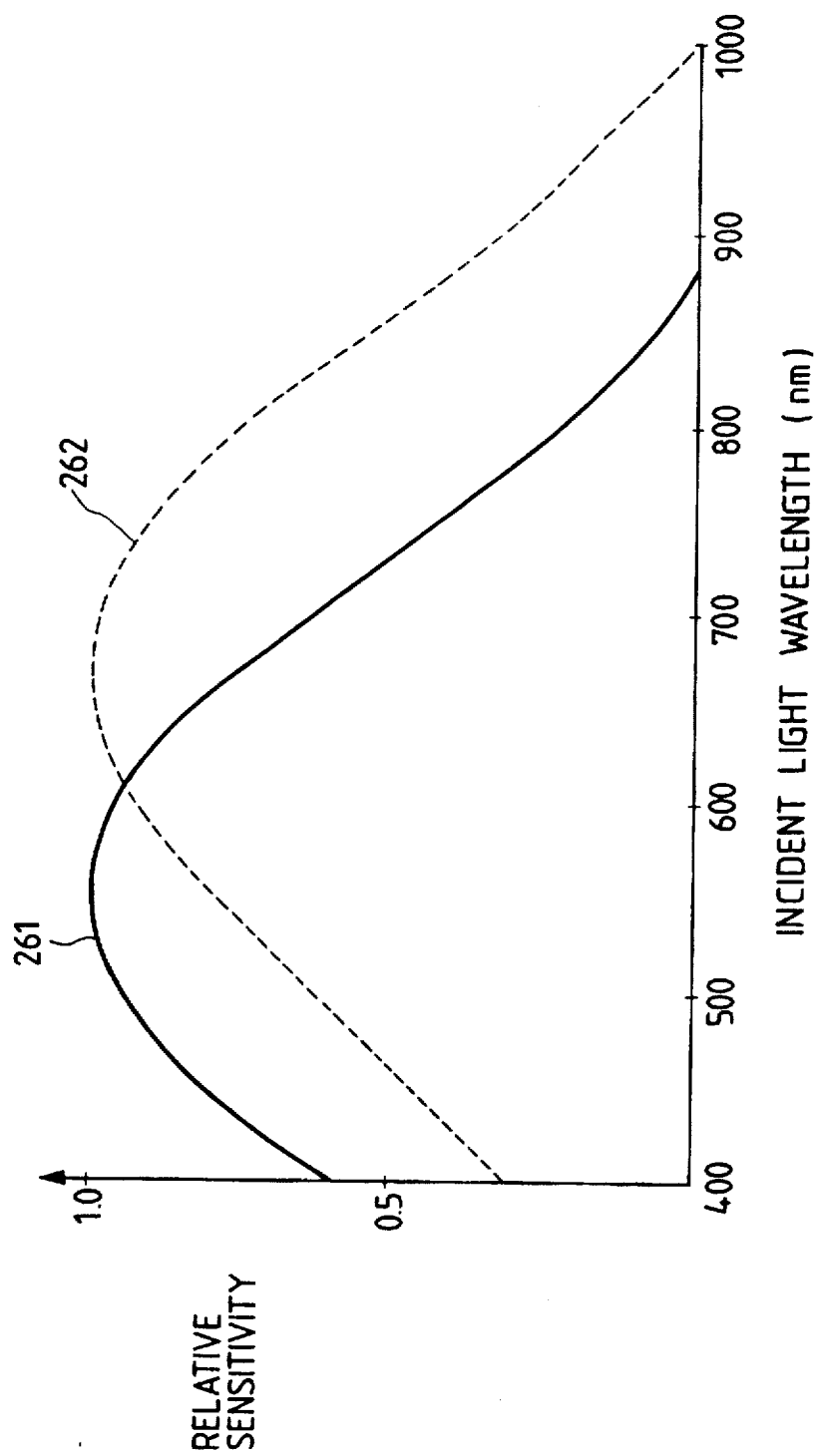
FIG. 18 illustrates the spectrum sensitivity characteristics of the CCD according to the second embodiment of the present invention.

Characteristics 261 designated by a continuous line shown in FIG. 18 are the spectrum characteristics of a usual CCD for visible rays. As designated, the sensitivity deteriorates by about 20% with respect to infrared rays of 800 nm while having its peak at 550 nm. The thickness of the p-layer of each of the R, G and B sensors having the characteristics 261 is about 1000 nm.

This embodiment has an arrangement to obtain sensitivity with respect to infrared rays by making the thickness of the p-layer of the sensor 210-1 of the CCD to be thicker than that of the R, G and B sensors 210-2 to 210-4 of the CCD. That is, the thickness of the p-layer of the IR sensor 210-1 is made to be about 1500 nm so that the sensitivity peak is present at the infrared rays having the wave length ranging from 700 nm to 800 nm. The spectrum characteristics of the IR sensor according to this embodiment is designated by a curve 262 shown in FIG. 18.

The reason why the interval between the IR sensor 210-1 and the R sensor 210-2 is to be the twice the sensor intervals between the other sensors is that the photo-diode and serial charge transfer portions formed on the both sides of the photo-diode must assuredly be separated from each other in terms of the structure. Further, the IR sensor 210-1 having a different structure, such as the different thickness of the light receiving layer, is disposed on the outside of the other sensors 210-2 to 210-4 so that the structure of the CCD is simplified.

By widening the line intervals, the interval between the charge transfer portion for the IR signal and that for the R signal is made to be wider than the interval between the charge transfer portion for the R signal and that for the G signal and the interval between the charge transfer portion for the G signal and that for the B signal. As a result, an influence of cross talk caused by the R signal of a relatively high signal level upon the infrared fluorescent read signal, which is a small signal can be eliminated significantly.

Since the IR sensor is disposed on the outside of the 4-line sensor, the cross talk caused from another signal can be eliminated satisfactorily.

In this embodiment, an example of the copy-inhibited original document is an original document, on which a mark similar to a red seal is printed on the original document as shown in FIG. 1 at a predetermined position with an ink having the fluorescent characteristics with respect to infrared rays. If the foregoing mark has been detected in the infrared signal read from the original document placed on the original document retaining frame, the usual image forming operation is inhibited. The image formation is inhibited by changing image data or by turning off the power source of the apparatus as described later.

The copy-inhibited original document is not limited to the foregoing size and the form shown in FIG. 1.

Figure 24:
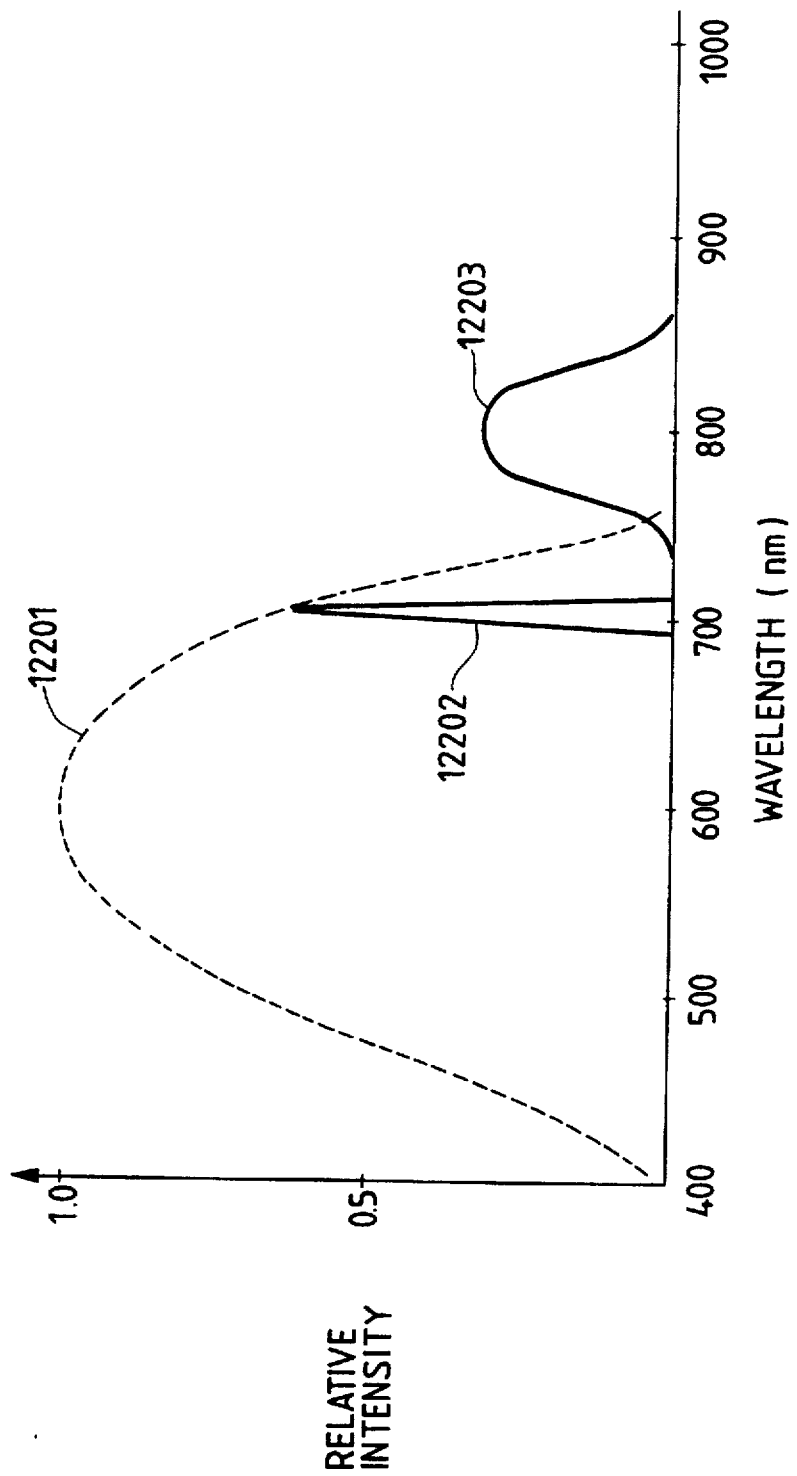
FIG. 24 illustrates the fluorescent characteristics according to the second embodiment of the present invention.

FIG. 24 shows the reflected spectrum characteristics of the copy-inhibited original document identification mark (hereinafter called an "identification mark") included in the copy-inhibited original document according to this embodiment.

A curve 12201 designates the spectrum characteristics obtained by synthesizing those of the halogen lamp 205 and the infrared-ray cutting filter 208 disposed between the halogen lamp 205 and the platen glass 203. In this embodiment, an infrared ray component 12202 in the vicinity of about 700 nm among the spectrum characteristics is made to be the exciting light. Further, infrared fluorescent light 12203 having the peak at about 800 nm from the identification mark is detected so that the copy-inhibition original document is identified. In this embodiment, a halogen lamp is used as the original-document irradiation lamp for emitting both visible light component and the exciting light component with respect to the infrared fluorescent light. By fastening the filter 208 to the halogen lamp, the wave length component (designated by the curve 12203 shown in FIG. 24) of the infrared fluorescent light is made not to reach from the halogen lamp to the surface of the original document.

In this embodiment, the identification mark is formed by using a material which is excited by the infrared rays (the characteristics of which are designated by the curve 12202 shown in FIG. 24) and which generates fluorescent light with respect to the infrared rays. Therefore, the characteristics of the identification mark with respect to visible light can arbitrarily be determined. Since the infrared fluorescent ink having a substantially transparent characteristic with respect to visible light is used in this embodiment, a judgment that the subject original document is the specific document, copying of which is inhibited, can be made by detecting the infrared fluorescent light in such a manner that the presence of the identification mark in the copy-inhibited original document is not made conscious for usual user of the apparatus.

The principle of reading the IR fluorescent light will now be described briefly. The original document 204 placed on the original document retaining frame 203 is irradiated with light emitted from the halogen lamp 205 and passed through the infrared ray cutting filter 208. The intensity of fluorescent light having a wave length of, for example, 800 nm and emitted from the identification mark is weak light, the level of which is lower than the half of the level of the exciting light, for example, about 10% of the exciting light. Therefore, the long wave length component containing the infrared fluorescent light wave length component of light directly reflected by the original document is cut by the infrared ray cutting filter 208 so that the 800 nm wave length component made incident upon the CCD 210 is made to be substantially the fluorescent light component. As described above, the fluorescent spectrum component emitted from the identification mark of light emitted from the light source to irradiated the original document is cut. Further, the fluorescent exciting light having the wave length of 700 nm is sufficiently applied to the original document so that the S/N ratio of the fluoresent signal emitted from the identification mark can be improved.

Light reflected from the original document passes through the mirrors 206 and 207 and forms images on the respective line sensors of the CCD 210, the line sensors being sensors for reading the full color red (R) information component, the green (G) information component, the blue (B) information component and the infrared (IR) information component.

Since the R, G and B line sensors 210-2 to 210-4 have the R, G and B filters having the characteristics with which the 700 nm exciting light can sufficiently be decayed and which are shown in FIG. 20, full-color reading can be performed while eliminating the influence of the 700 nm infrared fluorescent exciting wave length light and the infrared fluorescent light.

Since the IR sensor 210-1 has the filter for cutting light having the wave lengths shorter than 700 nm as shown in FIG. 16, only the infrared fluorescent component 12203 shown in FIG. 24 is read. The foregoing filters enable infrared fluorescent light to be extracted simultaneously with the operations of reading the original document and recording the image. Therefore, an excessive operation of scanning the original document, such as a pre-scanning detection of only the identification mark with the infrared fluorescent light can be omitted. If a user does not place the copy-inhibited original document at the time of the pre-scanning operation but places the copy-inhibited original document at the time of the main scanning operation, copying can effectively be inhibited.

As a result of the foregoing structure, the visible color region and the infrared region of the identification mark can satisfactorily be separated from each other at the time of simultaneously reading the two regions while necessitating only one scanning operation.

Figure 4B:
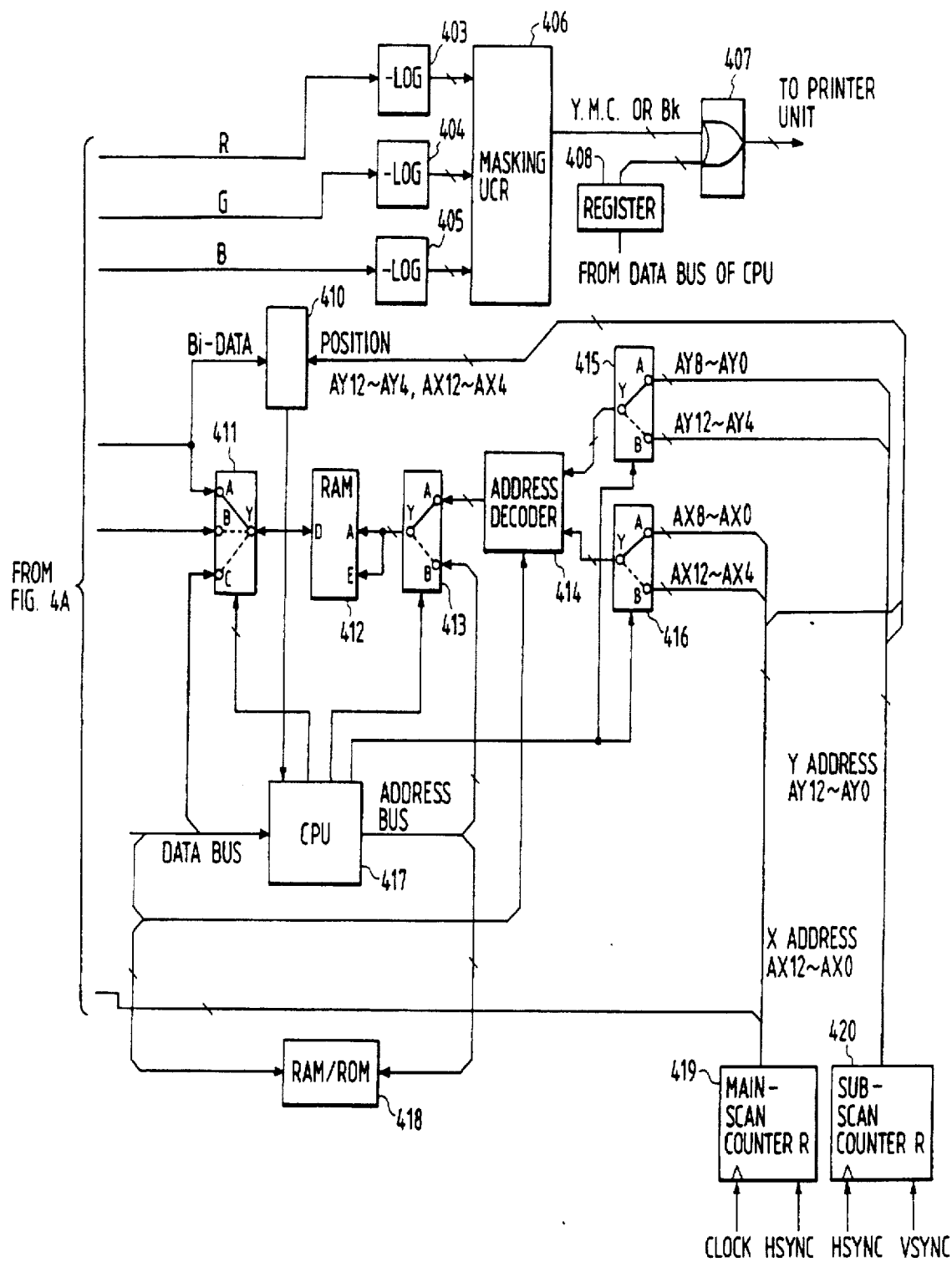
FIG. 4 is a comprised of FIGS. 4A and 4B showing structural views which illustrate a signal processing portion according to the second embodiment of the present invention.

FIGS. 4A and 4B are block diagrams which illustrates the structure of the signal processing portion 211 of the image scanner portion 201 and the flow of the image signal realized in the foregoing structure. The image signal transmitted from the CCD 210 is received by an analog signal processing portion 4001. In the analog signal processing portion 4001, the signal is converted into an 8-bit digital image signal. Then, the 8-bit digital image signal is received by a shading correction portion 4002. Reference numeral 4008 represents a decoder which decodes a main scanning address obtained from a main scanning address counter 419 to generate a line-unit CCD drive signal, such as a shift pulse and a reset pulse.

Figure 21:
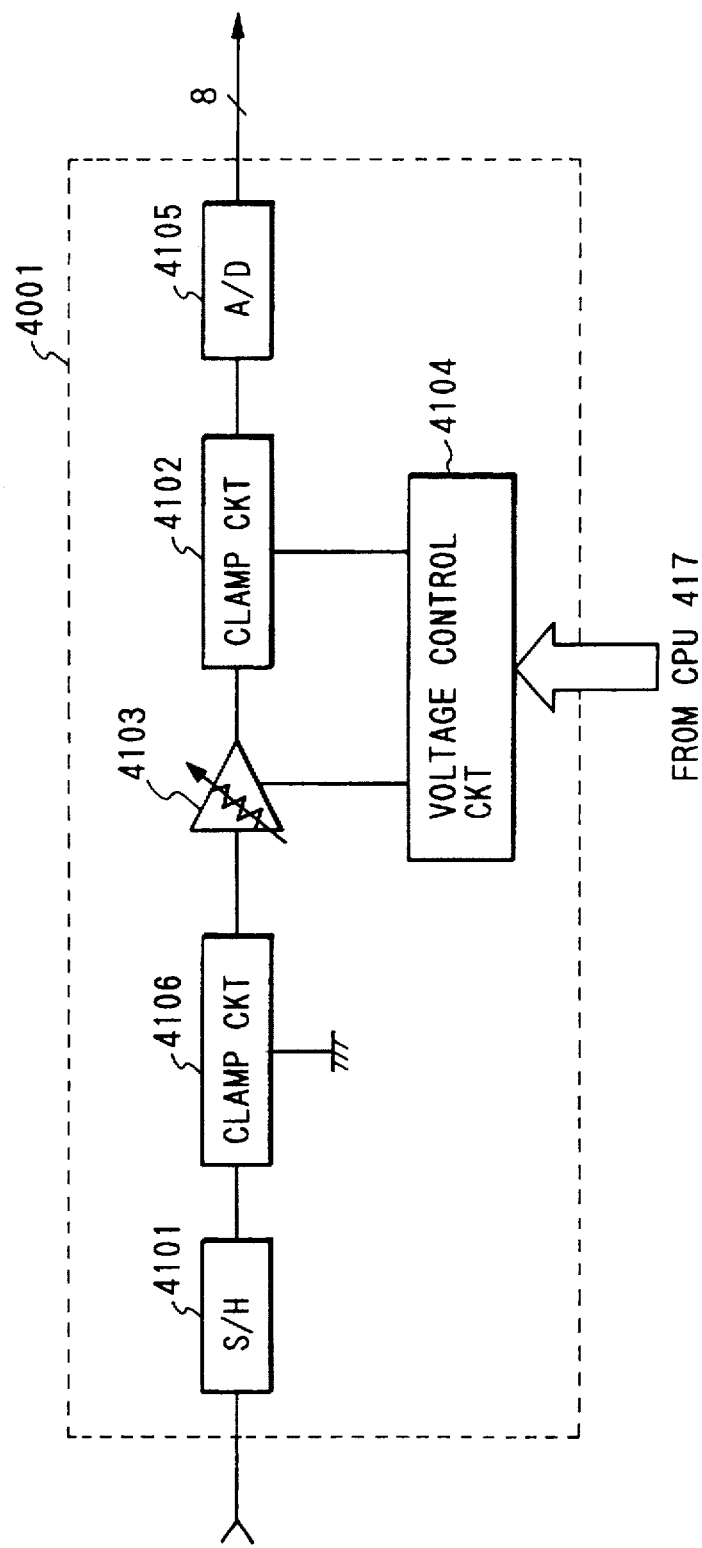
FIG. 21 illustrates an analog signal processing portion according to the second embodiment of the present invention.

FIG. 21 is a block diagram which illustrates the analog signal processing portion 4001. Since the circuits for processing the IR, R, G and B signals are in the same form, one of the circuits will now be described. The image signal transmitted from the CCD 210 is sampled and held in a sampling and holding portion (an S/H portion) 4101 to stabilize the wave form of the analog signal. A CPU 417 controls a variable amplifier 4103 and a clamping circuit 4102 via a voltage control circuit 4103 to cause the image signal to use fully the dynamic range of an A/D converter 4105. The A/D converter 4105 converts the analog image signal into an 8-bit digital image signal.

The 8-bit digital image signal is, in the shading correction portion 4002, subjected to a shading correction process by a shading correction method.

The CPU 417 receives the reading signal obtained from the IR sensor 210-1 causes the read infrared fluorescent signal for one line supplied from the fluorescent standard plate 5103 to be stored in a line memory 4003. Further, a multiplexing coefficient for making read data for each pixel recorded on the line memory 4003 to be level 255 is obtained for each pixel to store it in a coefficient memory 4006 for one line. In synchronization with an output of each pixel due to reading of the line of the IR sensor 210-1 at the time of reading the original document, the multiplexing coefficient corresponding to the pixel is read from the coefficient memory. A multiplier 4007 multiplies each pixel signal obtained from the IR sensor 210-1 by the multiplexing coefficient so that the shading correction of the infrared fluorescent light is performed.

Also the shading corrections of the R, G and B signals are, similarly to that of the IR signal, performed in such a manner that the reading signal for one line obtained from the standard white plate 5102 is written on the line memory. Further, the multiplexing coefficient for making the value to be 255 is stored in the coefficient memory. Then, the multiplier multipliers the read signal by the multiplexing coefficient for each pixel obtained from the coefficient memory.

Since the light receiving portions 210-1, 210-2, 210-3 and 210-4 of the CCD 210 are disposed away from each other as shown in FIGS. 15A and 15B, the spatial deviation in the sub-scanning direction is corrected by line delay devices 401, 402 and 405. Specifically, the IR, R and G signals for reading the forward original document in the sub-scanning direction with respect to the B signal are delayed in the sub-scanning direction to align to the B signal. Reference numerals 403, 404 and 405 represent log converters each of which is composed of a look-up table ROM so that R, G and B brightness signals are converted into C, M and Y density signals. Reference numeral 406 represents a known masking and UCR circuit which receives three primary color signals to transmit Y, M, C and Bk signals while having a predetermined bit length, for example, 8 bits whenever the respective reading operations are performed.

FIG. 23 is a block diagram which illustrates a light-quantity control portion for controlling the halogen lamp 205. Reference numeral 4301 represents the light quantity control portion for controlling the halogen lamp 205.

Figure 22B:
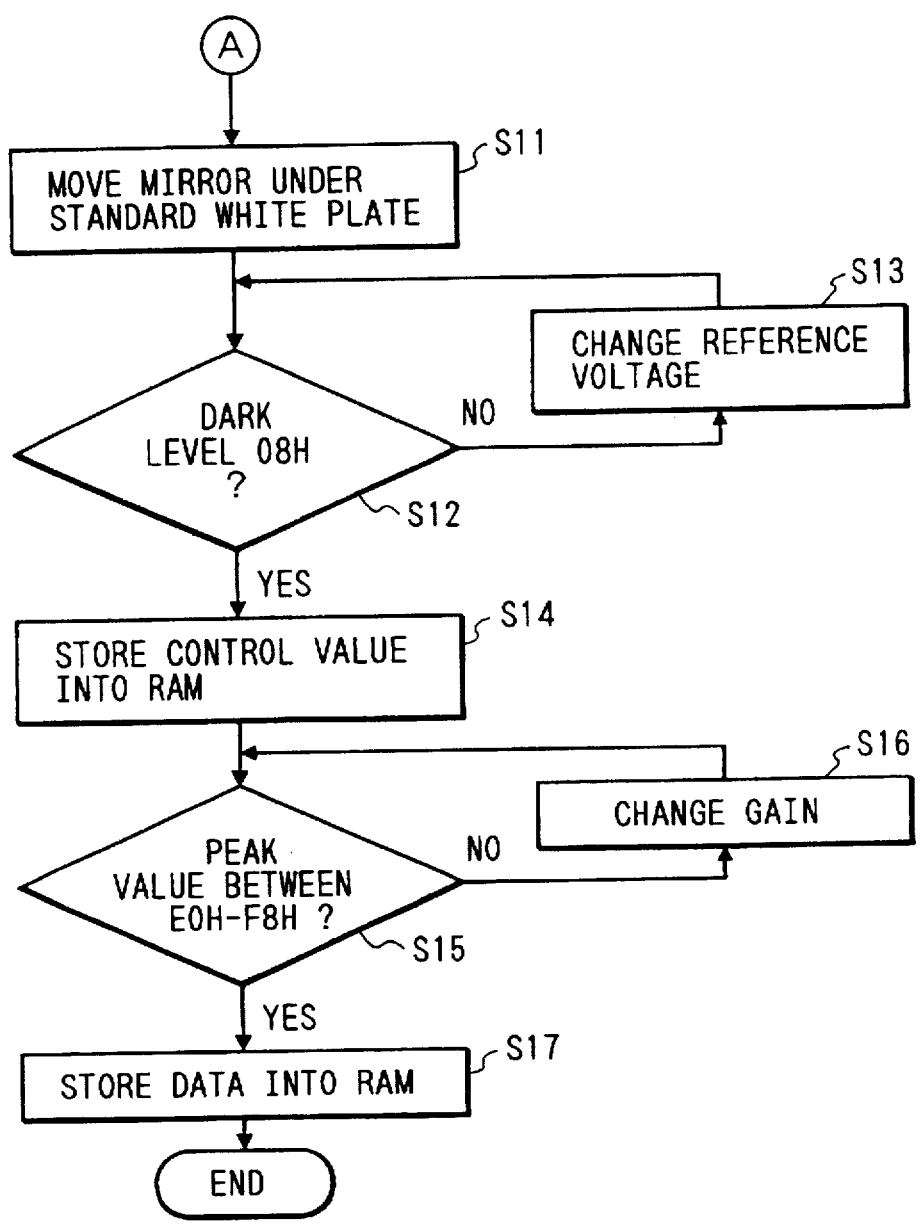
FIG. 22 is comprised of FIGS. 22A and 22B showing flow charts which illustrate the operation of controlling a light-adjustment gain and a circuit gain according to the second embodiment of the present invention.

A method of adjusting the light quantity of the halogen lamp 205 and a method of controlling the variable amplifier 4103 and the clamping circuit 4102 will now be described with reference to a flow chart shown in FIGS. 22A and 22B.

In the analog signal processing portion 4001, the amplification rate of the variable amplifier 4103 is adjusted in accordance with image data obtained by reading the standard white plate 5102 in the case of the R, G and B signals in order to fully use the dynamic range of the A/D converter 4105. In accordance with image data obtained in a state where the CCD 210 is not irradiated with light, the control voltage of the clamping circuit 4102 is adjusted by a voltage control circuit 4103. In the case of the IR signal, the image data obtained at the time of reading infrared fluorescent information from the standard white plate 5102 is used to perform the adjustment similarly to the R, G and B signals.

When an adjustment mode is commenced by a control portion (omitted from illustration)., the reflecting mirror 206 is moved to a position below the standard white plate 5102 to set a predetermined gain into the variable amplifier 4103 for adjusting the halogen lamp (step 1). Image data obtained in the state where the CCD 210 is not irradiated with light is caused to be received into the line memory (a shading RAM) 4003. The received data is calculated by the CPU 417 to control the voltage control circuit 4103 in such a manner that the mean value of image data for one line is made nearest 08H, and the reference voltage of the clamping circuit 4102 is adjusted (steps 2 and 3). Then, the control value after the adjustment has been performed is stored in a RAM 418 attached to the CPU 417 (step 4).

Then, image data obtained by reading the standard white plate 5102 by turning on the halogen lamp 205 is received by the line memory 4003. Further, the peak value of the G signal is made to be a value between D0H and F0H by the light quantity control portion 4301 controlled by the CPU 417 (halogen lamp adjustment operation in steps 5 and 6). The adjusted control value is caused to be stored in the RAM 418 attached to the CPU 417 (step 7). Then, image data obtained by reading the standard white plate 5102 by lighting on the halogen lamp 205 to emit a light quantity adjusted in steps 5 and 6 is caused to be received by the line memory 4003 corresponding to red, green and blue. The peak value of the image data is made to be a value between E0H and F8H for each of red, green and blue by controlling the voltage control circuit 4103, and the amplification ratio of the variable amplifier 4103 is adjusted for each of red, green and blue (steps 8 and 9). Further, the adjusted amplification ratio is, as the gain gate (hereinafter called "H-gain data") at the time of using the halogen lamp 205, stored in the RAM 418 attached to the CPU 417.

Then, operations for adjusting the clamping circuit and the variable amplifier of the analog signal processing portion for processing the read signals supplied from the IR sensor 210-1 and an operation for storing the control value will now be described. The fluorescent standard plate 5103 is read by turning of the halogen lamp 205 and by moving the reflecting mirror 206 to a position below the fluorescent standard plate 5103 (step 11). Image data obtained in the state where the CCD 210 is not irradiated with light is received by the line memory for the IR signal. The received image data is calculated by the CPU 417. The mean value of image data for one line is made nearest 08H by controlling the voltage control circuit 4103 to control adjust the reference voltage of the clamping circuit 4102 (steps 12 and 13). The adjusted control value is stored in the RAM 418 attached to the CPU 417 (step 14). Then, infrared fluorescent image data obtained by reading the fluorescent standard plate 5103 by lighting on the halogen lamp 205 to emit the light quantity adjusted in steps 5 and 6 is received by the line memory for the IR signal. The peak value in one line of image data of the IR signal is made to be a value in a range from E0H to F8H by controlling the voltage control circuit 4103 for the IR signal to adjust the amplification rate of the variable amplifier 4103 for each of red, green and black (steps 15 and 16). The amplification rate is, as the gain data for the IR signal, stored in the RAM 418 attached to the CPU 417 so that the halogen lamp is lit off (step 17).

The control data obtained in the foregoing adjustment mode is set to each control portion at the time of supplying the electric power.

The usual copying operation and an operation for judging the fluorescent mark will now be described.

When an operator places an original document on the platen 203 and the copying operation is commenced by using a control portion (omitted from illustration), the CPU 417 controls a motor (omitted from illustration) to move the reflecting mirror 206 to a position below the standard white plate 5102.

Then, the halogen lamp is lit on to irradiate the standard white plate 5102 with light. Further, the shading correction portion 4002 performs shading corrections for the R, G and B signals.

Then, the CPU lights on the halogen lamp 5101 to irradiate the fluorescent standard plate 5103. The shading correction portion 4002 performs a shading correction for the IR signal by using infrared fluorescent light.

Then, the original reading operations are performed four times in accordance with the image recording operations for M, C, Y and Bk in the printer portion so that a frame-sequential image recording operation is performed. Further, the fluorescent mark is detected simultaneously with each reading operation. In accordance with the result of the detection, the recording operation is controlled.

In this embodiment, the four times of the reading operations (scans) is needed to copy the original document. The operations of the image scanner 201 and the printer 202 at each scan are shown in FIG. 3.

That is, if the counterfeit prevention of a copy-inhibited original document is performed, the image scanner coarsely detects the position of the fluorescent mark in Mode 1 and the printer portion transmits a magenta image at the first scan.

At the second scan, the image scanner is in Mode 2 in which the fluorescent mark is extracted from the position of the fluorescent mark detected at the first scan to store the data in the memory to judge whether it is a predetermined copy-inhibited mark. The printer portion transmits a cyan image.

At the third and fourth scans, the image scanner is in Mode 3 so that a specific process for preventing the counterfeit is performed if a judgment has been made in the second scan that the counterfeit is intended. For example, any one of the following operations is performed: a yellow or black solid printing (to be described later) is performed; yellow and black images are not formed; and the power of the fixing unit is turned off.

Figure 5:
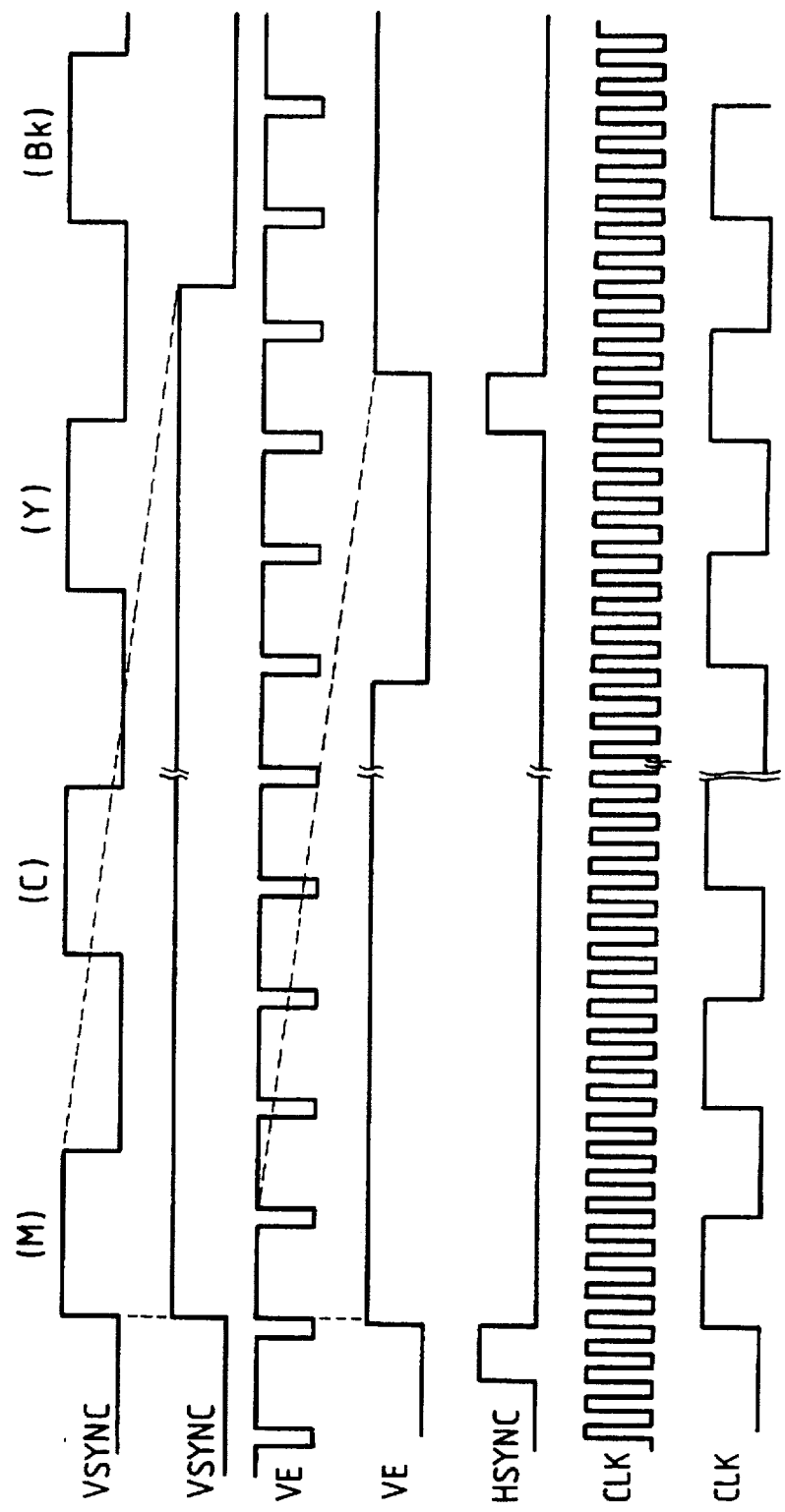
FIG. 5 is a graph which shows the timing of each of image control signals according to second to fourth embodiments of the present invention.

FIG. 5 illustrates the operation timing of each portion of the image scanner portion according to this embodiment.

VSYNC signal is an image effective region signal in the sub-scanning direction. In a region where the VSYNC signal is "1", sequential (M), (C), (Y) and (Bk) output signals for reading (scanning) the image are formed. Signal VE is an image effective region signal in the main scanning direction. In a region where the signal VE is "1", timing of the main scanning commencement position is arranged. Signal CLK is a pixel synchronizing signal. At the first transition timing from "0" to "1", image data is transferred. Signal CLK8 is a timing signal at intervals of 8 pixels. At the first transition timing from "0" to "1", timing of a signal subjected to an 8×8 block process is arranged.

(Image Scanner Portion)

The fluorescent mark detection performed by the internal block of the image scanner 201 shown in FIGS. 4A and 4B and a portion for generating an image to be recorded by the printer will now be described. Reference numerals 403, 404 and 405 represent log converters each of which is composed of a look-up table ROM with which R, G and B brightness signals are respectively converted into C, M and Y density signals. Reference numeral 406 represents a known masking and UCR circuit which receives three primary color signals to transmit Y, M, C and Bk signals while each having a predetermined bit length of, for example, 8 bits, whenever the reading operations are performed. Reference numeral 407 represents an OR gate circuit which calculates a logical OR with a value stored in a register 408. The register 408 usuallly stores $00_H$ written thereon so that an output from the masking and UCR circuit 406 is transmitted to the printer portion as it is. At the time of performing the counterfeit prevention, the CPU 417 sets $FF_H$ into the register 408 via a data bus so that a solid yellow or black toner image is transmitted.

Reference numeral 417 represents a CPU for controlling the apparatus in each mode. Reference numeral 4009 represents a binary coding circuit which binary-codes the infrared fluorescent signal at an adequate slice level. Among the outputs from the binary coding circuit, output "1" means the presence of the fluorescent mark and output "0" represents that no fluorescent mark is present, the outputs being transmitted for each pixel.

In a block processing circuit 409, an 8×8 block process is performed so that the output from the binary coding circuit 409 is processed for each 8×8 block.

Reference numeral 412 represents a read and write enabled random access memory (RAM). Data is changed over by a selector 411 and the address is changed over by a selector 413.

Reference numeral 419 represents a main scanning counter which is reset in response to HSYNC signal and the count of which is increased at the timing of CLK signal to generate 13-bit main scanning addresses (hereinafter called "X address") X12 to X0.

Reference numeral 420 represents a sub-scanning address counter which is reset when the VSYNC signal is in the region "0" and the count of which is increased at the timing of the HSYNC signal to generate 13-bit sub-scanning addresses (Y address) Y12 to Y0.

The CPU 417 controls the selectors 411, 413, 415, 416 and the address decoder 414 in accordance with each mode to read/write data to and from the RAM 412. Reference numeral 418 represents a RAM/ROM attached to the CPU 417. Reference numeral 410 represents a fluorescent mark detection circuit for detecting the position of the fluorescent mark.

Figure 6:
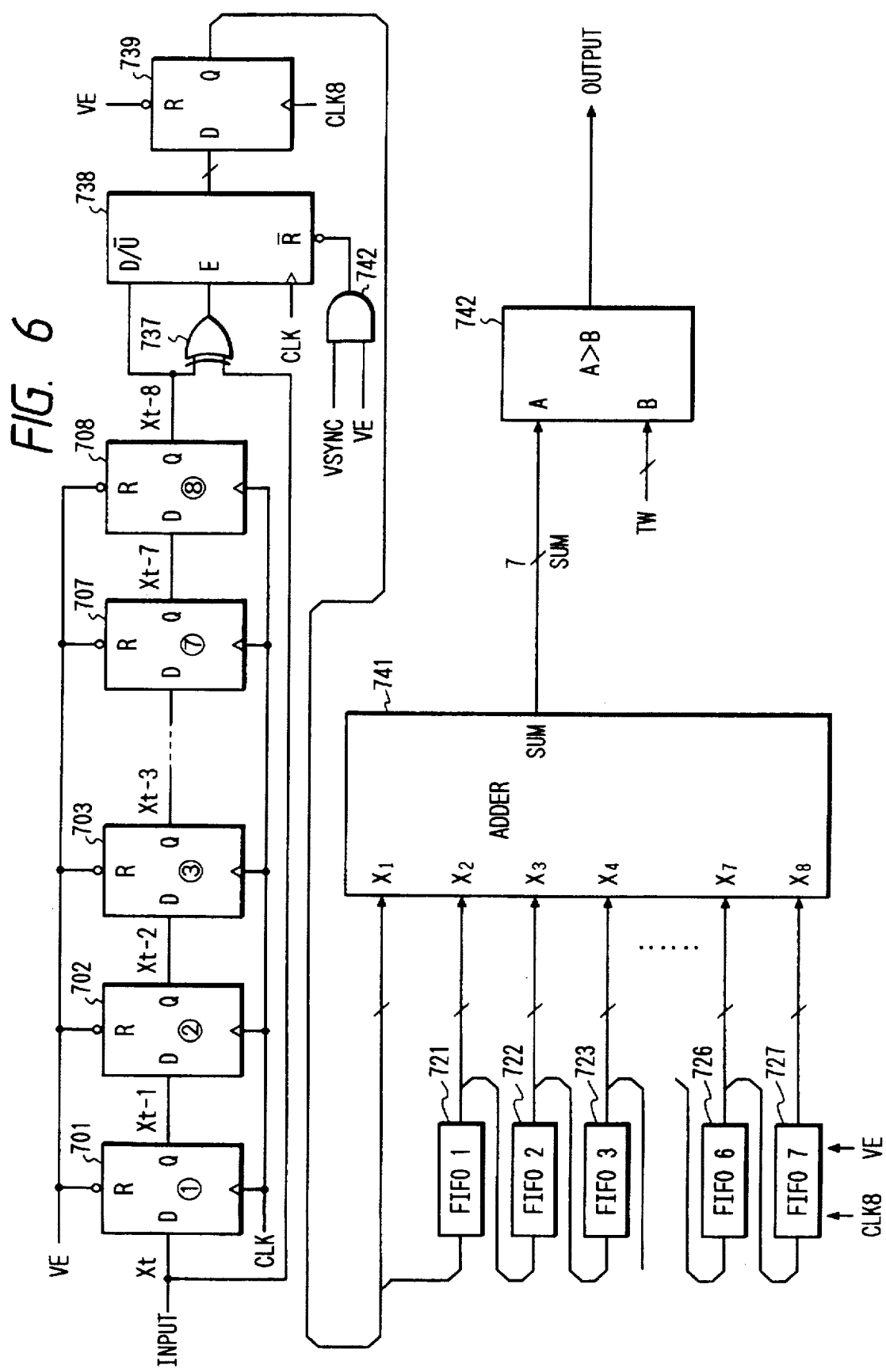
FIG. 6 is a block diagram which illustrates a noise eliminating block of a fluorescent signal according to the second embodiment of the present invention.

FIG. 6 illustrates the detailed internal structure of the block processing circuit 409 shown in FIGS. 4A and 4B.

Reference numerals 701 to 708 represents seven D-flip flops (hereinafer called "DEFs") disposed in series which sequentially delay the input signals in response to the pixel clock signal CLK, the DEFs 701 to 708 being cleared when VE="0", that is, in a non-image region.

Reference numeral 738 represents a 4-bit up/down counter, 737 represents an EX-OR gate, and 740 represents an AND gate which is operated as follows.

TABLE 1

| VSYNC | VE | $X_t$ | $X_{t-8}$ | Output from counter |
|---|---|---|---|---|
| 0 | X | X | X | 0 (clear) |
| X | 0 | X | X | 0 (clear) |
| 1 | 1 | 0 | 0 | held |
| 1 | 1 | 0 | 1 | count down |
| 1 | 1 | 1 | 0 | count up |
| 1 | 1 | 1 | 1 | held |

That is, the output from the counter 738 is cleared to zero in a region where VSYNC or VE is "0", the same is held when $X_t=x_{t-8}$, its count is increased when $X_t=1$ and $X_{t-8}=0$, and its count is decreased when $X_t=0$ and $X_{t-8}=1$. By latching the output from the counter 738 by a latch 739 with CLK 8 the period of which is 8 clocks, the sum (number of cases where $X_t=1$) of eight input data items $X_t$ is transmitted.

Data items for eight lines of the foregoing outputs are simultaneously supplied to an adder 741 by FIFO memories 721 to 727 for one line to transmit the sum. As a result, total SUM, which is the sum of the cases where number of 1 in the 8×8 window) are transmitted in the form of 0 to 64.

Reference numeral 742 represents a digital comparator which subjects the output SUM from the adder 741 and a predetermined comparative value TW determined by the CPU 417 to a comparison. The result of the comparison is transmitted while being formed into "0" or "1".

By previously setting an adequate number to TW, noise elimination can be performed in 8×8 block units.

FIGS. 7A and 7B illustrate the fluorescent mark detection circuit 410.

Reference numeral 827 represents a line thinning circuit which transmits the VE signals for 8 lines while thinning to one line. Since writing of data on each FIFO memory is controlled by using the VE signals thinned to ⅛, the contents of each FIFO memory is updated at every 8 lines. Since each F/F is operated in response to the CLK8, the operation of the foregoing circuit is performed in units of 8 pixels/8 lines.

Reference numerals 828, 829 and 830 represent three FIFOs which respectively realize delay by one line so that four lines are processed simultaneously.

Reference numerals 831 to 841 represent DEFs disposed in units of three DEFs in series to correspond to the output for the four lines. All DEFs are operated in response to the CLK 8. If one or more 1 (the fluorescent mark) are present in the 4×4 region, the 4×4 region (a 2 mm×2 mm region on the original document) is fully made to be 1 by the OR gate 857. As a result, the gap of the mark is covered as the fluorescent mark portion.

Reference numerals 842, 843 and 844 represent three FIFOs each of which realizes a delay by one line so that the four lines are simultaneously processed.

Reference numerals 845 to 856 represent DEFs disposed in units of three DEFs in series to correspond to the output for the four lines. All DEFs are operated in response to the CLK8. The AND gate 858 transmits 1 denoting the 4×4 region is fully 1 (the fluorescent mark is present). As a result, the portion expanded as the fluorescent mark portion on the outside of the mark at the time of covering the gap of the mark is restored to have the original size. Therefore, the undesirable expansion of the noise component of the fluorescent signal occurring due to contamination of the original document or the like can be prevented.

Reference numerals 819 to 821 represent 18 FIFOs each of which realizes a delay of one line so that 19 lines are processed simultaneously.

Reference numerals 801 to 816 represent DEFs disposed in units of 10 DEFs in series to correspond to the outputs for 19 lines. Reference numerals 817 and 818 represent nine DEFs disposed in series in the rear of the DEF 812. All DEFs are operated in response to the CLK8. When all outputs from the DEFs 804, 808 to 812 and 816 (19 blocks disposed in the longitudinal direction) and DEFs 809, 810, 811, 812, 817 and 818 (19 blocks disposed in the lateral direction) are "1", 1 is transmitted via the AND gates 823 to 825.

One block is arranged to be 8 pixels/8 lines which correspond to about 0.5 mm×0.5 mm on the original document. That is, when the fluorescent marks are continued for 9.5 mm in both longitudinal and the lateral directions, the substantially the central position of the mark at this time is, as Position Data, latched by the latch 826 and transmitted to the CPU. By determining the size of 9.5 mm to be somewhat smaller than the size of the mark in the copy-inhibited original document, the position of the mark can assuredly be detected while eliminating the influence of the noise component.

Figure 8:
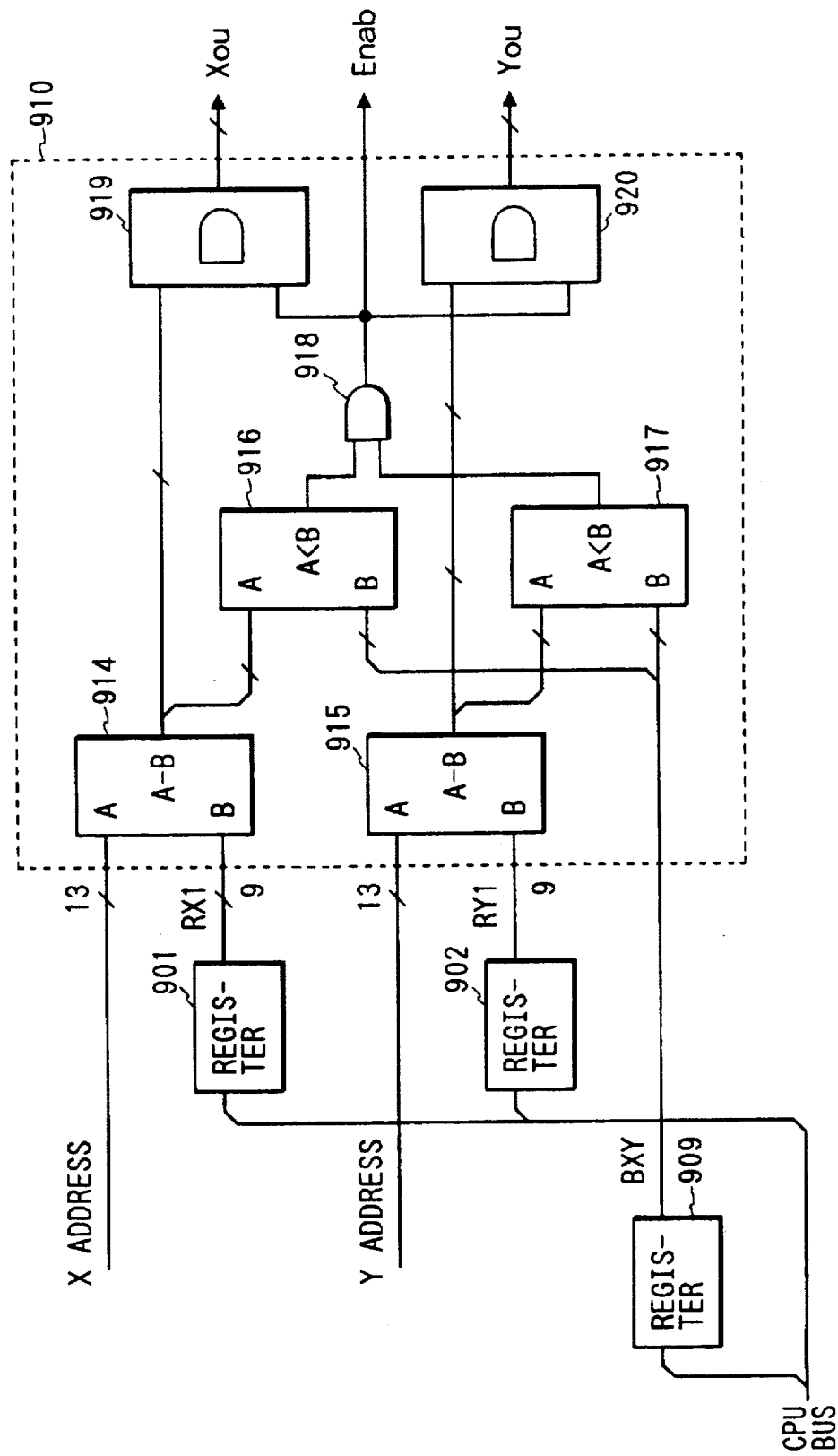
FIG. 8 is a portion for generating address in a memory for storing the fluorescent mark according to the second embodiment of the present invention.

FIG. 8 is a block diagram which illustrates the address decoder 414.

Reference numerals 901, 902 and 909 represent registers directly connected to the data bus of the CPU. Desired values are written on the registers 901, 902 and 909 by the CPU.

Reference numerals 914 and 915 represent subtractors which receive inputs A and B to transmit output A-B. The output MSB is a code bit arranged in such a manner that an output MSB=1 is transmitted when the code is negative. Reference numeral 916 and 917 represent comparators which receives inputs A and B to transmit output "1" if A<B. However, "0" is transmitted if MSB of A is "1" regardless of the input B.

Reference numerals 918 to 920 represent AND gates. If a resulted value BXY is written on the register 909, the case where the following relationships are held:

$$RX1 < X\ address < RX1+BXY\ \text{and}$$
$$RY1 < Y\ address < RY1+BXY \quad (1)$$

Allow to the following outputs to be transmitted:

$$Xou = X\ address - RX1$$
$$You = Y\ address - RY1$$
$$Enab = 1.$$

That is, the area of the size BXY is subjected to addressing while making RX1 and RY1 to be leading addresses with respect to the main scan and the subscan.

<Flow of Process>

FIG. 3 shows the relationship among the four times of scans from the first scan to the fourth scan, the three modes of the image scanner from Mode 1 to Mode 3 and the contents of the outputs from the printer portion.

Figure 9:
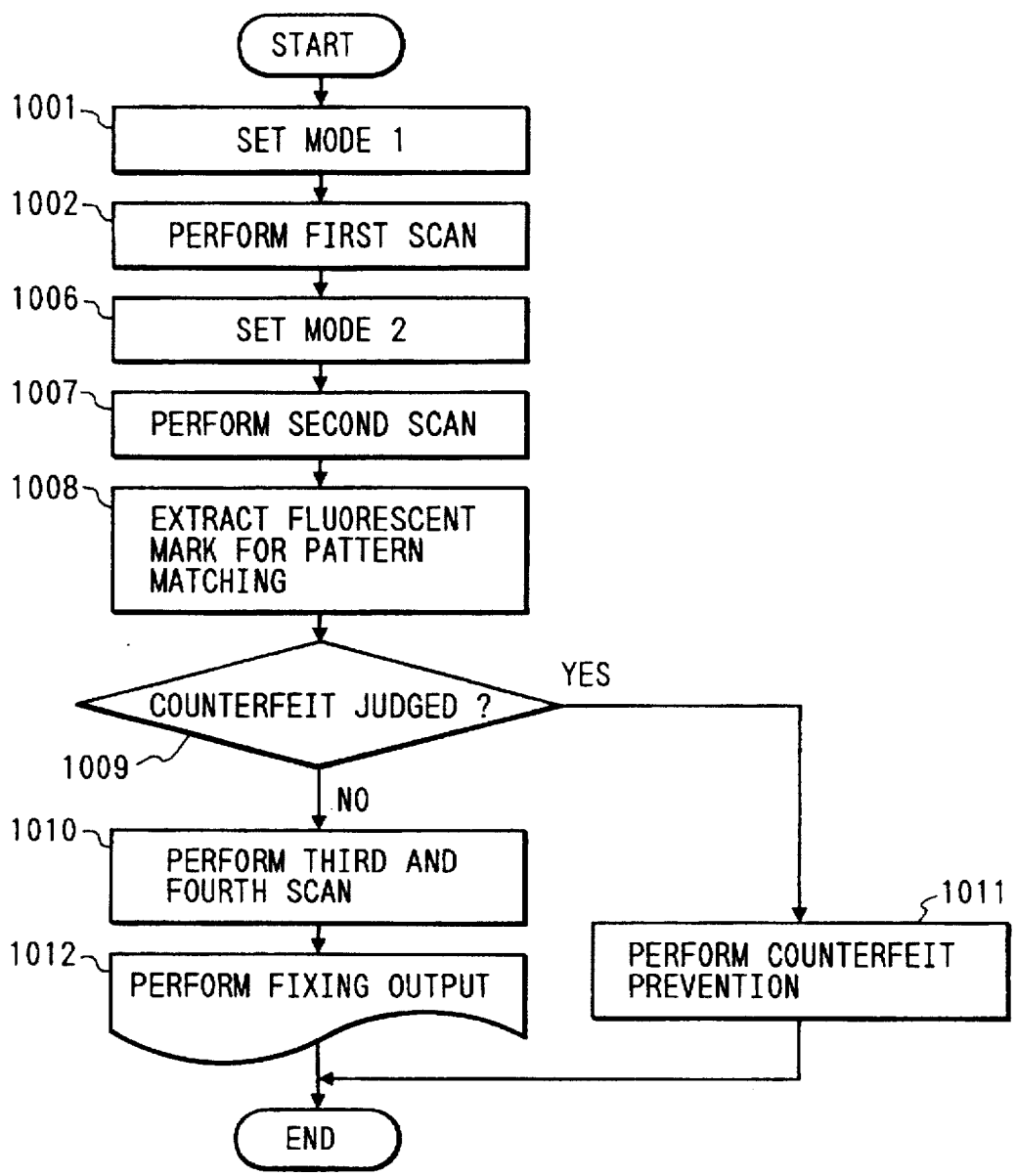
FIG. 9 is a flow chart which illustrates control performed by a CPU according to the second embodiment of the present invention.

FIG. 9 shows the flow of a process of control performed by the CPU. As shown in FIG. 9, MODE 1 for the first scan is set to the CPU in step 1001.

In the foregoing state, the first scan is commenced in step 1002. In Mode 1, the magenta output is transmitted from the printer and the coarse central position of the fluorescent mark portion in the copy-inhibited original document is detected.

FIG. 1 illustrates a state where a copy-inhibited original document corresponding to a ten-thousands-yen bill is placed on the original document retaining frame. At the first scan, that is, in Mode 1, the address of the central portion of the fluorescent mark portion designated by diagonal lines, that is, a portion corresponding to (Xc, Yc) which is a portion corresponding to (Xc, Yc) shown in FIG. 1 is latched by the latch 826 and transmitted to the CPU.

The CPU is able to coarsely detect the value of (Xc, Yc) which is the center of the fluorescent mark.

In next step 1006, Mode 2 for the second scan is set. That is, the selector 411 is set to B, the selector 413 is set to A and the selectors 415 and 416 are set to B.

In the address decoder 414, setting is performed in such a manner that the position of the fluorescent mark is made to be as follows:

RX1=XS1 RY=YS1 (in one pixel unit).

where Xc and Yc are data items about the central position of the mark in the detection range of 9.5 mm as described in the description of the mark detection circuit shown in FIGS. 7A and 7B. In order to completely cover the fluorescent mark range, the diameter of which is 10 mm to 20 mm, pixels are set to BXY by a number (472 at 400 dpi) corresponding to about 30 mm.

As the leading address XS1 and XY1, values more adjacent by 15 mm (236 pixels at 400 dpi) to the origin than Xc and Yc are set.

In step 1007, the second scan is performed so that a binary-coded fluorescent signal obtained from a dashed line region including the fluorescent mark shown in FIG. 1 is written on the RAM 412.

Further, a judgement whether or not the fluorescent mark is present is made in step 1008 in accordance with an algorithm to be described later. If a judgement is made in step 1009 that there is no possibility of the counterfeit, that is, if no fluorescent mark has been detected, the flow proceeds to step 1010 in which the third and fourth scans are performed and a usual operation is performed so that development is performed by using Y, M, C and Bk toner. In step 1012, the developed image is fixed and the fixed image is transmitted.

If a judgement has been made in step 1009 that there is a possibility of the counterfeit, that is, if the fluorescent mark has been detected, a counterfeit prevention is performed in step 1011. Specifically, the CPU sets FFH (usually 00H is set) to the register 408 shown in FIGS. 4A and 4B so that FFH is transmitted to the printer portion. As a result, Y and Bk toner is allowed to adhere to the entire surface, causing the usual copying operation to be inhibited.

<Pattern Matching>

Pattern matching of the fluorescent mark in step 1008 will now be described. Since there is a possibility that different marks are formed between the two sides of a bill or the like at the time of forming the fluorescent marks, two fluorescent mark patterns are previously registered for pattern matching in order to one kind of the copy-inhibited original document.

Figure 10:
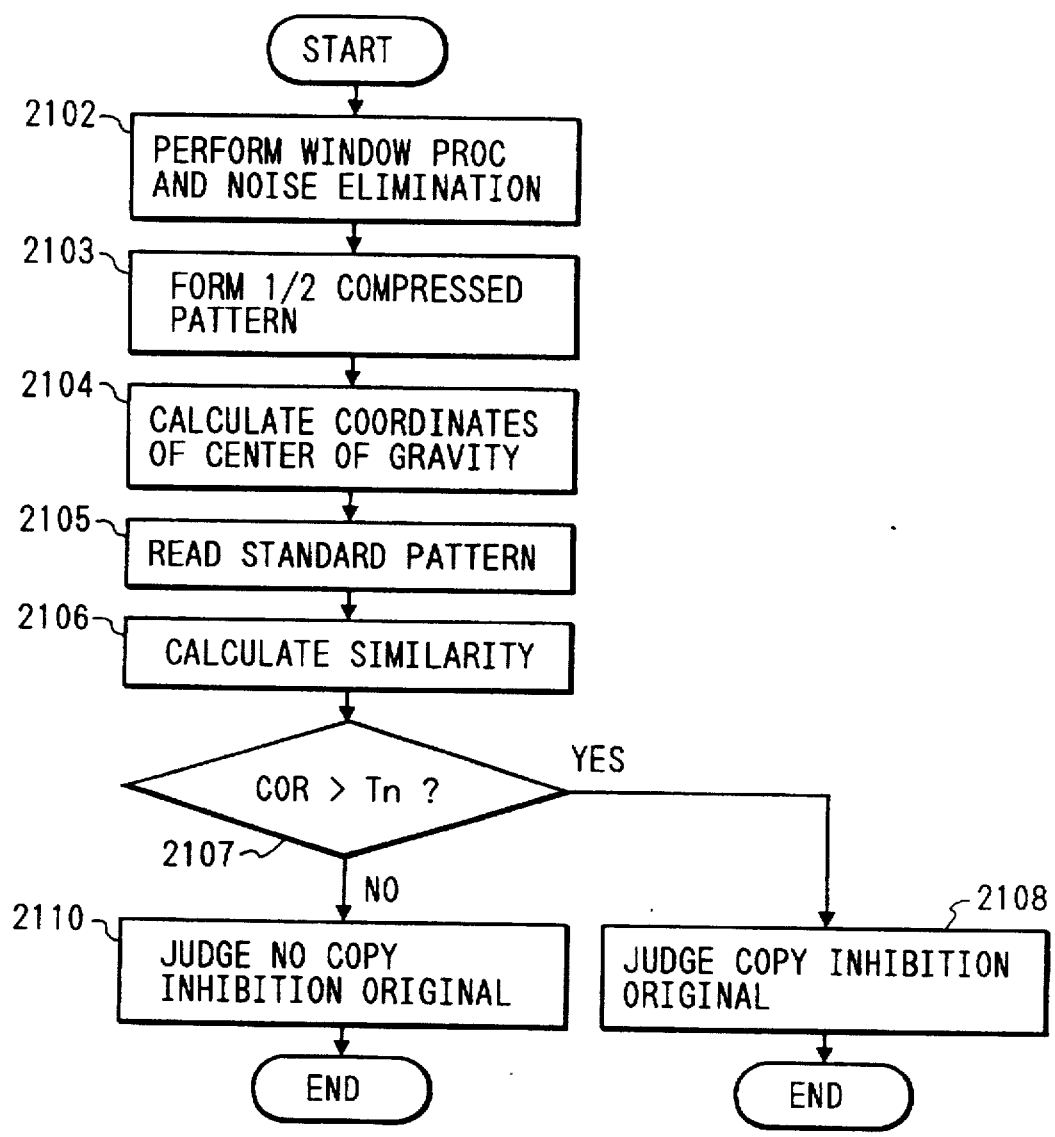
FIG. 10 is a flow chart which illustrates a pattern matching operation performed by the CPU according to the second embodiment of the present invention.

When a specific portion of a specific document is written on the RAM 412, the CPU 417 refers the contents of the RAM 412 so that pattern collating is performed. A flow chart of pattern collating is shown in FIG. 10. The RAM 412 has binary-coded data of the specific portion stored therein.

The foregoing area is subjected to a process in step 2102 and ensuing steps. In step 2102, a window process is performed for eliminating noise.

Figure 11:
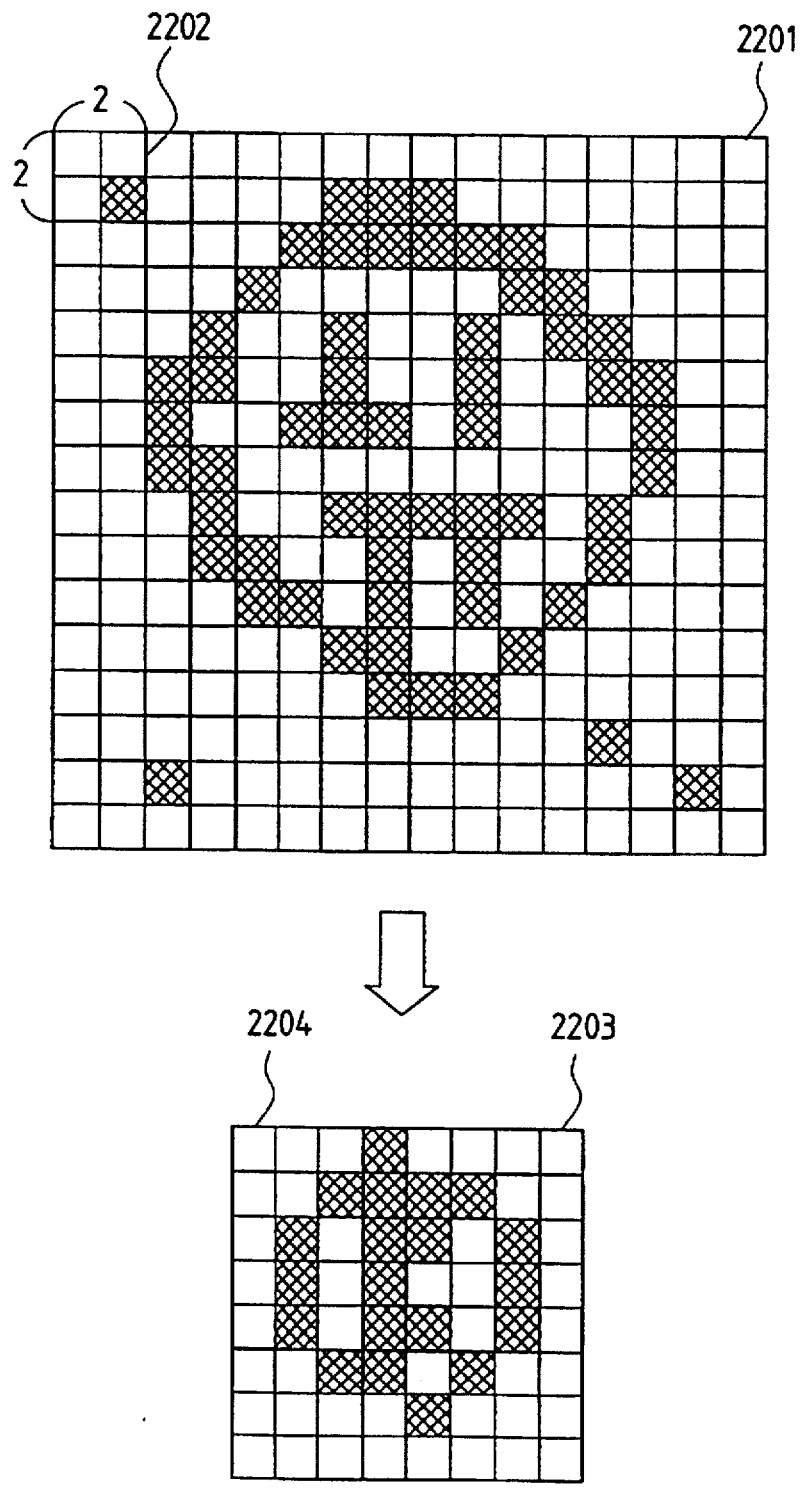
FIG. 11 illustrates an operation of thinning the fluorescent mark according to the second embodiment of the present invention.

Assumptions are made that the binary-coded image in the area 1 is 2201 shown in FIG. 11 and that a small square shows one pixel, a full white portion shows a white pixel and a diagonal line portion shows a black pixel. The foregoing portion is scanned with a window 2202 the size of which is 2×2 pixels to count the number of the black pixels in the window. A portion in which the result of counting is larger than 2 is made to be a novel black pixel. Therefore, the result of the process is contracted to the half in both longitudinal direction and the lateral direction as designated by reference numeral 2203. As a result, a pattern, from which noise has been eliminated, can be obtained. Since the number of the black pixels in the window at a position 2202 is 1, the portion is, as a white pixel, replaced by a position 2204.

Then, the center of gravity 1 of the pattern 2203 is calculated.

The center of gravity 1 can be calculated by a known method by projecting the pattern 2203 in both longitudinal direction and the lateral direction.

Then, the similarity is calculated by standard pattern matching. First, a standard pattern previously registered as a dictionary is read from the ROM 418 shown in FIGS. 4A and 4B to the CPU in step 2105. The standard pattern is the fluorescent pattern of the subject copy-inhibited original document. Since the pattern extracted until step 2103 is completed has a possibility that the original document has been rotated due to the angle of the placement of the original document, a satisfactory effect cannot be obtained if the foregoing pattern is subjected to a comparison with a single standard pattern.

The foregoing state is shown in FIGS. 12A to 12C. The standard pattern may be set in such a manner that a plurality of patterns consisting of the fluorescent patterns rotated at angular intervals of several degrees are previously stored in the ROM as to be selected to be read to the CPU. As the plural patterns, 24 patterns consisting of marks rotated at angular intervals of 15 degrees from zero degree to 360 degrees are used. Therefore, a variety of methods for calculating the similarly may be employed as exemplified by the following method: as shown in FIGS. 12A to 12C, the pattern extracted to the foregoing moment is made to be as shown in FIG. 12A and the standard pattern having a predetermined rotational angle and selected from patterns which are rotated by the angular intervals of 15 degrees by the foregoing method is made to be as shown in FIGS. 12B and 12C, the foregoing patterns being expressed by B (i, j) and P (i, j), respectively (B (i, j) is 1 in the case of the black pixel and the same is zero in the case of the white pixel). When coordinates of the center of gravity of B (i, j) obtained in step 2104 shown in FIG. 10 is ($i_{BC}$, $i_{BC}$) and the coordinates of the center of gravity of P (i, j) obtained similarly is ($i_{PC}$, $j_{PC}$), the similarity COR of the two patterns is expressed by the following equation:

$$COR = \sum_i \sum_j P(i - i_{PC}, j - j_{PC}) \oplus B(i - i_{BC}, j - j_{BC}) \quad (1)$$

where $\oplus$ is the exclusive OR of P and B, and Equation (1) shows the Hamming distance when the center of gravity of the pattern B (i, j) are aligned to each other. The similarity of the two patterns is raised in proportion to the COR.

This embodiment is arranged in such a manner that the reliability of the similarity is improved and the generation of an error in recognition is prevented by using Equation (2) formed by deforming Equation (1) so that the similarity COR is obtained.

$$COR = 2 \times \left( \sum_i \sum_j P(i - i_{PC}, j - j_{PC}) \cdot B(i - i_{BC}, j - j_{BC}) \right) - \left( \sum_i \sum_j \overline{P(i - i_{PC}, j - j_{PC})} \cdot B(i - i_{BC}, j - j_{BC}) \right) \quad (2)$$

where the

AND $\overline{P(i - i_{PC}, j - j_{PC})}$ denotes the judgement of P. If both P and B are black pixels, 2 is added to COR. If P=0 and B=1, 1 is subtracted from COR. As a result, the accuracy in recognition can significantly be improved.

When the similarity COR is calculated by the foregoing method, a comparison is made in 2107 between previously obtained Th and the COR.

If COR>Th, a judgement is made that the fluorescent mark is present. Therefore, a discrimination is made that the copy-inhibited original document is present (2108), and the collating operation is completed.

If COR<Th, a judgement is made that no fluorescent mark is not present in the subject area. Therefore, a discrimination is made that no copy-inhibited original document is present (2110), and the collating operation is completed.

<Third Embodiment>

This embodiment is arranged in such a manner that the presence of fluorescent light is detected in place of detecting the pattern expressed by infrared fluorescent information in the copy-inhibited original document.

Among the copy-inhibited original documents such as bills, some kinds of bills are made of paper composed of the fiber containing a substance having the fluorescent characteristics as exemplified by Canadian dollar. In this embodiment, infrared fluorescent light is detected in thin line information such as the foregoing fiber so that the copy-inhibited original document is detected.

Figure 25B:
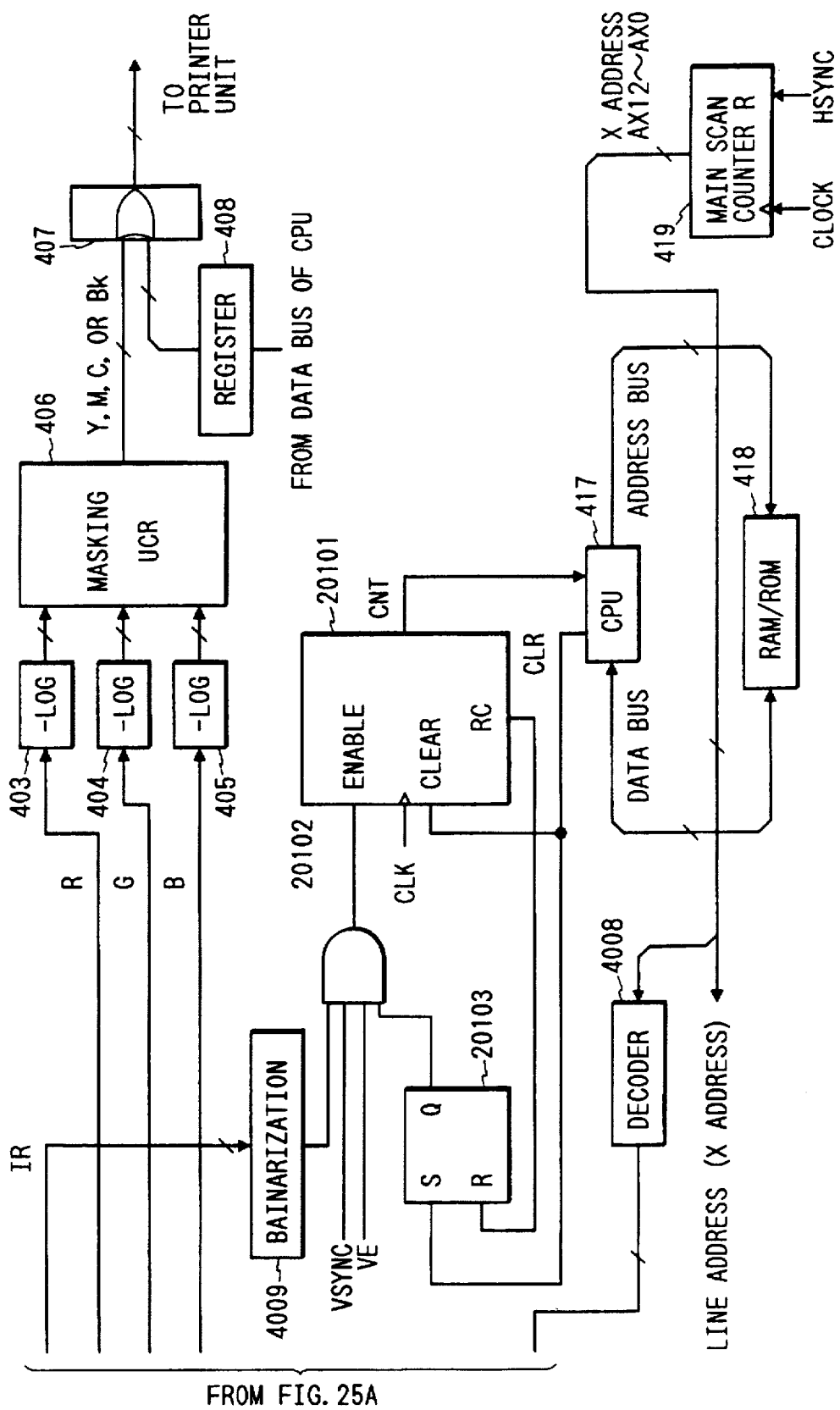
FIG. 25 is comprised of FIGS. 25A and 25B showing structural views which illustrate a signal processing portion according to a third embodiment of the present invention.

A control block according to this embodiment is shown in FIGS. 25A and 25B. In this embodiment, the number of pixels of fluorescent information contained in the original document is counted in place of performing pattern matching of the fluorescent mark.

Referring to FIGS. 25A and 25B, the same elements as those shown in FIGS. 4A and 4B are given the same reference numerals. Reference numeral 20101 represents a counter which counts the number of fluorescent pixels in the original document with CLK. In this embodiment, an 8-bit counter is used to add the fluorescent pixels, the number of which is 255 pixels or less. Reference numeral 20202 represents a 4-input AND gate which supplies a binary-coded fluorescent signal transmitted from the binary coding circuit 4009 as an enable signal of the counter 20101 when the main scanning region signal VE and the sub-scanning region signal VSYNC are generated. The counter 20101 is cleared to zero in response to CLR signal supplied from the CPU, and the clear signal sets the flip-flop (F/F) 20103 to validate the output from the gate 20102.

In a case where a binary-coded signal is supplied by a number larger than the maximum count 255 for the counter 20101, RC signal is generated at a moment the output from the counter 20101 is 255 so that the F/F 20103 is reset. Therefore, the enable input of the counter is forcibly made to be "0" to maintain the output from the counter at 255.

The CPU 417 reads the result of counting performed by the counter 20101 as CNT signal. If the result of counting is larger than a predetermined value (for example, larger than 128 pixels), a fact is detected that the copy-inhibited original document is being copied.

FIG. 26 shows the flow of the process to be performed by the CPU according to this embodiment.

In step 20201, the CPU clears the counter 20101 and the F/F 20103.

In step 20202, the first scan is commenced. At this time, the printer transmit a magenta output, and the number of pixels in the fluorescent information obtained from the original document is counted.

In next step 20203, a judgement is made whether or not the number of the fluorescent pixels is larger than a predetermined value (128). If a judgement is made in step 20203 that there is no possibility of counterfeit, that is, the number of the fluorescent pixels is smaller than a predetermined value, the second, third and fourth scans are performed in step 20204. As a result, a usual operation is performed in such a manner that M, C, Y and Bk toner are used to develop the image and the toner image is fixed and transmitted in step 20205.

If a judgement is made in step 20203 that there is a possibility of counterfeit and if the fluorescent pixels by a number larger than a predetermined value are detected, a counterfeit prevention process is performed in step 20206. Specifically, FFH (usually 00H is set) is set to the register 408 shown in FIGS. 4A and 4B so that FFH is transmitted to the printer portion. Then, C, Y and Bk toner is allowed to adhere to the entire surface to inhibit the copying operation.

<Fourth Embodiment>

This embodiment is directed to detect fluorescent light in place of detecting infrared fluorescent information in the copy-inhibited original document similarly to the second embodiment.

In this embodiment, the presence of the fluorescent mark except for the visible light, such as infrared rays, contained in the copy-inhibited original document is detected, the fluorescent information is converted into visible information, and it is recorded together with visible information obtainable from the original document. As a result, normal recording of the copy-inhibited original document is inhibited.

Figure 27:
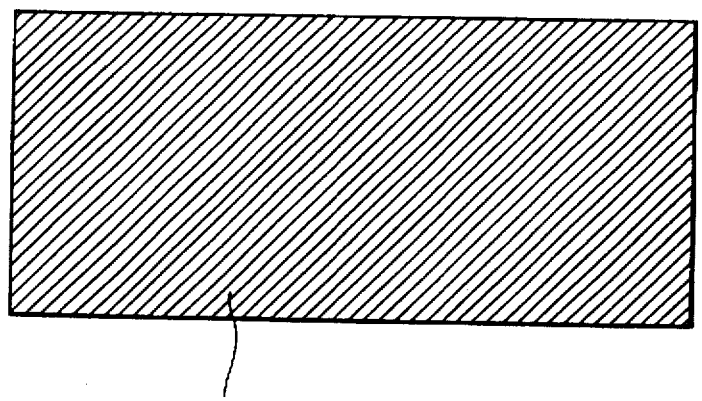
FIG. 27 illustrates a state according to the third embodiment of the present invention where fluorescent information of a copy-inhibited original document is printed.

As effective fluorescent information about the copy-inhibited original document according to this embodiment, it is preferable to use a substance formed by recording a regular pattern on the entire surface of the original document or a substance formed by painting fluorescent information on the entire surface of the original document as shown in FIG. 27. If the fluorescent information has transparent characteristics with respect to visible light, no practical problem usually arises in a normal way of usage except for the unlawful copying operation.

A control block according to this embodiment is shown in FIGS. 28A and 28B. In this embodiment, the number of pixels of fluorescent information contained in the original document is counted in place of performing pattern matching of the fluorescent mark similarly to that shown in FIGS. 25A and 25B. Referring to FIGS. 28A and 28B, the same elements as those shown in FIGS. 25A and 25B are given the same reference numerals.

Reference numeral 20401 represents an AND gate. A signal obtained by converting the light quantity and density of the infrared fluorescent reading signal IR is validated in response to P-ENB signal supplied from the CPU 417 in step 20402. The OR gate 407 synthesizes the validated signal with a usual visible image to be recorded. The phase deviation of the IR signal occurring when it is read by the CCD from the visible information in the sub-scanning direction has been corrected by a delay means 401. If an arrangement is made that Moire fringes or the like are generated by fluorescent information and visible information when fluorescent information is printed on to the copy-inhibited original document, the intended effect of the copy inhibition by means of the Moire can be obtained satisfactorily.

The CPU 417 reads the result of counting performed by the counter 20101 as CNT signal. If the result of counting is larger than a predetermined value (for example, 128 pixels or more), a fact that the copy-inhibited original document is being copied is detected, casing the P-ENB signal to be made "1". As a result, infrared fluorescent information is visualized and the usual copying operation is inhibited.

Figure 29:
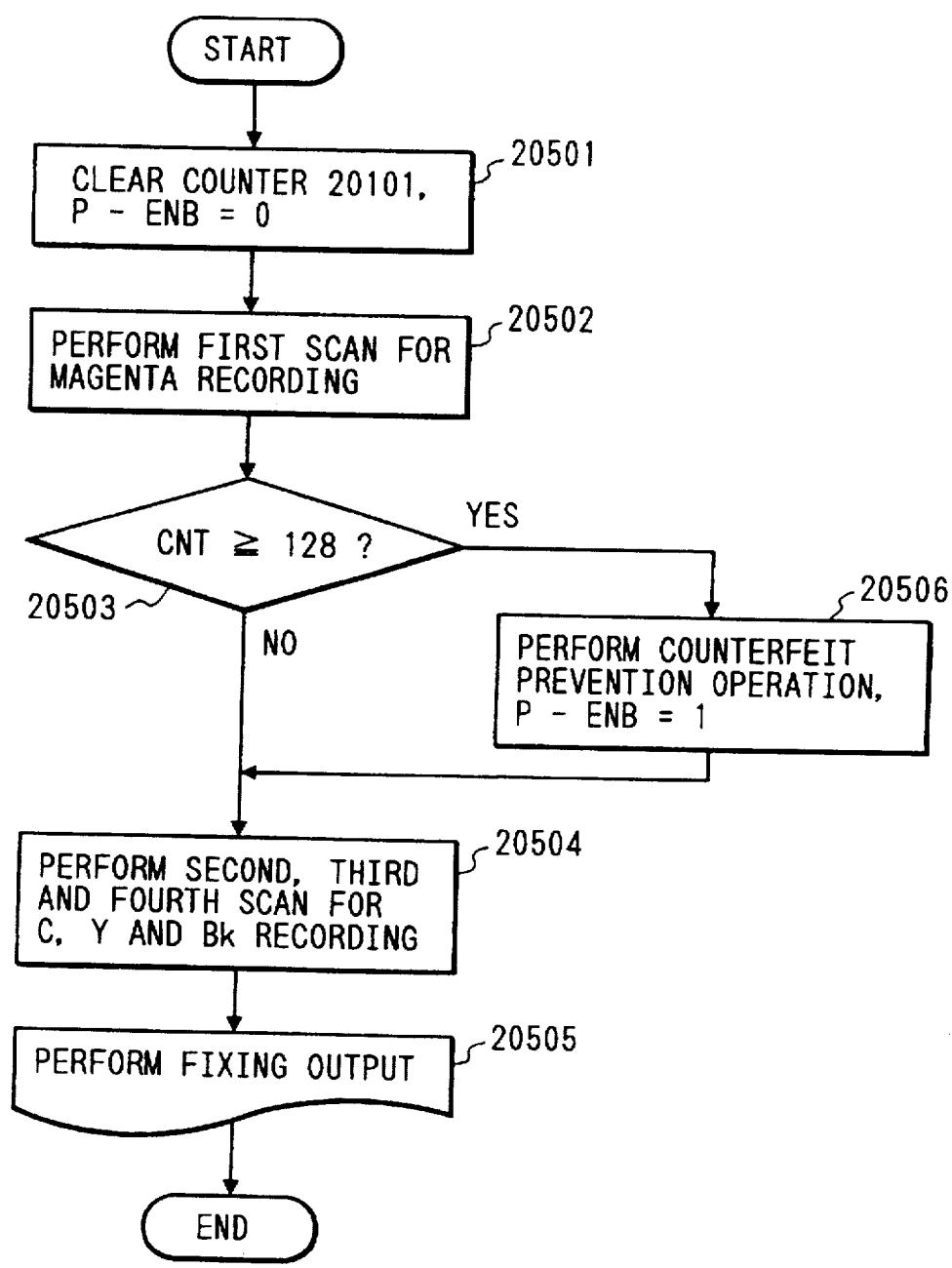
FIG. 29 is a flow chart which illustrates control performed by the CPU according to the third embodiment of the present invention.

FIG. 29 shows the flow of the process performed by the CPU according to this embodiment.

In step 20501, the CPU clears the counter 20101 and the F/F 20103, and makes the P-ENB signal to be "0".

In step 20502, the first scan is commenced. In this embodiment, the printer transmits a magenta output and the number of pixels of fluorescent information obtained from the original document is counted.

In step 20503, whether or not the number of fluorescent pixels is larger than a predetermined number (128) is judged. If a judgement is made in step 20503 that there is no possibility of counterfeit, that is, the number of the fluorescent pixel is smaller than a predetermined number, the second, third and fourth scans are performed in step 20504. Then, a usual operation is performed such that M, C, Y and Bk toner images are developed and the developed image is fixed and transmitted in step 20505.

If a judgement is made in step 20503 that the fluorescent pixels are detected by a number larger than a predetermined number and a judgement is made that there is a possibility of the counterfeit, a counterfeit prevention process is performed in step 20506. Specifically, the P-ENB signal is made to be "1" and a record image formed by synthesizing fluorescent information as visible information is transmitted to the printer portion at the time of recording C, Y and Bk images. As a result, a normal copying operation is inhibited.

<Other Embodiments>

The foregoing embodiment is arranged in such a manner that infrared ray component adjacent to about 700 nm is used as the exciting light and that infrared fluorescent light having the peak at about 800 nm is caused to emit from an identification mark. Another arrangement may be employed in which light in a visible light region is used as the exciting light and information denoting the copy-inhibited original document is formed by a fluorescent ink so as to cause the infrared fluorescent light of, for example, 700 to 800 nm to be emitted.

As contrasted with the foregoing embodiment in which the filters for cutting infrared light shown in FIG. 20 are used as the R, G and B reading CCD filters, a filter for cutting the wave lengths longer than 650 nm shown in FIG. 20 is used as the filter 208 for cutting infrared rays at the light source.

As a result, light received by the R, G and B line sensors is only infrared ray obtained from the identification mark in the copy-inhibited original document or infrared fluorescent light emitted in a special case. Therefore, a necessity for the R, G and B reading CCD to have the characteristic to cut the infrared rays containing the near infrared rays longer than 650 nm can be eliminated. As a result, the cost of the CCD can be reduced.

Another structure may be employed in which ultraviolet region light is used as the exciting light and information denoting the copy-inhibited original document is formed by a fluorescent ink so as to cause infrared fluorescent light having wavelengths 700 to 800 nm to be emitted.

Figure 30:
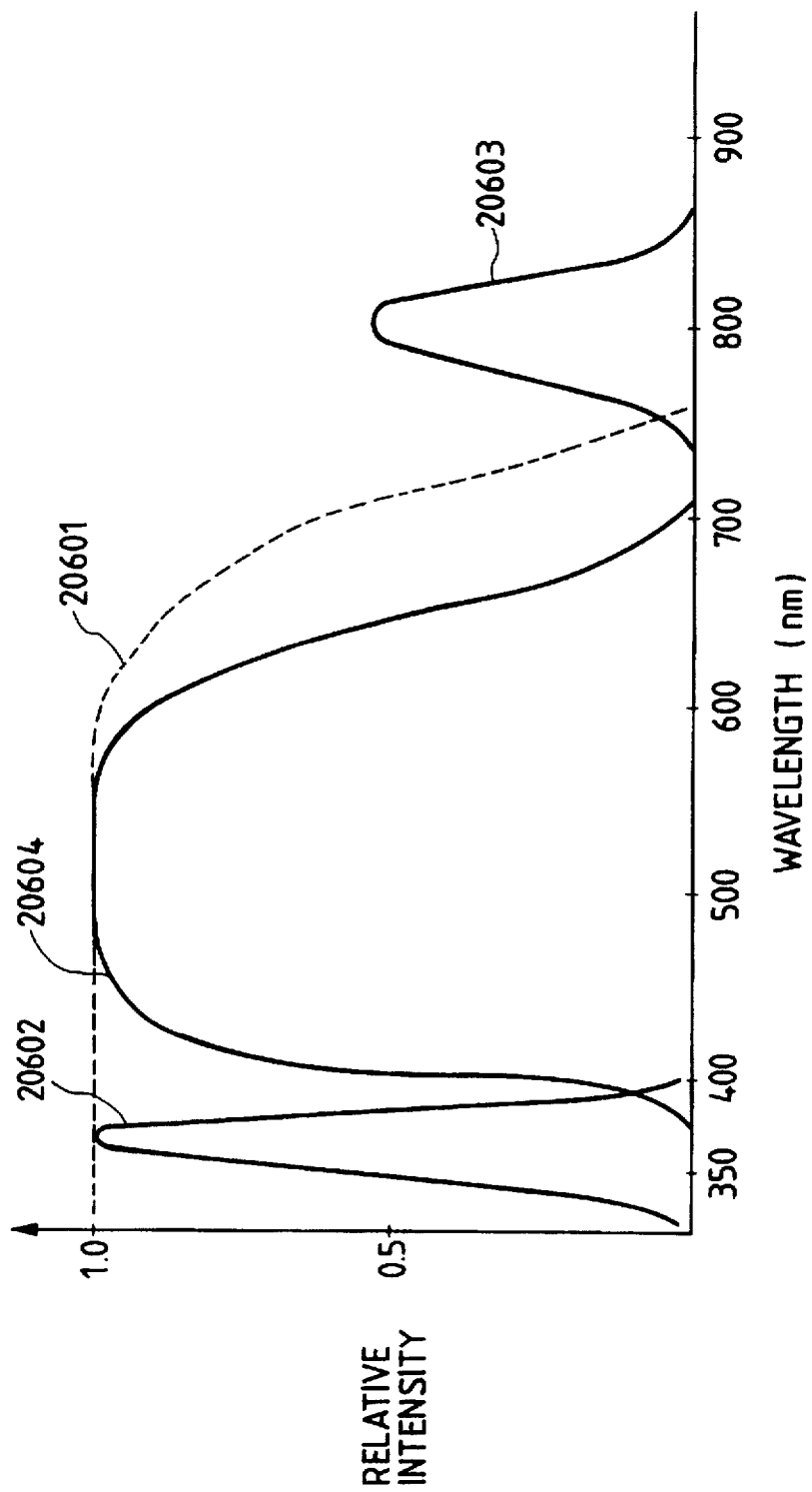
FIG. 30 illustrates the characteristics of infrared fluorescent light realized due to ultraviolet exciting light.

In this case, a metal halide lamp or the like is used as the light source which emits light containing an ultraviolet component as contrasted with the first embodiment. Further, a filter for cutting light having the wave length longer than 650 nm shown in FIG. 20 is used as the filter 208 for cutting infrared rays at the light source. Thus, direct reflected light of infrared ray from the light source cannot be made incident on the R, G, B and IR sensors. The spectrum characteristics of light with which the original document is irradiated are designed by reference numeral 20601 shown in FIG. 30. The filters for the R, G and B reading CCD comprise filters having both spectrum characteristics for R, G and B shown in FIG. 19 and characteristics 20604 shown in FIG. 30 with which ultraviolet light shorter than 400 ns and infrared rays longer than 650 nm can be cut. The IR sensor has a filter having characteristics for cutting both visible component and the ultraviolet component shown in FIG. 16 to read only ultraviolet fluorescent component only. By using ultraviolet exciting light 20602, the wave length of which is short and which has relatively large light energy than visible light and infrared rays, infrared fluorescent light 20603 having higher level energy can be obtained. As a result, the fluorescent mark (the identification mark) can further assuredly be recognized.

The CCD shown in FIGS. 15A and 15B is not limited to the CCD for reading infrared fluorescent information and visible information. It may also be used to read visible information and infrared information. In this case, a sensor having a thick light receiving layer and capable of reading infrared rays is disposed on the outside of the visible information reading sensor.

The CCD shown in FIGS. 15A and 15B is not limited to the CCD capable of reading infrared information except for visible information and visible information. It may also be used to read ultraviolet information except for visible information and visible information. That is, short wave length ultraviolet information can be effectively read only in a case where a thin photoelectric conversion layer is used which is composed of the p-layer attributing to the photoelectrical conversion and the n-layer formed on the p-layer shown in the cross sectional structural view shown in FIG. 17. Therefore, the photo-diode and charge transfer portions usually formed on the two sides of the photo-diode and performing the serial operation must be assuredly separated from each other in terms of the structure to prevent electric induction. Hence, the intervals between the ultraviolet light reading sensor and the other sensors must be widened as compared with the other sensor intervals. In addition, a sensor having a light receiving layer formed into a different structure is disposed on the outside of the other sensors to simplify the structure of the CCD.

The CCD shown in FIGS. 15A and 15B is not limited to the CCD for reading infrared fluorescent information and visible information. It may also be used to read visible information and ultraviolet information or read visible information and infrared information. That is, the fluorescent light reading sensor is disposed on the outside of the plural line sensors or the line interval is widened as compared with the line intervals between the other sensors for the purpose of reading weak fluorescent information so that cross talk from information except for the fluorescent information can be prevented. An infrared information reading sensor is disposed on the outside of the visible information reading sensor.

In all embodiments described above, a common irradiation system for reading visible information and for exciting fluorescent light is disposed. Light may be emitted from a structure composed of irradiation lamps having different characteristics. The combination is exemplified by a combination of an FL lamp for visible light and a halogen lamp for infrared exciting light and a combination of a halogen lamp for reading visible light and an FL lamp (black lamp) for generating only ultraviolet exciting light.

Although the foregoing embodiments are arranged in such a manner that the standard white plate is used to correct the visible light read data and to correct the infrared fluorescent data, a standard white plate for correcting the visible light and a standard plate for correcting the infrared fluorescent light may independently be used at different positions.

As the common standard plate, a structure may be employed which is formed by stacking a standard plate, which is white with respect to visible light, and infrared fluorescent material exhibiting substantially transparent characteristics with respect to visible light.

As described above, the foregoing embodiments according to the present invention are arranged so that fluorescent information which is substantially transparent with respect to visible light is used to detect the specific document. As a result, the copy-inhibited original document can be detected while eliminating an influence upon the actual state of usage with visible light.

Since original document information is judged by using information except for visible information, the judgement information contained in the original document can be discriminated in the visible manner. Therefore, the discrimination cannot be made by a usual image reading means. As a result, the security protection against the copy inhibition operation of the copy-inhibited original document can further be improved. Since the specific original document is identified by using information except for visible information, information which can easily erroneously be discriminated as identification information can intentionally be reduced as compared with a case where visible information is used. Therefore, a further accurate identification of the specific document can be performed.

Since information, which cannot be identified with visible light, is recorded as visible information, an unlawful copied product from the copy-inhibited original document can easily be discriminated.

According to the present invention, visible information and information except for the visible information are simultaneously read, and the original document is discriminated by using information except for the visible information. Therefore, while discriminating the original document in a real time manner at the time of the image data output operation, the accuracy in discriminating the original document can be improved as compared with a case where visible information is used. As a result, the copy inhibition operation of the copy-inhibited original document can effectively be performed.

Further, information of the copy-inhibited original document except for the visible information can be converted into visible information in a real time manner during the output of visible information and it can be transmitted together with visible information obtained from the original document. Therefore, a complete visible data output from the copy-inhibited original document can be inhibited while simplifying the control structure.

Further, the irradiation for reading the visible information and information except for the visible information is made common, and the visible information and the information except for the visible information are separated from each other by using independent sensors. Therefore, the intensities of irradiation light for the visible information and the information except for the visible information can be strengthened while necessitating a simple structure. Further, sensors are independently used for reading the visible information and the information except for the visible information. Hence, the gain of each reading signal can be set to an adequate level. As a result, the S/N ratio of the visible information and the information except for the visible information can be made optimum. Consequently, the original document can precisely be read and the original document can accurately be discriminated with a simple structure.

Since the filter is disposed in the optical passage formed from the original-document irradiation lamp to the original document to allow the exciting wave length component of the fluorescent component to pass through and to decay the fluorescent wave length component, reading of the fluorescent information can be performed while realizing an excellent S/N ratio.

By disposing the filter in the rear of the common optical system for visible light and light except for the visible light and as well as in front of the visible light reading sensor to cut the wavelengths except for the visible wave lengths, the visible information can be read while eliminating the influence of the light except for the visible light.

By disposing the filter in the rear of the common optical system for visible light and light except for the visible light and as well as in front of the sensor for reading light except for the visible light to cut exciting light with respect to fluorescent light or visible light, light except for visible light can be read while maintaining an excellent S/N ratio.

Since fluorescent information generated under the irradiation of a conventional halogen lamp of the like which emits infrared light by a large quantity is used, copy-inhibited information can assuredly be detected.

In the present invention, the sensor for detecting light information except for visible information and the sensor for reading the visible information are structured by the monolithic manner. Therefore, the necessity of maintaining an optical passage by using a special optical system such as a prism to read information except for the visible information can be eliminated. Hence, light except for visible light can accurately be read from the same original document position with a simple optical system. As a result, the counterfeit prevention such as the synthesis of the identification mark and the original document information and the like can accurately be realized.

By changing the thickness of the light receiving layer of the sensor for reading light information except for the infrared visible information structured in the monolithic manner to a visible thickness, excellent reading of visible information and excellent reading of information except for the visible information can be realized on the same chip.

Since the line interval between the sensor for reading light information except for the visible information and the sensor for reading the visible light is widened as compared with the other line intervals, the structure of the CCD can be complicated such that the thickness of the light receiving layer is changed over to read the visible light and to read light except for the visible light in order to read light having the wave length except for the visible wave length. Therefore, the yield of the CCD can be improved.

Since the sensor for reading light except for visible light is disposed at the outermost position of the plural line sensors, the structure of the CCD can be complicated such that the thickness of the light receiving layer is changed over to read the visible light and to read light except for the visible light in order to read light having the wave length except for the visible wave length. Therefore, the yield of the CCD can be improved.

By forming the sensor for detecting fluorescent information in a monolithic manner with respect to the sensor for reading information except for the fluorescent information, the necessity of maintaining an optical passage by using a special optical system such as a prism to read fluorescent information can be eliminated. Hence, light except for visible light can accurately be read from the same original document position with a simple optical system. As a result, the synthesis of the identification mark and the original document information and the like can accurately be realized.

Since the light receiving area of the sensor for reading fluorescent information is enlarged with respect to the area of the visible light reading sensor, weak light information except for visible information generated by fluorescent light can be read satisfactory while maintaining an excellent S/N ratio similarly to the case where visible light is read.

In the present invention, the sensor for reading fluorescent light is disposed at the outermost position of the plural line sensors. As a result, the influence of the cross talk of the visible reading signal having a relatively high signal level upon the weak fluorescent signals can be reduced. Therefore, the fluorescent light can accurately be read.

By widening the line interval between the sensor for reading fluorescent light and the other sensor for reading visible light as compared with the other line intervals, the influence of the visible reading signal having a relatively high signal level upon the weak fluorescent signals or the like can be reduced. Therefore, the fluorescent light can accurately be read.

Since a standard density means for correcting the sensitivity deviation at the main scanning position occurring due to the light distribution deviation with respect to the read signal obtained by the sensor for reading light information except for visible information is commonly used with the means for reading visible information, the size of the apparatus can be reduced.

By using the read signal obtained from the standard density plate for correcting the signal for the sensor for reading fluorescent information to set the circuit gain for the fluorescent light reading signal or to correct the sensitivity deviation of the fluorescent light reading sensor, the dynamic range of the read signal except for the visible information can be set optimally. As a result, fluorescent information without overflow and exhibiting excellent S/N ratio can be read similarly to the case where visible information is read.

By using the read signal obtained from the standard density plate for correcting the signal for the sensor for reading light information except for visible information to set the circuit gain for the fluorescent light reading signal or to correct the sensitivity deviation of the fluorescent light reading sensor, the dynamic range of the read signal except for the visible information can be set optimally. As a result, fluorescent information without overflow and exhibiting excellent S/N ratio can be read similarly to the case where visible information is read.

As described above, according to the present invention, an original document, in which plural information items having the wave length characteristics ranging from the visible region to a region except for the visible region can efficiently be read.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An apparatus for determining whether a specific material is present in media, comprising:

irradiation means for irradiating the media with light having a first wavelength and a light having a second wavelength different from the first wavelength, wherein the light generated by said irradiation means does not include light of a specific wavelength, wherein the media generate light of the specific wavelength different from the first and second wavelengths in response to irradiation by light of the first or second wavelengths when a specific material is present in the media;

detection means for detecting light having the specific wavelength generated by the media when the media is irradiated by said irradiation means with the light having the first wavelength, and for detecting light having the specific wavelength generated by the media when the media is irradiated by said irradiation means with the light having the second wavelength; and determining means for determining whether the specific material is present in the media, on the basis of a detected result from said detection means.

2. An apparatus according to claim 1, wherein the light having the first wavelength and the light having the second wavelength are both visible light.

3. An apparatus according to claim 2, wherein said detection means includes a filter for intercepting the light having a visible wavelength.

4. An apparatus according to claim 3, wherein the specific wavelength is an invisible wavelength.

5. An apparatus according to claim 4, wherein said irradiation means comprises a lamp and a filter for intercepting light having the invisible wavelength.

6. An apparatus according to claim 1, wherein the specific material is an invisible material.

7. An apparatus according to claim 1, wherein the media include securities.

8. An apparatus according to claim 1, wherein the first wavelength and the second wavelength differ from each other by at least 50 nm or more.

9. An apparatus according to claim 1, wherein said apparatus includes a copy machine.

10. An apparatus according to claim 1, further comprising control means for suspending part of the function of said apparatus in accordance with the determination of said determining means.

11. An apparatus according to claim 1, wherein the light having the specific wavelength is generated when the specific material absorbs the light having the first wavelength and the light having the second wavelength.

12. An apparatus for determining whether a specific material is present in media, comprising:

irradiation means for irradiating the media with light having a first wavelength and a light having a second wavelength different from the first wavelength, wherein said irradiation means does not generate light of a specific wavelength, wherein the media generate light of the specific wavelength when absorbing light of the first or second wavelengths when a specific material is present in the media;

detection means for detecting light from the media having the specific wavelength when the media is irradiated with and absorbs light having the first wavelength by said irradiation means, and for detecting light from the media having the specific wavelength when the media is irradiated with and absorbs light having the second wavelength by said irradiation means; and determining means for determining whether the specific material it present in media on the basis of a detected result from said detection means.

13. An apparatus according to claim 12, wherein the light having the first wavelength and the light having the second wavelength are both visible light.

14. An apparatus according to claim 13, wherein said detection means includes a filter for intercepting the light having a visible wavelength.

15. An apparatus according to claim 12, wherein the specific wavelength is an invisible wavelength.

16. An apparatus according to claim 15, wherein said irradiation means comprises a lamp and a filter for intercepting light having the invisible wavelength.

17. An apparatus according to claim 12, wherein the specific material is an invisible material.

18. An apparatus according to claim 12, wherein the media include securities.

19. An apparatus according to claim 12, wherein the first wavelength and the second wavelength differ by at least 50 nm or more.

20. An apparatus according to claim 12, wherein said apparatus includes a copy machine.

21. An apparatus according to claim 12, further comprising control means for suspending part of the function of said apparatus in accordance with the determination of said determining means.

22. A method for determining whether a specific material is present in media, comprising:

an irradiation step for irradiating media with light having a first wavelength and a light having a second wavelength different from the first wavelength and not including light having a specific wavelength, wherein irradiating the media with light of the first or second wavelengths when a specific material is present generates light of the specific wavelength;

a detection step of detecting the light having the specific wavelength generated by the media when the media is irradiated in said irradiation step with the light having the first wavelength and for detecting light having the specific wavelength generated by the media when the media is irradiated in said irradiation step; and a determining step of determining whether the specific material is present in the media, on the basis of a detected result in said detection step.

23. A method for determining whether a specific material is present in media, comprising:

an irradiation step for irradiating media with a light having a first wavelength and a light having a second wavelength different from the first wavelength, and not including light having a specific wavelength, wherein when the specific material is present in the media, and the media absorbs light of the first or second wavelengths, the media generates light of the specific wavelength;

a detection step for detecting the light having the specific wavelength generated by the media when the media is irradiated with and absorbs the light having the first wavelength in said irradiation step, and for detecting light having the specific wavelength generated by the media when the media is irradiated with and absorbs the light having the second wavelength in said irradiation step; and a determining step of determining whether the specific material is present or not in the media, on the basis of a detected result in said detection step.

* * * * *

UNITED STATES PATENT AND TRADEMARK OFFICE
CERTIFICATE OF CORRECTION

PATENT NO. : 5,763,891
DATED : June 9, 1998
INVENTOR(S) : KAZUO YOSHINAGA, ET AL.

It is certified that error appears in the above-identified patent and that said Letters Patent is hereby corrected as shown below:

COLUMN 1

Line 55, "ti" should read --to--.

COLUMN 2

Line 44, "a comprised" should read --comprised--.

COLUMN 3

Line 8, "immediately" should read --immediate--.

COLUMN 4

Line 31, "in" should read --in that--.

COLUMN 10

Line 38, "R=H" should be deleted.

COLUMN 19

Line 25, "can be" should read --can--.

COLUMN 20

Line 7, "understand" should read --understood--.

UNITED STATES PATENT AND TRADEMARK OFFICE
CERTIFICATE OF CORRECTION

PATENT NO. : 5,763,891

DATED : June 9, 1998

INVENTOR(S) : KAZUO YOSHINAGA, ET AL.

It is certified that error appears in the above-identified patent and that said Letters Patent is hereby corrected as shown below:

COLUMN 21

Line 43, "system" should read --systems--.

COLUMN 22

Line 22, "a described" should read --described--.
    Line 61, "respect of" should read --respect to--.

COLUMN 23

Line 27, "player" should read --p-layer--.
    Line 41, "the twice" should read --twice--.

COLUMN 24

Line 65, "irradiated" should read --irradiate--.

COLUMN 25

Line 35, "illustrates" should read --illustrate--.

UNITED STATES PATENT AND TRADEMARK OFFICE
CERTIFICATE OF CORRECTION

PATENT NO. : 5,763,891

DATED : June 9, 1998

INVENTOR(S): KAZUO YOSHINAGA, ET AL.

It is certified that error appears in the above-identified patent and that said Letters Patent is hereby corrected as shown below:

COLUMN 26

Line 18, "multipliers" should read --multiplies--.

Line 59, "illustration).," should read --illustration),--.

COLUMN 27

Line 30, "turning of" should read --turning on--.
    Line 37, "control adjust" should read --adjust--.

COLUMN 28

Line 13, "is needed" should read --are needed--.

COLUMN 29

Line 40, "represents" should read --represent--.
    Line 60, "$X_t=x_{t-8}$" should read --$X_t=X_{t-8}$--.

COLUMN 30

Line 2, "cases where number of 1" should read --number of 1's--.
    Line 3, "window) are" should read --window, is--.
    Line 60, "the" (both occurrences) should be deleted.

UNITED STATES PATENT AND TRADEMARK OFFICE
CERTIFICATE OF CORRECTION

PATENT NO. : 5,763,891

DATED : June 9, 1998

INVENTOR(S): KAZUO YOSHINAGA, ET AL.

It is certified that error appears in the above-identified patent and that said Letters Patent is hereby corrected as shown below:

COLUMN 31

Line 11, "numeral" should read --numerals--.
    Line 12, "receives" should read --receive--.
    Line 22, "Allow to" should read --allow--.
    Line 63, "unit)." should read --unit)--.

COLUMN 32

Line 37, "to one kind" should read --to detect one kind--.
    Line 39, "refers" should read --refers to--.
    Line 48, "while" should read --white--.

COLUMN 33

Line 17, "similarly" should read --similarity--.
    Line 27, "($i_{BC}$, $i_{BC}$)" should read --($i_{BC}$, $j_{BC}$)--.
    Line 67, "not present" should read --present--.

COLUMN 34

Line 52, "transmit" should read --transmits--.
    Line 63, "toner" should read --toners--.

UNITED STATES PATENT AND TRADEMARK OFFICE
CERTIFICATE OF CORRECTION

PATENT NO. : 5,763,891

DATED : June 9, 1998

INVENTOR(S) : KAZUO YOSHINAGA, ET AL.

It is certified that error appears in the above-identified patent and that said Letters Patent is hereby corrected as shown below:

<u>COLUMN 39</u>

Line 14, "SIN" should read --S/N--.

<u>COLUMN 40</u>

Line 3, "satisfactory" should read --satisfactorily--.
    Line 51, "particularly," should read --particularity,--.

Signed and Sealed this

First Day of June, 1999

Attest:

Q. TODD DICKINSON

*Attesting Officer*     *Acting Commissioner of Patents and Trademarks*